United States Patent [19]

Salecker et al.

[11] Patent Number: 5,679,091

[45] Date of Patent: Oct. 21, 1997

[54] METHOD OF AND APPARATUS FOR REGULATING THE TRANSMISSION OF TORQUE IN POWER TRAINS

[75] Inventors: Michael Salecker, Achern; Uwe Wagner, Bühl-Weitenung; Michael Reuschel, Bühl; Martin Rauser, Bühl-Baalzhofen; Bruno Müller, Bühlertal; Alfons Wagner, Bühl, all of Germany

[73] Assignee: LuK Getriebe-Systeme GmbH, Buhl/Baden, Germany

[21] Appl. No.: 393,316

[22] Filed: Feb. 22, 1995

[30] Foreign Application Priority Data

Feb. 23, 1994 [DE] Germany .................. 44 05 719.9
May 26, 1994 [DE] Germany .................. 44 18 273.2
Jul. 21, 1994 [DE] Germany .................. 44 25 932.8
Oct. 24, 1994 [DE] Germany .................. 44 37 943.9

[51] Int. Cl.$^6$ .................. B60K 23/02; F16H 59/14
[52] U.S. Cl. .................................................. 477/86
[58] Field of Search .................................. 477/86

[56] References Cited

U.S. PATENT DOCUMENTS

| 4,765,450 | 8/1988 | Kurihara et al. ................ 477/86 |
| 4,804,074 | 2/1989 | Kori .................................. 477/86 |
| 5,060,158 | 10/1991 | Kono et al. ..................... 477/86 |
| 5,454,768 | 10/1995 | Jones et al. ..................... 477/86 |

FOREIGN PATENT DOCUMENTS

| 42 39 289 | 5/1993 | Germany . |
| 42 39 291 | 5/1993 | Germany . |
| 43 06 505 | 9/1993 | Germany . |
| 43 22 677 | 1/1994 | Germany . |
| 2 261 922 | 6/1993 | United Kingdom . |
| 2 261 923 | 6/1993 | United Kingdom . |
| 2 264 989 | 9/1993 | United Kingdom . |
| 2 275 513 | 8/1994 | United Kingdom . |
| 2 276 922 | 10/1994 | United Kingdom . |

*Primary Examiner*—Dirk Wright
*Attorney, Agent, or Firm*—Darby & Darby

[57] ABSTRACT

A method of monitoring a torque transmission system with a manually switchable gearbox in the power train of a motor vehicle involves the utilization of at least one sensor unit at the input side of the torque transmission system to ascertain relevant positions of the shift lever of the gearbox and the driving torque of the engine of the motor vehicle. The thus obtained shift lever signals are memorized, together with comparison signals which are obtained as a result of filtering of the shift lever signals, and various characteristics of such signals are recognized and identified to indicate the intention of the operator of the vehicle regarding the switching of the gearbox. The thus obtained switching intention signals are transmitted to a controlled clutch operating system.

19 Claims, 30 Drawing Sheets

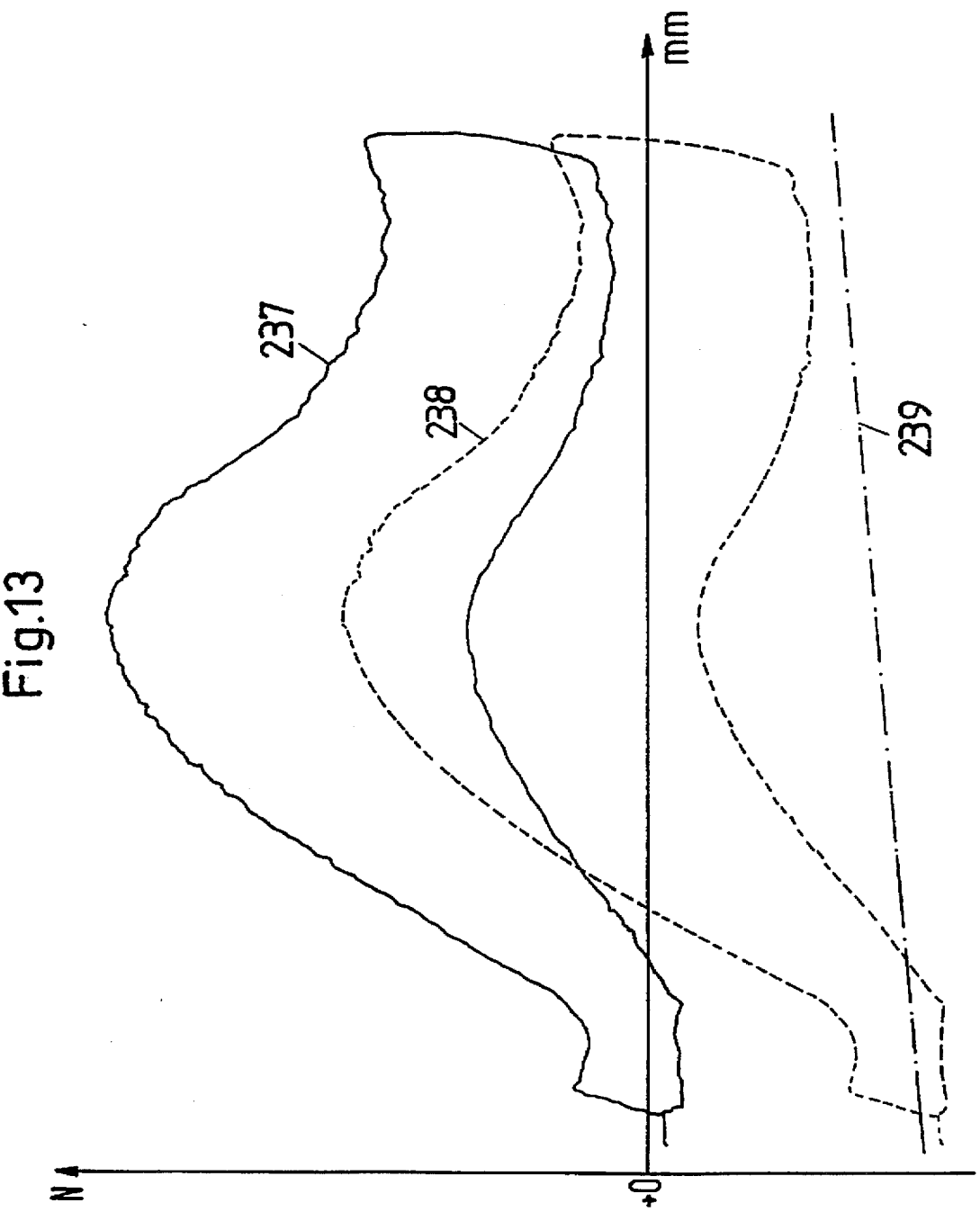

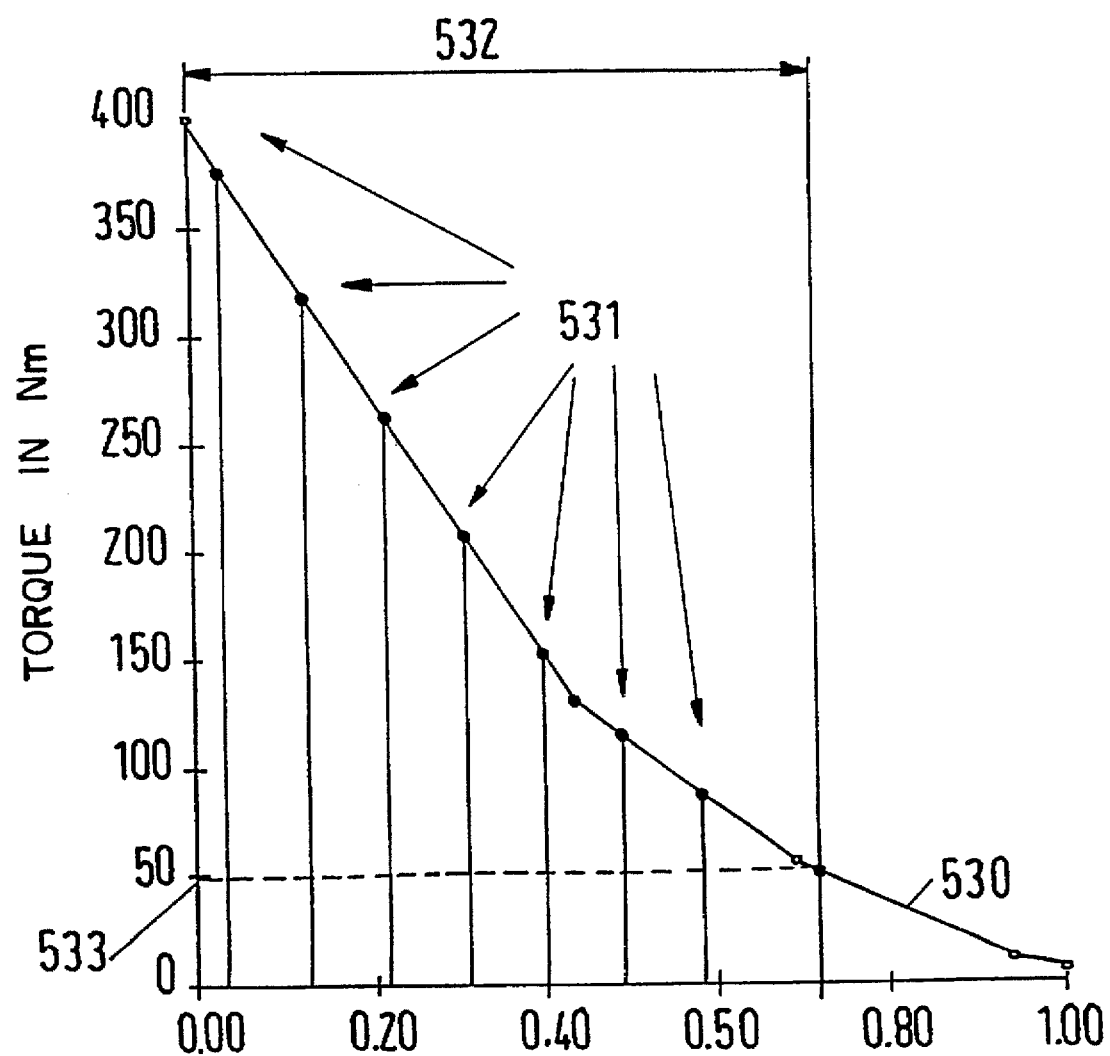

METHOD OF AND APPARATUS FOR REGULATING THE TRANSMISSION OF TORQUE IN POWER TRAINS

BACKGROUND OF THE INVENTION

The invention relates to a method of controlling a torque transmission system, to a torque transmission system for carrying out the method of controlling, and to a method of monitoring torque transmission systems.

It is known from the vehicle industry that, when changing the transmission ratio of a gear between a driving machine and a gearbox unit, the required clutching processes can be assisted or automated by a control or regulating algorithm. This facilitates the servicing of the engine unit or gearbox and the clutching operation can be carried out in an energy saving manner with careful treatment of the materials. Furthermore, the control of a torque transmission system which is mounted at the output side of an automatic gearbox can be helpful, for example, in undertaking or guaranteeing adjustment processes and protective functions in the case of, for example, cone pulley belt contact gearboxes.

WO 94/04852 discloses a method of controlling torque transmission systems in conjunction with an automatic gearbox. The torque transmission system comprises a load branching out with a torque converter which is mounted in parallel with a friction clutch. In accordance with this method, a driving torque transmitted by an engine unit is broken up into a hydraulic part which is to be transmitted by the converter and a mechanical part which is to be transmitted by the friction clutch, such as a lockup clutch. A central computer unit determines or calculates, in dependency upon the relevant operating condition of the system, the torque which is to be transmitted each time by the friction clutch. The remaining torque to be transmitted by the hydraulic torque converter constitutes the difference between the applied torque and the torque transmitted by the friction clutch and corresponds directly to a slip between the input and output parts of the torque transmission system.

Such method of controlling can be resorted to only in conjunction with an automatic gearbox and a lockup clutch. However, the acceptability of automatic gearboxes is only minimal in many fields of use. Furthermore, a lockup clutch of such kind is cost-intensive and bulky.

OBJECTS OF THE INVENTION

An object of the invention is to provide a method of controlling which can be used practically universally, the regulating quality of which is high, and which exhibits a clearly improved load change behavior for torque transmission systems.

In addition, one should achieve cost advantages in comparison with conventional torque transmission systems. Furthermore, an object is to provide a torque transmission system which can be utilized for the practice of such controlling method.

SUMMARY OF THE INVENTION

The above objects are accomplished in that the clutch torque which can be transmitted from an input side to an output side of a torque transmission system with or without load distribution or branching out is utilized as a control value and such control value is calculated and/or determined in dependency upon an input or driving torque.

This amounts to a realization of a torque matching concept. The basic concept underlying the method of such kind resides in controlling the setting member primarily in such a way that the clutch torque which can be transmitted by the torque transmitting parts is mainly just above or just below the driving torque at the input side or drive side of the torque transmission system.

As a rule, a torque transmission system must be designed for the transmission of two to three times the maximum driving torque of a driving machine, such as an engine. However, the driving torque which is typical of the operation is but a fraction of the maximum driving torque. The torque matching renders it possible to establish only that force-locking engagement which is required between the torque transmitting parts in lieu of a quasi permanent excessive overpressure.

A further advantage resides in the provision of a controlling method. In contrast to a regulation, the feedback of condition values of the torque transmission system is not absolutely necessary. It serves merely for a possible enhancement of the control quality but is not required in order to establish the operation of the torque transmitting system. The task of a torque transmission system of such kind is to transmit torque. Therefore, it is expedient to use the transmittable clutch torque as a control value.

An advantageous embodiment of the invention is characterized in that, in a method of controlling a torque transmission system with or without load distribution or branching out which controls the torque adapted to be transmitted from an input side to an output side of the torque transmission system, the latter comprises a sensor system for detecting the values to be measured and a central control or computer unit which is connected with the sensor system, the torque which can be transmitted by the torque transmitting system being controlled in such a way that the transmittable torque is calculated, adapted and controlled as a function of a driving torque, and deviations from an ideal state are compensated for long-term through corrections.

Furthermore, it can be of advantage to resort to a method which serves to control a torque transmission system, especially for motor vehicles, wherein the torque transmission system is installed in the power flow downstream of a driving machine and in the power flow upstream or downstream of a shiftable device, such as a gearbox, and controls the torque which can be transmitted from an input side to an output side of the torque transmission system, and the power transmission system includes a control or computer unit which is in signal connection with sensors and/or other electronic units, the torque which can be transmitted by the torque transmitting system being calculated as a function of a driving torque and being adaptively controlled, with deviations from an ideal condition compensated for long-term through corrections.

According to another embodiment, the control value can be triggered by means of a setting member supplied with a setting value which is functionally dependent upon the transmittable clutch torque, in such a way that the transmittable clutch torque lies within a predetermined tolerance range at a slip limit wherein this slip limit is reached when the effect of a torque being applied at the input side exceeds the clutch torque which can be transmitted by the torque transmitting parts.

The method according to such embodiment can be carried out particularly in such a way that the torque which can be transmitted by a torque transmission system, such as a friction clutch and/or a hydrodynamic torque converter with or without converter lockup clutch and/or a starter clutch for automatic gearboxes and/or a turning set clutch and/or a torque transfer system connected in front of or behind an infinitely adjustable gearbox, such as a cone pulley belt contact gearbox, can be controlled as a function of a driving torque so that in the case of systems with load distribution or load branching, such as a hydrodynamic torque converter with converter lockup clutch, the torque which can be transmitted by the clutch is determined in accordance with the torque equation $$M_{KSoll}=K_{ME}*M_{AN}$$

and $$M_{Hydro}=(1-K_{ME})*M_{AN}$$

wherein the two equations apply for $K_{ME} \leq 1$ and $$M_{KSoll}=K_{ME}*M_{AN}$$

and $$M_{Hydro}=0$$

applies for $K_{ME}>1$ with $K_{ME}$=torque division factor $M_{KSoll}$=desired clutch torque $M_{AN}$=applied torque $M_{Hydro}$=torque transmittable by the hydrodynamic torque converter and a torque difference between the torque $M_{AN}$ applied to the torque transmission system by the driving aggregate and the torque $M_{KSoll}$ transmittable by the clutch is transmitted through the hydrodynamic torque converter wherein a minimum slip is established independently between the engine and the output of the torque transmission system in dependency upon the torque division factor $K_{ME}$ and deviations from the ideal condition are adaptively detected, processed and compensated for long-term.

A further embodiment of the method according to the invention proposes that the torque transmittable by the torque transmission system be controlled as a function of a driving torque so that in the case of systems without load distribution, such as a friction clutch and/or a starting clutch and/or a turning set clutch and/or a torque transmission system of an automatic gearbox or an infinitely adjustable gearbox, such as a cone pulley belt contact gearbox, the torque which can be transmitted by the friction clutch or starting clutch $$M_{KSoll}=K_{ME}*M_{AN}$$

is ascertained and a definite overpressing of the torque transmitting parts is carried out for $K_{ME} \geq 1$.

Furthermore, it can be advantageous if the torque which can be transmitted by a torque transmission system is varied as a function of a driving torque in such a way that in the case of systems without load distribution, such as a friction clutch and/or a starter clutch and/or a torque transfer system of an automatic gearbox and/or an infinitely adjustable cone pulley belt contact gearbox, the torque which can be transmitted by the torque transmission system $$M_{KSoll}=K_{ME}* M_{AN}+M_{Sicher}$$

is ascertained and for $K_{ME}<1$ a fictitious load distribution is reconstructed through a supporting control loop to be a copy of the behavior of a parallel-connected torque transmission system, such as a hydrodynamic torque converter, and a proportion of the transmittable torque is transmitted through the torque control and the remaining torque is subsequently transmitted in dependency upon slip through a safety torque $M_{Sicher}$.

Furthermore, it can be advantageous if the safety torque $M_{Sicher}$ is selected in dependency upon each operating point.

Similarly, it can be advantageous if the safety torque $M_{Sicher}$ is ascertained and/or controlled in functional dependency upon the slip $\Delta n$ or the throttle valve position d according to $$M_{Sicher}=f(\Delta n, d).$$

Similarly, it can be expedient if the safety torque $M_{Sicher}$ is ascertained and/or controlled in accordance with $$N_{Sicher}=const.*\Delta n.$$

Furthermore, it can be advantageous if the torque division factor $K_{ME}$ is constant within the entire operating range of the power train.

Similarly, it can be advantageous if the torque division or branching off factor $K_{ME}$ assumes an individual value which is ascertained for each operating point and/or assumes at least in a portion of the operating range a relevant constant value each time; the values set in different portions of the operating range can be different.

In this manner, it is advantageously possible to divide the entire operating range into partial ranges wherein, in each partial range, the $K_{ME}$ value is kept constant and the constant $K_{ME}$ value can vary from operating range to operating range.

Furthermore, it may be advantageous if the value of the torque division factor $K_{ME}$ is in functional relationship dependent upon the input RPM and/or the vehicle speed.

In accordance with the inventive concept, it can be advantageous if the value of the torque division factor $K_{ME}$ is dependent exclusively upon the speed of the driving aggregate.

It can be equally advantageous if the value of the torque division factor is dependent, at least in a portion of the entire operating range, both upon the RPM and upon the input torque of the driving aggregate.

Furthermore, it may be advantageous if the value of the torque division factor $K_{ME}$ is dependent not only upon the output RPM but also upon the torque of the driving aggregate.

Furthermore, it can be advantageous if a certain desired clutch torque is transmitted by the torque transmission system substantially at each point in time. It can thereby be expedient if the transmittable clutch torque follows the existing torque.

Such embodiment exhibits the advantage that the contact pressure of the torque transmission system need not be maintained permanently at the highest value. According to the teaching of prior art, a torque transmission system (such as a clutch) is acted upon by a multiple of the nominal engine torque.

In an automated torque transmission system, the following of the transmittable torque entails that the setting device or actor not only initiates the opening and closing processes during switching and starting but that the setting device selects the transmittable torque at each operating point to a value which corresponds at least substantially to the desired value.

In order that the setting device or actor need not be constantly active during follow-up, it may be expedient if the torque which can be transmitted by the torque transmission system is controlled with an overpressure and the overpressure lies within a narrow scatter band in relation to the desired value.

It can be expedient if the overpressure ΔM is dependent upon the operating point.

It can be particularly advantageous if the operating range is divided into partial ranges and the contact pressure and/or the maximum overpressure is fixed for each partial range.

In accordance with a further embodiment of the invention, it may be advantageous if the application of the contact pressure and/or of the overpressure and/or of the transmittable clutch torque is variable in time.

Similarly, according to the inventive concept, it may be advantageous if the transmittable clutch torque which is to be selected does not drop below a minimum value $M_{Min}$. The minimum torque can depend upon the operating point and/or upon the momentary operating range and/or upon the time.

Furthermore, the torque follow-up can be carried out by a combination of a time-variable follow-up with a minimum value which follow-up is specific to the operating point.

According to the inventive concept, it can be advantageous if an operating point or the existing operating condition of a torque transmission system and/or of a combustion engine is ascertained on the basis of condition values determined or calculated from measurement signals, such as in dependency upon the engine RPM and the throttle valve angle, in dependency upon the engine RPM and the fuel throughput, in dependency upon the engine RPM and the inlet manifold underpressure, in dependency upon the engine RPM and the injection time or in dependency upon the temperature and/or friction value and/or slip and/or the load lever and/or the load lever gradient.

In a torque transmission system with a combustion engine mounted at the input side, it is of advantage if the input torque of the combustion engine can be determined from at least one of the condition values of the operating point, such as the engine RPM, throttle valve angle, fuel throughput, inlet manifold underpressure, injection time or temperature.

Still another embodiment of the method proposes that the torque $M_{AN}*K_{ME}$ which is applied at the input side of the torque transmission system is influenced and/or altered with a dependency taking into account the dynamics of the system, the dynamics of the system being adapted to be caused by the dynamic behavior as a result of the mass moment of inertia and/or free angles and/or damping elements.

It can be advantageous to provide means which purposefully restrict or influence the dynamics of the system.

Similarly, it can be advantageous if the dynamics of the system are realized to influence $M_{AN}*K_{ME}$ in a form corresponding to that of gradient restriction.

The gradient restriction can be realized as a limitation of a permissible increment.

Furthermore, it can be advantageous if the gradient restriction is realized in that the time-dependent change and/or the time-dependent increased intensity of a signal is compared with the maximum permitted slope or slope function and, when the maximum permissible increment is exceeded, the signal is replaced with a substitute signal which is incremented with a previously defined slope.

Furthermore, it can be advantageous if the influencing or restriction of the dynamics of the system is set up according to the principle of a timely dynamic and/or variable filter wherein the characteristic time constants and/or amplifications are time variable and/or dependent upon the operating point.

Advantageously, the dynamics of the system are taken into account and/or processed with a $PT_1$ filter.

It can likewise be advantageous if the dynamics of the system are characterized by a maximum restriction wherein, when a certain threshold value is exceeded, the desired value is represented by the threshold value and, consequently, the desired value does not exceed a maximum value which is represented by the threshold value.

Furthermore, it can be advantageous to connect in series at least two means for controlling the system, such as a gradient restriction and a filter stage.

It can likewise be advantageous to connect in parallel at least two means for influencing the dynamics of the system, such as a gradient restriction and a filter.

It is particularly advantageous if the dynamics of the combustion engine and the dynamics of the secondary consumers which cause a load distribution are taken into account when determining the driving torque $M_{AN}$. In such instances, it is especially advantageous if the mass moments of inertia of the utilized flywheel masses and/or elements are resorted to in order to take into account the dynamics of the combustion engine.

It can likewise be advantageous if the injection behavior of the combustion engine is relied upon and/or forms the basis for the consideration of the dynamics of the combustion engine.

It is likewise within the scope of the controlling method according to the invention to compensate for deviations from the ideal state long-term by taking into consideration the secondary consumers and/or the correction and/or the compensation for disturbances and/or sources of disturbances.

It can be advantageous if the torque being applied at the input side of the torque transmission system is detected and/or calculated as a difference between the engine torque $M_{mot}$ and the sum of the torques taken up or branched off by the secondary consumers. For example, the secondary consumers to be considered can include the climate control and/or the dynamo and/or the servo pumps and/or the steering aid pumps.

According to the inventive concept, it can be advantageous if system condition values, such as the engine RPM and the throttle valve angle, the engine RPM and the fuel throughput, the engine RPM and the inlet manifold underpressure, the engine RPM and the injection time, the engine RPM and the load lever are used to determine the value of the engine torque $M_{mot}$.

Furthermore, it can be advantageous if system condition values are relied upon to ascertain the engine torque $M_{mot}$ from a characteristic field of the engine. Analogously, it can be advantageous if system condition values are used to determine the engine torque $M_{mot}$ and the engine torque is determined through the solution of at least one equation or an equation system. The solution of the equation or the equation system can be carried out numerically and/or can be ascertained from the characteristic field data.

Furthermore, it can be advantageous if the torque takeup resp. the load distribution of the secondary consumers is determined from measured values, such as voltage and/or current measured values of the dynamo and/or switch-on signals of the relevant secondary consumers and/or other signals indicating the operating condition of the secondary consumers.

Furthermore, it can be advantageous if the torque takeup of the secondary consumers is determined by means of measured values from the characteristic fields of the relevant secondary consumers. Likewise, the torque takeup of the secondary consumers can be determined by solving at least one equation or an equation system.

According to the inventive concept, it can be expedient if the corrected transmittable clutch torque can be determined according to the torque equation $$M_{KSoll} = K_{ME} * (M_{AN} - M_{Korr}) + M_{Sicher}$$

and the correction torque $M_{Korr}$ is obtained from a correction value which is dependent upon the sum of torques taken up or branched off by the secondary aggregates.

Furthermore, it can be advantageous if a correction is carried out for disturbances or breakdowns which influence measurable system input values.

It can be particularly advantageous for the novel method if measurable disturbance factors are detected and/or identified and are at least partially compensated for and/or corrected through a parameter adaption and/or a system adaption. Furthermore, it can be advantageous if one utilizes measurable system input values in order to identify disturbance or breakdown values and/or to correct and/or to compensate at least partially for such values through parameter adaption and/or system adaption.

In order to identify a disturbance value and/or to correct the same by means of a parameter adaption and/or system adaption and/or to compensate for the same, at least in part, it is possible to use as parameters certain system input values such as for example temperatures, RPM, friction value and/or slip.

It can be particularly advantageous for the method if a compensation and/or correction of measurable disturbance factors is carried out through adaption of the characteristic field of the engine.

In such instances, it may very well be the case that one observes or registers a disturbance or breakdown value which need not be causally connected with the characteristic field of the engine but a correction of such disturbance value through an adaption of the characteristic field of the engine can be advantageous. In such instance, the cause of the disturbance is not corrected or compensated for.

Furthermore, it can be of advantage if a correction field of characteristic lines is established on the basis of a comparison between the desired clutch torque and the actual clutch torque, and a correction value is or can be ascertained for each operating point; such correction value is linked, additively and/or multiplicatively, with the value of the engine torque from the characteristic field of the engine.

Furthermore, it can be particularly expedient if, in view of a deviation detected at an operating point between the desired value and the actual value, analyses and/or undertakings are introduced in order to calculate and/or establish deviations and/or correction values at other operating points of the entire operating range.

Furthermore, it can be advantageous if, in the light of a deviation detected at an operating point, one introduces analyses and/or measures in order to calculate or establish deviations and/or correction values at other operating points of a limited operating range. As concerns the method, it can be of advantage if the limited operating ranges are set up in dependency upon the characteristic field.

Advantageously, an embodiment of the invention can be characterized in that the analyses and/or undertakings for the determination and/or calculation of deviations and correction values at the additional operating points take into account the entire operating range or a restricted operating range.

Furthermore, it can be advantageous if the analyses and/or undertakings for the calculation of deviations and/or correction values at the further operating points embrace only partial areas around the actual operating point. It can be particularly advantageous if the analyses and/or undertakings for the determination and/or calculation of deviations and/or correction values are carried out at the further operating points in such a way that weighting factors evaluate or emphasize different portions of the entire operating range in different ways.

It can be advantageous if the weighting factors are selected and/or calculated as a function of the operating point. It can likewise be advantageous if the weighting factors can depend upon the type of the disturbance or breakdown value and/or upon the cause of the breakdown.

Furthermore, it can be particularly advantageous if, upon completed determination of the correction value and/or subsequent to weighting of the characteristic correction field, a time behavior is impressed upon the correction value. For example, such time behavior may take into account the dynamic behavior of the system.

It can be advantageous if the time behavior is determined through a pulse frequency, a scanning of the correction value and/or if the time behavior is determined by at least one digital and/or analog filter.

It can be particularly advantageous in an embodiment of the invention if the time behavior is varied for different breakdown values and/or different breakdown sources, namely in the event of using a relevant filter the parameters of the filter are set in dependency upon the nature and the manner of action of the breakdown source. Thus, the time constants and amplifications of the filters conform to the respective breakdown sources in order to guarantee an at least substantially optimal adaption.

It can be advantageous if the time behavior is selected in dependency upon the value of the corrections. It can be particularly advantageous if the driving torque is adapted with an adaption method with greater or smaller time constant than the time constant of the adaption method of the clutch torque. It is advantageous if the time constant is within a range of between 1 second and 500 seconds, but preferably within a range of between 10 seconds and 60 seconds and most preferably within a range of between 20 seconds and 40 seconds.

In accordance with a further embodiment, it can be expedient if the time constant is dependent upon the operating point and/or if the time constant is selected and/or ascertained differently for different operating ranges. Furthermore, it can be of advantage if a compensation for and/or correction of measurable breakdown values is carried out through adaption of the inverse transfer function of the transmission unit with setting member.

A further advantageous embodiment of the method provides that indirectly measurable breakdown values, such as especially the aging and/or straying of individual component parts of the torque transmission system are detected in that some characteristic values of the torque transmission system are monitored and the actually disturbed parameters are detected and corrected in dependency upon such monitoring and/or virtual breakdown sources can be put to use in the form of program modules in order to correct and/or compensate for the influence of the breakdown values.

Furthermore, it can be advantageous if disturbances from non-measurable influence values, the straying of individual component parts and/or the aging are detected and/or compensated for through deviations from condition values of the system. Furthermore, it can be advantageous if disturbances or breakdowns, such as straying or aging or other non-measurable influence values, are not detected from measurable input values but are recognized only by observing reactions of the system.

It can likewise be advantageous if the deviations from system condition values or condition values and/or observations of system reactions are measured directly and/or calculated from other measured values in a method model. It can likewise be advantageous to carry out the detection of deviations from calculated method models by resorting to characteristic reference fields and/or unequivocal characteristic reference values of the system.

Another advantageous further development of the invention provides that, for the correction and/or for the compensation of a detected disturbance or breakdown from non-measurable input values a breakdown source be localized and/or a breakdown source be fixed and the deviations at these breakdown sources be corrected and/or compensated for. Furthermore, it can be expedient if, for the correction of and/or for the compensation for a detected breakdown, one fixes a fictional breakdown source which need not have a causal connection with the breakdown and at which the detected deviation is corrected.

Advantageously, the fixed breakdown source can be an actually existing function block and/or the fixed breakdown source can constitute a virtual breakdown model whilst preserving the correcting action.

According to a further development of the invention, the timely progress of the actual clutch torque is monitored and analyzed to ascertain whether conclusions regarding the type of error and/or the detection of the breakdown source and/or the localization of the breakdown source can be arrived at.

Furthermore, it can be advantageous to permanently carry out the adaptive correction of the breakdown value.

A further advantageous embodiment proposes that the adaptive correction of the breakdown values be carried out only at certain operating points and/or within certain operating ranges and/or time ranges.

Furthermore, it can be advantageous if the adaption can be active when the control is inactive. In this context, "inactive" can denote that the control does not engage in or cause or carry out any activity of the setting member since, for example, an operating range is selected or actually exists in which a torque follow-up is not carried out but, instead, a stationary value is set. In this operating range, one can carry out an adaption of the parameter without carrying out an active control.

Furthermore, it can be advantageous if the adaption is not carried out within special operational ranges, especially in the event of pronounced acceleration.

It can be expedient if, within the operating ranges of inactive adaption, one utilizes correction values of the setting values which were detected within the previously determined operating ranges of active adaption. Furthermore, for such procedure, it may be expedient if the previously detected values for an adaption are stored in an intermediate memory and can be addressed in situations of a deactivated adaption.

In a further embodiment of the invention, it may be expedient if, within the operating ranges of inactive adaption, one applies correction values of the breakdown values which can be extrapolated with active adaption from correction values in previously detected operating ranges.

In accordance with a further method according to the invention, it can be expedient if one adopts virtual breakdown models and/or virtual breakdown values for the areas of the engine torque and/or for the area of the net engine torque, after taking into account the secondary consumers, and/or for the desired clutch torque.

Furthermore, it can be advantageous if one introduces and/or employs the inverse transfer function of the transmitting unit with setting member as a virtual breakdown source.

Furthermore, it can be expedient if the characteristic field of the engine is used as the virtual breakdown source.

It is particularly advantageous if virtual breakdown sources are used to define breakdown values whose original causes cannot be localized, such as for example straying in the region of manufacturing tolerances of the individual component parts.

A further novel concept of the invention relates to a method of controlling a torque transmission system with or without load distribution wherein the clutch torque adapted to be transmitted from an input side to an output side of the torque transmission system is used as a control value and such control value is put to use by means of a setting member to which is assigned a setting value which is functionally dependent upon the transmittable clutch torque, so that the transmittable clutch torque always lies within a predetermined tolerance band around the slip limit, and the slip limit is reached at the exact time when the action of the torque developing at the input side exceeds that clutch torque which can be transmitted by the torque transmitting parts.

Furthermore, it can be advantageous if the setting member is assigned as a setting value a value which corresponds to the clutch torque adapted to be transmitted between the torque transmitting parts of the torque transmission system.

A further expedient development of the invention proposes that the setting value be determined in dependency upon a transmittable clutch torque and that, in order to calculate such transmittable clutch torque, one establishes a difference between the value of the driving torque and a correction value wherein the correction value is increased or reduced in dependency upon at least one condition value of the torque transmission system.

Furthermore, it can be expedient if the correction value is determined in dependency upon a differential RPM between an input RPM and an output RPM, designated slip RPM, the correction value being increased as long as the slip RPM is below a predetermined threshold slip value and the correction value being reduced as long as the slip RPM is above such or another predetermined threshold slip value.

Furthermore, it can be of advantage if the correction values are increased incrementally as long as the slip RPM is below the one threshold slip value and the correction value is reduced stepwise as long as the slip RPM is above the one or another threshold slip value. Stopping phases of adjustable length are provided between the relevant stages and, during each stopping stage, the correction value is kept constant at a value set at the outset of each stopping stage.

Furthermore, it can be advantageous if the times during which the input RPM exceeds the output RPM by a defined slip RPM are recognized as the slip phase and at the end of each slip phase the correction value is set again to a definite value.

An advantageous embodiment of the invention proposes that the times during which the input RPM exceeds the output RPM by a definite slip RPM be recognized as slip phases, and that the relevant correction value at which the slip RPM assumes its maximum value be stored in an intermediate memory and at the end of a slip phase the actual correction value be again replaced by the stored correction value.

It can likewise be advantageous if the correction value be kept constant at its relevant value for a fixable interval of time at the end of each slip phase. According to another embodiment of the invention, it can be advantageous if the setting member is assigned a preset value in dependency upon a characteristic field or a characteristic line which embraces the area of all transmissible clutch torques or has at least one partial area within which only one preset value is allocated for the setting member for all transmissible clutch torques.

Furthermore, it can be advantageous that, in order to calculate the transmissible clutch torque, one forms a difference between an input torque value and the correction value, and this difference is increased by a torque value which is dependent upon slip.

According to a further embodiment of the invention, it may be of advantage if the rise of the actual clutch torque is restricted in the form of a gradient restriction in that the relevant actual value of the transmissible clutch torque is compared with a comparison torque value which consists of a previously detected transmissible clutch torque value and an additive fixable limiting value and that, in dependency upon such comparison, the smaller torque value is assigned to the setting member as the new preset value.

It can be particularly advantageous if several condition values, such as for example the engine RPM, throttle valve angle and/or suction intake pressure, are ascertained from a combustion engine mounted at the input side of the torque transmission system and the input torque of the combustion engine is detected from these condition values by means of stored characteristic lines or characteristic line fields. Furthermore, the invention proposes that eventual branchings of output between the drive and the torque transmission system be monitored at least partially or at least temporarily and the thus obtained measured values be used to calculate the input torque actually arising at the input side of the torque transmission system.

It can be advantageous if each time a part of the input torque corresponding to a proportion factor be used to calculate the transmissible clutch torque and if such proportion factor is determined each time from the stored characteristic line fields or characteristic lines.

Furthermore, it can be expedient if, with torque transmission systems without load distribution, a load distribution is reconstructed through a slave control program.

According to the inventive concept, it can be advantageous if measurable breakdown values, such as in particular temperatures and/or RPM, are detected and are compensated for at least partially through a parameter adaption and/or through a system adaption.

An expedient further development proposes that indirectly measurable breakdown values of the control method, such as in particular aging and/or straying of individual component parts of the torque transmission system, be detected by monitoring some condition values of the torque transmission system and, in dependency upon such monitoring, the actually affected parameters are recognized and corrected and/or virtual breakdown sources which can be switched on in the form of program modules are used in order to correct and/or compensate for the influence of the breakdown values.

Furthermore, it can be advantageous if a first engagement of the clutch is made possible only subsequent to checking of the authority of the user.

It can likewise be advantageous if a display, such as a user display, is controlled in dependency upon the status of the control method in such a way that a switching recommendation is given for the user. This switching recommendation can be carried out through the display in an optical manner or, alternatively, in an acoustic manner.

It can also be advantageous if phases of idleness, particularly of a vehicle, are recognized by monitoring significant operating values, such as accelerator pedal and/or gear linkage position and/or tacho RPM and, upon elapse of a defined time period, the driving unit is arrested and restarted when necessary.

Furthermore, it can be advantageous if operating phases of the torque transmission system with minimal or without load takeoff are recognized as freewheel phases and if the clutch is disengaged during such freewheel phases and is reengaged at the end of the freewheel phase. The end of the freewheel phase can cake place or can be recognized, for example, through a detected change of the position of the load lever and/or of the load lever gradient.

According to a further embodiment of the invention, an antiblocking system can be assisted by applying the control method in such a way that, when the ABS system is active, the clutch is completely disengaged.

Furthermore, it can be advantageous if the setting member is controlled within certain operating ranges after actuation of the antislip control.

The invention not only relates to the aforedescribed method of controlling a torque transmission system but also relates especially to a torque transmission system for the transmission of torque from an input side to an output side wherein an internal combustion engine, such as a motor, is disposed at the input side and a gearbox is disposed at the output side and the torque transmission system has a clutch, a setting member and a control device.

Furthermore, the invention relates to a torque transmission system which can be controlled by means of the method described above and serves to transmit torque from an input side to an output side, wherein the output of the torque transmission system is connected in the power flow of a driving unit, such as a combustion engine, and a variable-transmission device, such as a gearbox, is installed in the power flow at the upstream or at the downstream side, and the torque transmission system comprises or contains a clutch and/or a torque converter with lockup clutch and/or a starting clutch and/or a turning set clutch and/or a safety clutch for limiting the transmissible torque, a setting member and a control device.

According to the inventive concept, it can be particularly advantageous if the clutch is a self-adjusting or self resetting clutch.

It can be equally advantageous if the clutch automatically adjusts or compensates for wear, for example, upon the friction linings.

According to the inventive concept, it can be of advantage in actual practice of the invention if, in order to transmit the torque from an input side to an output side, the torque transmission system have a clutch, a setting member and a control unit wherein the clutch is operatively connected with the setting member through a hydraulic conduit which contains a slave clutch cylinder and the setting member is actuated by the control unit.

A further advantage resides in the utilization of a setting member having an electric motor which acts through an eccentric upon a hydraulic master cylinder which is attached to the hydraulic conduit which, in turn, is connected to the clutch, a clutch path sensor being mounted in the housing of the setting member.

In order to achieve a compact and flexible solution for the arrangement of the device according to the invention, it is advantageous if the electric motor, the eccentric, the master cylinder, the clutch path sensor and the required control and load electronics are mounted in the housing of the setting member.

It can likewise be of advantage if the axes of the electric motor and of the master cylinder are mounted to extend in parallelism with each other. It is particularly advantageous if the axes of the electric motor and of the master cylinder are mounted to extend in parallelism with each other in two different planes and are operatively connected to each other by the eccentric.

It can furthermore be of advantage if the axis of the electric motor extends in parallelism with a plane which is formed essentially by the board of the control and output electronics.

According to a further development of the novel torque transmission system, the mode of operation of the transmission system can be optimized by mounting a spring concentrically with the axis of the master cylinder in the housing for the setting member.

Furthermore, it can be advantageous if a spring is mounted in the housing of the master cylinder concentrically with the axis of the master cylinder.

It can be advantageous for the functioning of the apparatus according to the invention if a characteristic curve of the spring is selected in such a way that the maximum force to be applied by the electric motor to engage and disengage the clutch is approximately the same in the pull and push directions.

Furthermore, it can be advantageous if the characteristic curve of the spring is designed in such a way that the resulting progress of the forces acting upon the clutch is linearized during disengagement and engagement of the clutch. According to a further development, the power requirement and thus the size of the electric motor is minimized. Those forces which are required for the disengagement of the clutch are decisive for the dimensioning of the electric motor to be used since a greater force is needed for the disengagement than for the engagement of the clutch because the force of the spring assists the disengagement and, therefore, one can use a weaker electric motor.

By using a spring within the master cylinder piston, no additional space is required for the spring.

Furthermore, it can be of advantage if the electric motor having a motor output shaft acts upon a segment wheel through a worm and the segment wheel carries a crank which is operatively connected with the piston of the master cylinder by a piston rod in such a way that it is possible to transmit pushing and pulling forces.

It can likewise be of advantage if the worm and the segment wheel constitute a self-locking transmission.

The invention does not, however, relate only to the aforedescribed method of controlling a torque transmission system and to the torque transmission system itself, but also encompasses a monitoring method for a torque transmission system with a manually actuatable gearbox, wherein relevant gear lever positions and an input torque of a driving unit at the input side are detected with a sensor system and at least one corresponding gear lever signal and at least one comparison signal are recorded and different possible characteristics of the progress of these signals, such as for example a difference, are recognized and identified as the switching intention and a switching intention signal is then transmitted to a clutch operating system at the output side.

As concerns the inventive concept, it can be advantageous if at least one progress of the gear lever signal is evaluated to detect the selected gear and such information is used to identify a switching intention.

The monitoring method ascertains the gear which is engaged at that time, and such information can be used to determine the comparison signal.

In this manner, one provides a method with which an eventual switching intention of the user is recognized at a high speed and in a highly reliable manner without it being necessary to use a specific sensor. A predominantly automated torque transmission system requires early information regarding a possible switching intention in order to disengage the clutch in good time.

It can be advantageous if a gear lever signal and a comparison signal are evaluated in such a way that intersecting points of these signal paths are detected and then a switching intention signal is transmitted to the clutch operating system at the output side. If, in order to detect the switching intention, only two signal paths are investigated or evaluated for intersecting points, there is no longer any need for expensive software or hardware.

According to the inventive concept, it can be advantageous if, with the switching gearbox, a selection path is differentiated between the switching lanes and a switching path within the switching lanes. The switching path and/or the selection path can be monitored in order to determine the relevant gear lever position.

Also, there is no need for additional sensor systems for the generation of the comparison signal since, as a rule, the single input value (namely the input torque) can already be determined. Since the comparison signal is formed from a filter signal wherein the filter signal is intensified and/or weakened by a constant value and an offset signal, it is practically ensured that the gear lever signal and the comparison signal intersect only if a switching intention actually exists.

In accordance with an advantageous further development, the existence of a switching intention is detected during monitoring of the two signal paths of the gear lever signal and the comparison signal if an intersection point is detected and, at such time, the switching intention is verified by means of a switching intention counter. With the claimed switching intention counter, one ensures that a definite interval of time elapses between the realization of the switching intention and the transmission of the switching intention signal, and such interval of time suffices to ascertain whether a switching operation is actually initiated. In this manner, the torque transmission system is effectively protected against an unintentional release.

The gear lever signal is filtered with an adjustable time delay in order to generate a filter signal.

It can be particularly advantageous if the gear lever signal can be processed to form the filter signal with a $PT_1$ characteristic.

Furthermore, it can be advantageous if the gear lever signal is monitored and a change of the switching path within a defined portion of the gear lever path is evaluated within a fixable measuring period in such a way that a switching intention signal is transmitted to devices at the output side when a fixable switching path change threshold is not reached.

The gear lever signal, which is used to ascertain the existence of a switching intention, which in turn is passed on, can be tuned by means of individually adjustable filters, which are universally usable through filter parameters, in such a way that a wide variety of torque transmission systems can be monitored by resorting to the same method. It is advantageous if the measuring period is fixed in such a way that it is always clearly greater than a half vibration period resp. vibration amplitude of the gear lever which is not actuated during operation of the vehicle.

It can be expedient if the defined portion of the gear lever path is outside of the gear lever path areas within which the non-operated gear lever moves when the vehicle is in operation.

In order to practice the method according to the invention, it is necessary as a rule to average the gear lever vibration periods. In this manner, the duration of the measuring period can be fixed in dependency upon the formation of average value of the gear lever vibration period.

In accordance with a further development, one can ascertain whether the gear lever vibrates freely during operation of the vehicle or has a different vibration behavior, especially when a hand is placed thereon. The mean value formation to determine the length of the measuring periods is carried out in dependency upon the results of such monitoring.

According to a further development of the invention, it can be advantageous if the direction of movement of the gear lever is detected and when such direction of movement is reversed, a control signal is transmitted to the switching intention counter and/or an already transmitted switching intention signal is rescinded.

In this manner, the direction of movement of the gear lever is additionally observed and a reversal of such direction of movement entails a rescinding of a switching intention signal which would otherwise be transmitted as a result of vibration of the gear lever.

Furthermore, it can be advantageous if the constant value for the generation of the comparison signal is selected in dependency upon the typical operating vibration amplitude of the non-operated gear lever of the torque transmission system.

It can likewise be advantageous if the delay time with which the filter signal is generated is caused to conform to the vibration frequency of the gear lever which is not actuated during operation of the vehicle.

In accordance with the inventive concept, it can be particularly advantageous for a control method if the driving load is monitored and, on exceeding a fixable driving load, a control signal is transmitted to the switching intention counter. In this manner, one can prevent that, in the event of an increased torque at the engine side, the clutch is unintentionally disengaged or engaged. It can likewise be advantageous if the offset signal is applied in dependency upon the relevant throttle valve angle in a combustion engine which is used as the driving unit.

In accordance with the inventive concept, it is expedient if the switching or selection path of the gear lever is ascertained by a potentiometer. It can likewise be advantageous if the switching and/or selection path of the gear lever is ascertained by a potentiometer in such a way that the gear setting can be recognized by the potentiometer.

However, the invention does not relate only to the afore-discussed method of controlling a torque transmission system but also encompasses those processes for controlling a torque transmission system having a device for controlling the torque transmission system, the torque transmission system is mounted at the output side in the power flow of a driving unit and at the input and/or output side in the power flow of a variable transmission device, the variable transmission device being provided with endless flexible means which transmit torque from a first means to a second means, the first means being operatively connected with the input shaft of a gearbox and the second means being operatively connected with an output shaft of the gearbox, the endless flexible means is in frictional contact with the first and the second means through contact pressure or tensioning and the contact pressure or tensioning of the endless flexible means being controlled in dependency upon the operating point, characterized in that the torque transmission system is started with follow-up torque, namely with a transmissible torque which is dimensioned at each operating point in such a way that the endless flexible means of the variable transmission device does not begin to slip. This means that the slip limit of the torque transmission system is controlled at each operating point so that the slip limit of the endless flexible means is always greater and if the applied torque is excessive, the torque transmission system always begins to slip before the endless flexible means slips.

Furthermore, it can be advantageous if the contact pressure and/or tensioning of the endless flexible means is determined and applied at each operating point in dependency upon the applied engine torque and/or the load distribution or branching off regarding the secondary consumers and an additional safety tolerance and the transmissible torque of the torque transmission system is controlled in dependency upon the operating point and the torque transmissible by the torque transmission system entails, in the event of torque fluctuations, slippage of the torque transmission system before the slip limit of the endless flexible means is reached.

It is particularly expedient if the slip limit of the torque transmission system at each operating point is lower than the slip limit of the endless flexible means of the variable transmission device.

In accordance with the novel concept, it can be of additional advantage if the torque transmission system with its slip limit dependent upon the operating point isolates and/or damps torque fluctuations and torque surges at the input side and/or at the output side and protects the endless flexible means against slip. Thus, the endless flexible means is protected against slippage because the slippage under the above outlined circumstances could lead to destruction of the endless flexible means and thus to a breakdown of the gearbox.

According to the inventive concept, it is expedient to control the contact pressure or the tensioning of the endless flexible means in dependency upon the operating point and, in addition to the applied torque, to take into account a safe reserve which can be caused to approximate and/or to conform to the transmissible torque through the selection of the transmissible torque of the torque transmission system. The adaptation of safety torque can be carried out in this case in such a way that the selected safety reserve can be less than in accordance with prior art proposals.

It can be particularly advantageous if the safety reserve of the contact pressure or tensioning is as low as possible as a result of protection of the torque transmission system against slip.

It is particularly expedient if the torque transmission system slips or slides only briefly in the event of torque surges. It is thus possible to isolate or damp or filter torque surges at the input side or at the output side; such surges may occur in extreme driving situations and could damage or destroy the endless flexible means.

The invention relates not only to the aforedescribed method but also to an apparatus, such as a variable transmission device, which is controlled in accordance with the aforementioned method and wherein the variable transmission device can be an infinitely adjustable gearbox. It may be especially advantageous if the variable transmission device is an infintely adjustable cone pulley belt contact gearbox. It can also be particularly advantageous if the torque transmission system which is part of the apparatus is a friction clutch or a converter lockup clutch or a turning set clutch or a safety clutch. The clutch can be a dry clutch or a wet clutch. Furthermore, it may be expedient to provide a setting member which controls the transmissible torque and is controlled electrically and/or hydraulically and/or mechanically and/or pneumatically, or the actuation of the setting member is effected by a combination of these undertakings.

The invention does not relate only to the aforedescribed methods but especially also to an apparatus with at least one sensor for the detection of the effective gear ratio or the engaged gear of a gearbox, a central computer unit being provided to process the sensor signals and to calculate the gearbox input speed. For such calculation, it is further necessary to take into consideration the transmission ratios, such as the transmission ratios of the differential.

It can be of advantage if the ascertained rotational speeds of the wheels are averaged and the thus obtained averaged signal is utilized to ascertain or to calculate the gearbox input RPM by taking into consideration the transmissions in the power train and the transmission ratio of the gearbox.

It is of advantage if the rotational speed of the wheels is ascertained by utilizing one to four sensors, and is particularly advantageous if one employs 2 or 4 sensors.

The apparatus can be constructed in a particularly advantageous manner and way if the sensors which serve to detect the rotational speeds of the wheels are in signal transmitting connection with the antiblocking system or constitute component parts of an antiblocking system.

The invention will be explained in greater detail with reference to an embodiment in the vehicle industry.

BRIEF DESCRIPTION OF THE DRAWINGS

There are shown in:

FIG. 1a a block diagram of a torque transmission system with load distribution,

FIG. 1b a block diagram of a torque transmission system without load distribution wherein a fictitional load distribution is copied through a slave control program, FIG. 2a to 2e diagrammatic illustrations of different physical to 2e properties of a torque transmission system as a function of the torque division factor $K_{ME}$; 2a: acoustics as a function of $K_{ME}$; 2b: thermal stressing as a function of $K_{ME}$; 2c: pulling force as a function of $K_{ME}$; 2d: fuel consumption as a function of $K_{ME}$; 2e: load change behavior as a function of $K_{ME}$, FIG. 3 a block diagram or a signal diagram of a control method with adaption, FIG. 4 a block diagram or a signal diagram of a control method with adaption, FIG. 5a to 5c the effect of disturbance values upon the torque to 5c as a function of time; a: additive interference through, e.g., additional aggregates; b: multiplicative interferences; c: additive disturbance values, FIG. 6 a characteristic correction field of engine torque as a function of the engine torque and the RPM, FIG. 6a a diagrammatic illustration of a breaking up of a characteristic field, FIG. 6b a diagrammatic illustration of a breaking up of a characteristic field, FIG. 7 a block diagram for the control method with adaption, FIG. 8 a block diagram for a control method with adaption, FIG. 9 a block diagram for a control method with adaption, FIG. 10 a diagrammatic illustration of a vehicle with a torque transmission system, FIG. 11a a longitudinal sectional view through a setting member unit of a torque transmission system, FIG. 11b a cross sectional view of the setting member unit at III, FIG. 12a a longitudinal sectional view of a setting member unit in a torque transmission system, FIG. 12b a cross sectional view of the setting member unit at IV, FIG. 13 a force diagram showing the behavior of the setting member, FIG. 14 a diagram for the determination of a clutch torque, FIG. 15 a characteristic line field for the determination of the position of a setting member, FIG. 15a to 15e diagrams of the positioning of the setting member as a function of time, FIG. 16 a circuit diagram of a manual gearbox, FIG. 17 a signal diagram for detecting the switching intention, FIG. 18 a signal diagram for the generation of a comparison signal, FIG. 19 a further signal diagram for ascertaining the switching intention, FIG. 20 a signal diagram for verification of the detection of the switching intention, FIG. 21 a functional diagram of an electrohydraulically controlled torque transmission system, FIG. 22 a characteristic curve, FIG. 23 a block circuit diagram, FIG. 24 the progress of a signal as a function of time, FIG. 25 the progress of a signal as a function of time, FIG. 26 the progress of a signal as a function of time, FIG. 27 the progress of a signal as a function of time, FIG. 28 a characteristic curve with support position adaption, FIG. 29a a gearbox with a torque transmission system disposed at the input side, and FIG. 29b a gearbox with a torque transmission system disposed at the output side.

DESCRIPTION OF PREFERRED EMBODIMENTS

Figure 6A:
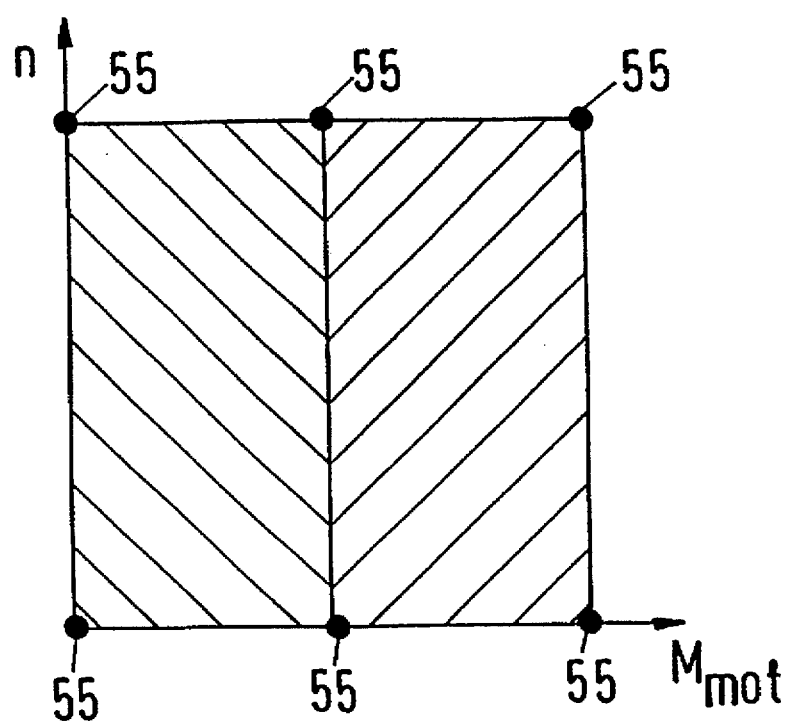

Each of the FIG. 1a and 1b is a diagrammatic illustration of a portion of a power train in a vehicle wherein a driving torque is being transmitted by an engine 1 with a mass moment of inertia 2 to a torque transmission or transmitting system 3. The torque which can be transmitted by the torque transmitting system 3 can be transmitted, for example, to a downstream part in a gearbox, such as an input part, and such part is not explained in detail.

FIG. 1a is a diagrammatic illustration of a torque transmission system 3 with load branching or distribution or splitting wherein, for example, a Föttinger clutch or a hydrodynamic torque converter 3a is disposed in the power flow and is connected in parallel with a converter lockup clutch 3b. A control unit regulates the operation of the torque transmission system 3 in such a way that, at least under certain operating conditions, the applied torque is transmitted substantially in parallel, either only by the hydrodynamic torque converter 3a, only by the Föttinger clutch or the converter lockup clutch 3b, or simultaneously by the two torque transmitting services 3a, 3b.

In some of the operating ranges, it may be desirable to resort to intentionally transmittable torque between the selected parallel torque transmission devices 3a, 3b and can be carried out accordingly. The ratio of the torque being transmitted, for example, by the converter lockup clutch 3b and the hydrodynamic torque converter can be caused to conform to specific requirements within the individual operating ranges.

FIG. 1b is a diagrammatic illustration of a torque transmission system 3 without load distribution. A torque transmission system 3 of such kind without load distribution can constitute, for example, a clutch, such as a friction clutch and/or a turning set clutch and/or a starting clutch and/or a safety clutch. A slave control program copies a fictitious load distribution and controls the torque transmission system accordingly.

The diagrammatic sketches or block diagrams which are shown in FIGS. 1a and 1b and form part of a partially illustrated power train, with the torque transmission system 3 mounted in the power flow at the input side with or without load distribution, merely constitute examples of possible arrangements or designs of torque transmission systems.

Furthermore, it is also possible to employ arrangements of torque transmission systems wherein the selected torque transmission system can be mounted in the power flow upstream or downstream of the component part or parts determining the transmission ratio of the gearbox. Thus, for example, a torque transmission system (such as a clutch) can be mounted in the power flow upstream or downstream of the variator of an infinitely adjustable cone pulley belt contact gearbox.

An infinitely adjustable gearbox, such as an infinitely adjustable cone pulley belt contact gearbox, can likewise be realized with a torque transmission system mounted at the input side or at the output side.

Systems with load distribution of the character shown in FIG. 1a, such as a hydrodynamic torque converter 3a with lockup clutch 3b, can be controlled by a control method according to the invention in such a way that the torque which can be transmitted by the individual parallel-connected torque transmission systems, such as the torque converter 3a and the lockup clutch 3b, is adapted to be started or controlled. As a rule, the transmission of torque to be transmitted by one of the two torque transmission systems which are arranged in parallel is started and the torque which is to be transmitted by the torque transmission system connected in parallel therewith is set automatically.

As a rule, in torque transmission systems with more (N) than two parallel-connected transmission systems, the torques which can be transmitted must be controlled by (N-1) transmission systems and the transmittable torque of the (N-th) transmission system is then set automatically.

In systems without load distribution, such as, e.g., in a friction clutch, the transmission of torque can be initiated through a control loop, which underlies the control, in such a way that the control simulates a system with fictitious load distribution. The friction clutch 3c is adjusted by such control, e.g., to a desired value which is less than 100% of the transmissible torque. The difference between the thus selected desired torque and the 100% of entire transmittable torque is established by the controls through a slip-dependent safety clutch 3d. In this manner, one ensures that, on the one hand, the friction clutch is not engaged with a contact pressure higher than that which would be necessary for the transmission of the required torque and, on the other hand, due to the operation with slip, one can ensure a damping of torsional vibrations and peak values of torque, such as surges of the torque in the power train.

Within another stage of the operating range of the torque transmission system, it can be advantageous if the torque transmission system (such as a friction clutch or another clutch) is engaged with a low but well-defined overpressure or excessive contact pressure. Within these operating ranges (e.g., at high rotational speeds), it is now possible to avoid pronounced slip and to thus also avoid excessive consumption of fuel by the internal combustion engine.

With a contact pressure at about 110% of the applied averaged torque, it is possible to establish an intentional slip or sliding of the clutch in response to the development of short-lasting peak values of torque. Thus, a damping of the peak values can be achieved with a substantially engaged clutch.

Furthermore, it is possible to damp or insulate surges of torque having peak values by operating the clutch with only slight overpressure in order to establish a short-lasting slip or sliding of the clutch.

That parameter which is characteristic of the division of torque between the parallel-connected torque transmission devices of the torque transmission system 3 is the torque dividing factor $K_{ME}$ which is defined by the ratio of torque adapted to be transmitted by a clutch or another torque transmission device (such as, e.g., a converter lockup clutch) to the entire torque which can be transmitted by the torque transmission system.

The torque dividing or division factor $K_{ME}$ thus indicates the ratio of the transmissible torque, e.g., of that torque which can be transmitted by a clutch 3b, to the overall transmissible torque.

When the value of $K_{ME}$ is less than one, this indicates that the transmissible torque is divided between the parallel-connected devices 3a, 3b and the torque being actually transmitted by the device 3a or 3b is less than the overall applied torque or the overall torque to be transmitted.

When $K_{ME}=1$, the transmissible torque is being transmitted only by one of the parallel-connected devices 3a, 3b, especially by the clutch 3b. If the torque develops temporary peaks with values which are above the value of the transmissible torque, this can result in a slip or sliding of the clutch or of the torque transmission devices. However, if the operating range has no torque peaks, the entire torque is being transmitted by one of the devices 3a, 3b.

If the value of $K_{ME}$ exceeds one, the entire applied torque is likewise transferred by one device; however, for example, the contact pressure of the clutch corresponds to a transmissible torque which is greater than the applied torque. It is thus possible to filter off greater torque irregularities which lie above a threshold value and slight torque irregularities are not filtered.

A further advantage of a defined overpressure, as opposed to the completely engaged clutch, is the shorter reaction time of the system until, for example, the clutch is disengaged. The system need not disengage the clutch from the completely engaged condition but only from the actually existing condition. However, a slightly slower actuator can be used at the same interval of time.

FIGS. 2a to 2e illustrate the behavior of physical characteristics or physical values of torque transmission systems as a function of the torque division factor $K_{ME}$, with reference to a hydrodynamic torque converter with a converter lockup clutch. The plus and minus signs along the ordinates indicate more positive or more negative influences of the $K_{ME}$ factor upon the illustrated physical properties.

Figure 2A:
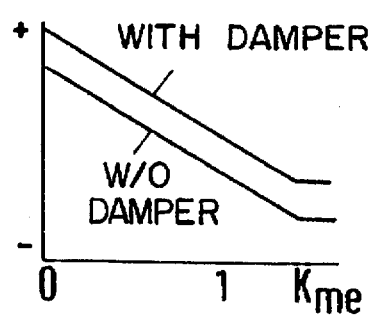

FIG. 2a shows the acoustic properties of the power train of a motor vehicle. The curves indicate the progress of torques being transmitted by a torque transmission system with a damper and the progress of torque being transmitted by a torque transmission system without a damper, as a function of $K_{ME}$. The curves for the two torque transmission systems, with and without damper, run parallel as a function of $K_{ME}$. The torque transmission system with a damper has a slightly improved quality regarding acoustics as compared with the torque transmission system without a damper. It can be seen that, as a function of the value of $K_{ME}$, when $K_{ME}=0$, the acoustics assume their most favorable value. With increasing $K_{ME}$, the acoustic properties drop monotonously until, at high $K_{ME}$ values, the acoustic properties show a transition to a value which is independent of $K_{ME}$.

Such behavior of the acoustic properties in dependency upon the torque division factor $K_{ME}$ can be explained through the increased uncoupling of the power train from the torque irregularities and torque peaks of the driving aggregate as a result of an increase of slip as a function of a reduced $K_{ME}$ value.

With decreasing slip in the torque transmission system and increasing $K_{ME}$, the torque irregularities in the drive train are transmitted more pronouncedly and the damping action is reduced simultaneously until, at a certain $K_{ME}$ value, the damping becomes minimal or no longer exists at all. Thus, a constant acoustic behavior can be arrived at as a function of a further rising $K_{ME}$ value. The $K_{ME}$ value at which a constant acoustic behavior is established as a function of the torque division factor is dependent upon the then existing characteristic of the power train. With characteristic systems, this value lies at about $K_{ME}=2$. At this value, the clutch of the torque transmission system is engaged to such an extent that practically each and every torque fluctuation is being transmitted.

Figure 2B:
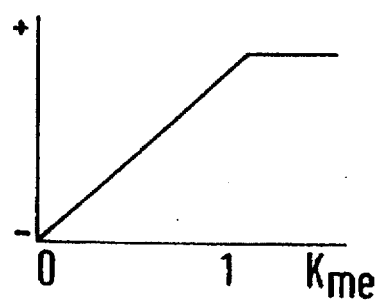

FIG. 2b shows the thermal stressing of a hydrodynamic torque converter with a converter lockup clutch as a function of the $K_{ME}$ value. The expression "thermal stressing" can denote, for example, the energy input into the system as a result of friction or as a result of different speeds of the component parts. More specifically, for example, one can take into consideration the energy input in a torque converter or into the fluid of a torque converter. Likewise, such term can denote the energy input into the friction faces of a converter lockup clutch and/or friction clutch.

The low value of the thermal stressing when $K_{ME}=0$ rises with an increased value of $K_{ME}$. The expression "thermal stressing" is intended to denote, inter alia, the energy input as a result of differences of RPM. With an increasing $K_{ME}$, the energy input decreases as a result of speed differences in the converter until, when $K_{ME}=1$, the converter lockup clutch is engaged and the RPM differences equal zero; therefore, the thermal stressing assumes its most favorable value. For $K_{ME} \geq 1$, the thermal stressing is constant and equal to the value for $K_{ME}=1$.

Figure 2C:
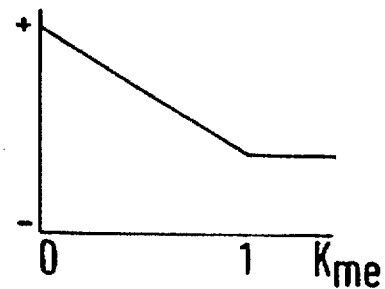

FIG. 2c shows the change of the pulling force which decreases as a function of a rising $K_{ME}$ value since, at a low $K_{ME}$ value, the conversion area of the torque converter is put to better use and/or the low $K_{ME}$ allows another, more favorable, operating point of the internal combustion engine to be achieved.

Figure 2D:
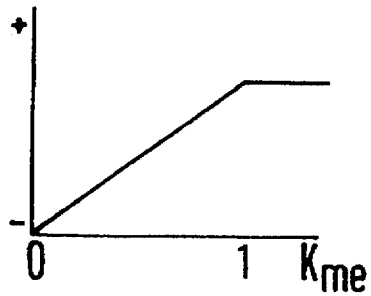

FIG. 2d shows the fuel consumption which becomes more favorable as the $K_{ME}$ value rises. Owing to a reduced slip, for example, in the range of the hydrodynamic torque converter, it is possible for the fuel consumption to be reduced with a clutch which becomes increasingly engaged as the $K_{ME}$ value rises.

Figure 2E:
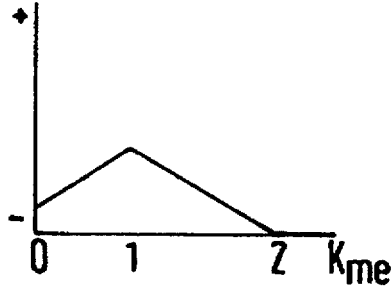

FIG. 2e shows the load change behavior as a function of the $K_{ME}$ value. The load change behavior is shown to be most satisfactory with $K_{ME}=1$, i.e., when a clutch engaged in this manner, the torque which can be transmitted by the clutch corresponds exactly to the applied torque.

Figure 3:
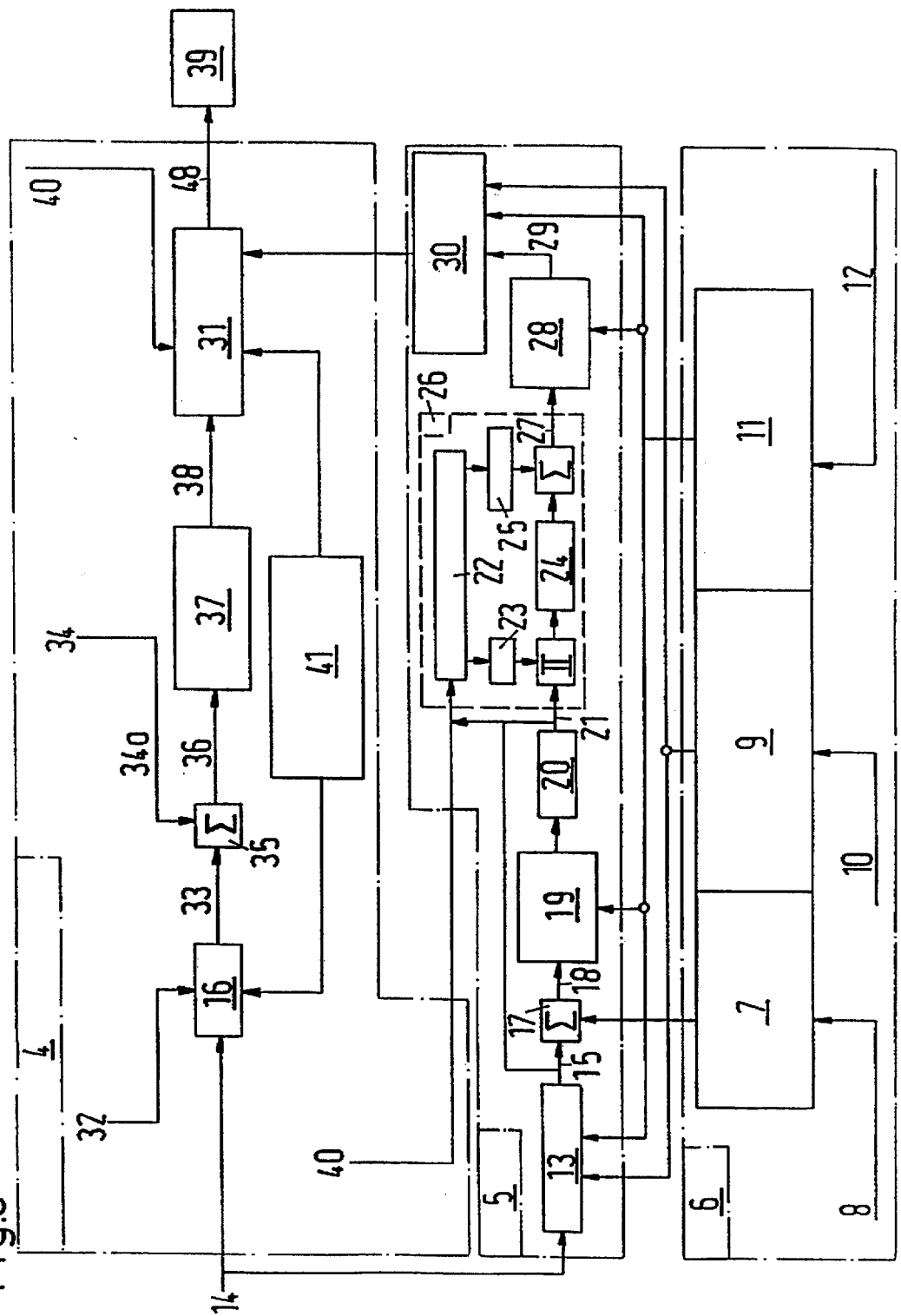

FIG. 3 is a diagrammatic illustration of a block circuit diagram of a control method. In this diagram, the setting member and the control circuit are denoted by a block 4. The control method 5 and the adaption 6 (system adaption and/or parameter adaption) can likewise be denoted by common blocks.

The control path with a setting member, or a transmission unit with a setting member 31, and the disturbances acting upon such system are denoted by the block 4. A driving assembly 16, such as an internal combustion engine or motor, transmits an engine torque $M_{mot}$ 33 in dependency upon the input values 14, such as for example the quantity of injected fuel, load lever, RPM of the driving aggregate, etc. or the characteristic system values 32, such as temperature, etc. The engine torque $M_{mot}$ 33 is branched off in part through secondary consumers 34, such as a dynamo, a climate control, servo pumps, steering aid pumps, etc. These secondary consumers are taken into account in the block 35 by subtracting the branched off torque 34a from the engine torque 33 to arrive at a resulting net torque 36.

The dynamics of the engine 16 and/or power train such as, e.g., as a result of the mass moment of inertia of the flywheel, are considered in the block 37. The dynamics can take into account especially the moments of inertia of the respective component parts and the effect of such moments of inertia upon the net input torque. The torque $M_{dyn}$ 38, which is corrected in view of the dynamics of the system, is transmitted through a transmission unit with a setting member or selector 31 and is transmitted from there as the actual clutch torque 48 to the gearbox or to the vehicle 39 connected to the output of the gearbox.

The transmission unit 31 with the setting member 31 is influenced by the values 40, such as the temperature, the friction coefficient of the friction linings, the rotational speeds (RPM), the slip, etc. In addition, the transmission unit like the motor 16 can be disturbed and/or influenced through tolerances, aging or interference (unanticipated undesirable influences) by influence values which cannot be directly measured. Such influencing is represented by the block 41.

The adaption 6 can be divided basically into three areas. On the one hand, one takes into account the secondary consumers or secondary assemblies 7, and the adaption strategies or adaption procedures related thereto are used in the adaption of the breakdown or disturbance values and the influence of such breakdown values. The secondary consumers can include the climate control, the dynamo, the steering aid pump, the servo pumps and additional secondary consumers which cause a division or branching off of the torque.

In order to compensate for the secondary consumers 7, signals and data 8 pertaining to these secondary consumers 7 are used in order to be in a position to determine and/or calculate the status of the secondary consumers 7. The status indicates, inter alia, whether a particular secondary consumer branches off a torque because it is switched on or switched off and, if it is switched on, how great the branched off torque is at the corresponding point of time.

FIG. 3 makes it clear that, in addition to the secondary consumer adaption 7, the system adaption distinguishes between first and second adaption loops 9, 11. The influences of measurable breakdown values are considered in the first adaption loop 9. The influences of only indirectly measurable breakdown or disturbance values or straying in the light of directly measurable deviations and system condition values 12 are ascertained in the second adaption loop 11.

A correction and/or compensation for such breakdown influences is carried out either by changing the parameters which influence the breakdown values and/or in that the breakdown values are reconstructed by virtual breakdown values and are compensated for on the basis of such virtual breakdown values.

In both instances, the breakdown value is corrected or compensated for so that the breakdown influences or the breakdown values are eliminated or reduced to a permissible level. By copying the breakdown values with virtual breakdown values, the actual cause of a breakdown cannot be localized conclusively; however, the influence of the breakdown value upon the overall system can be positively influenced in the above sense.

FIG. 3 further shows a block circuit diagram of a torque regulation with adaption and its cooperation with a selected path and setting member. The torque regulation system to be described hereinafter can be used for systems, such as torque transmission systems, with or without load distribution or branching off.

Compensation or adaption for the secondary consumers takes place in the adaption block 7. The secondary assemblies, such as, e.g., a dynamo, a steering wheel pump or a climate control, establish one branch of the torque-and/or output flow in that a part of the input torque $M_{mot}$ supplied by the engine is taken up by the corresponding aggregate. For a clutch regulation, this means that one proceeds from an input torque $M_{mot}$ which is not actually available, i.e., that the desired clutch torque derived from the supposedly higher engine torque, and hence also the thus detected correcting variable or setting value, are excessive. The detection of such load distribution which, hereinafter, will be designated as adaption of the secondary consumers, can occur for example by evaluating corresponding additional signals denoting measured values, such as the switching on or switching off of the climate controls compressor, climate control unit and other secondary consumers.

Correction for interferences which can be caused by measurable values, such as for example temperatures (e.g., the cooling water temperature has an effect upon the engine torque) or RPM or the friction coefficient can be changed due to slip, is carried out in a second adaption loop 9. Hereinafter, such corrections will be designated as "adaption 1". In this case, a correction and/or compensation can take place either through parameter adaption, e.g., a correction of the friction value, in the further compensation block 28 or in the transfer block 30 as a function of temperature or through a system adaption in the form of theoretically or empirically established disturbance or breakdown models or patterns, e.g., a non-linear correction of the engine torque as a function of temperature.

In the third adaption block 11, interferences—which can be caused by non-measurable system input values and/or aging and/or straying—are corrected and/or compensated for. Since this class of disturbances, such as e.g., aging or straying, cannot be detected on the basis of measurable input values, it must be detected by observing system reactions. This means that such disturbances cannot be compensated for by preventive undertakings prior to actually taking effect; instead, the reaction of the system as a deviation from the expected behavior must be observed to be thereafter corrected and/or compensated for.

These deviations can either be measured directly, e.g., by means of a torque sensor at the clutch or, alternatively, they can be calculated from other measured values by resorting to a method model or pattern. In the event of detection, it is necessary to obtain corresponding characteristic reference fields or unequivocal reference values of the system. In order to compensate for a thus detected disturbance or breakdown, it is necessary either to thereupon localize (single out) and correct the source of the breakdown or, alternatively, one assumes for example the existence of a virtual breakdown source A or B at which the detected deviation is corrected. In the same way, a disturbance or breakdown can be attributed to an existing block, such as for example the engine block 13 or the inverse transmission function of the transmission unit in the transmission block 30.

The ascribing of the disturbance can be fictitious, i.e., such a block is not actually responsible for the disturbance. Therefore, and in contrast with the regulation, the detection of the condition values or parameters need not be carried out permanently and can be limited to certain operating ranges.

In those phases where no adaption takes place, one utilizes the adapted parameters which were detected during an earlier adaption phase.

As shown in FIG. 3, the input torque 15 $M_{mot}$ supplied by the driving assembly 16, such as for example an internal combustion engine, is formed and/or calculated in the characteristic engine block 13 from a variety of input values 14.

The values which are used to this end comprise at least two of the following values, namely the RPM of the driving aggregate, the load lever position or the accelerator pedal position denoting the rate of fuel delivery, the subatmospheric pressure in the suction intake manifold, the injection time, the fuel consumption, etc. Furthermore, when forming or calculating the input torque $M_{mot}$ 15, it is possible to process the information already obtained and relating to possible breakdown influences (wear, temperature).

In the interlinking block 17, there is established an interlinking which effects a correction of the driving torque by taking into account the secondary consumers in the adaption block 7. Such correction is carried out additively in such a way that the branched off torques of the secondary consumers detected in 7 are subtracted from the engine torque 15 $M_{mot}$. Hereinafter, this corrected engine torque will be referred to as $M_{Netto}$ 18.

The engine torque which is corrected by the branched off torques of the secondary consumers constitutes the input value for the block 19 which serves as a compensation block for the breakdown value correction or comparison. By resorting to corresponding correction factors or corrective undertakings, the compensation block 19 renders it possible to simulate breakdown sources whose breakdown values are or can be comparable to the actually occurring breakdown values. The virtual breakdown values are returned to the adaption block 9 and constitute the balance of the difference between (a) the deviations and/or fluctuations which occur in the system as a result of for example manufacturing tolerances, contamination, etc. and (b) the desired conditions.

The correction can be carried out through additive, multiplicative, functional and/or non-linear proportions. In general, it is of importance to compensate for or to reduce the effect of the disturbances to an acceptable level within a range of acceptable limit values. For example, additive disturbances or breakdowns can be taken into consideration in the form of a virtual consumer and thus superimposed upon the driving torque even if the disturbance or breakdown has a different physical cause.

In a dynamic block 20, the dynamics of the method to be regulated, e.g., in the form of taking into consideration the mass moments of inertia (for example, of the moving mass of the engine) can be subjected to follow-up control if this is advantageous for the behavior of the system or for the control. For example, this enhances the quality of the regulation in the event of pronounced accelerations or delays. Hereinafter, the thus dynamically corrected driving torque 21 will also be designated as $M_{AN}$.

In an operating point detection block 22, the desired clutch torque $M_{KSoll}$ is established in dependency upon the then prevailing operating point. This is calculated from a percentual share of the dynamically corrected torque $M_{AN}$ and a safety torque $M_{Sicher}$ which is described in a safety block 25. The percentual share is determined in a further characteristic field block 23 by the torque division factor $K_{ME}$. The percentual share of the dynamically corrected torque can be altered by a further correction block 24.

In systems with a genuine load distribution or branching off, such as in the case of a converter with a lockup clutch, the proportion of the safety function can become $M_{Sicher}=0$ since a torque is built up by way of the converter in the event of slip.

In the case of an overall system without load distribution, the safety function $M_{Sicher}$ must ensure that, for example, in the event of slip, an additive torque is added to the existing torque to thus prevent the buildup of an excessive slip value.

The correct proportion factor $K_{ME}$ for each operating point is fixed or ascertained in the characteristic field block 23. This factor $K_{ME}$ is memorized or stored in the corresponding characteristic fields or characteristic lines in which one or more of several values including the engine RPM, the engine torque, the driving speed, etc. are entered. This $K_{ME}$ factor represents, in the case of two systems with a load distribution in the manner of a converter with lockup clutch, the ratio to be set by the control between the transmissible clutch torque and the available shaft torque.

In systems without load distribution, the direct proportion of the torque regulation is fixed by the proportion factor $K_{ME}$. The remaining torque is transmitted in the form of slip-dependent safety torque which is ascertained in a safety block 25.

A further dynamic correction and/or compensation for the previously detected percentual share of the torque can take place in the correction block 24. This correction and/or compensation can be carried out in such a way that one limits the rise of the desired torque and it will hereinafter be referred to as "gradient restriction".

For example, the gradient restriction can be carried out in the form of a maximum permissible increment per scanning step or through a predetermined modus operandi as a function of time. In view of such undertaking, the activation of the power train is restricted to a maximum permissible value and a satisfactory and comfortable load change behavior is thereby achieved.

A safety torque $M_{Sicher}$ is determined in the safety block 25 at each operating point. For example, such safety torque can be calculated in dependency upon the slip RPM. In this case, the safety torque would become greater in response to increasing slip. In this manner, one can protect the clutch in systems without load distribution.

Furthermore, a safety function of such kind renders it possible to prevent or reduce thermal overloading of the transmission system. The functional interdependence between the safety torque and the slip can be described by a corresponding function or can be predetermined through characteristic lines or characteristic fields. The output value, namely the desired clutch torque, of a superposed block 26 can be expressed by $$M_{KSoll}=K_{ME}*M_{AN}+M_{Sicher}$$

wherein the dynamic block 24 is not considered in the equation. If the block 24 is taken into account, the desired clutch torque can be described as $$M_{KSoll}=d_{Dyn}(K_{ME}*M_{AN})+M_{Sicher}$$

wherein $d_{Dyn}(K_{ME}* M_{AN})$ contains the correction of dynamics or accounting for the dynamics in the block 24.

The desired clutch torque is determined through those values of the torque division factor $K_{ME}$ and safety torque $M_{Sicher}$ 25 which are dependent upon the operating point 22.

It is possible to again carry out a correction of the desired clutch torque $M_{KSoll}$ with a second virtual breakdown source B in a further compensation block 28.

Such corrected desired clutch torque $M_{KSoll}$ korr 29 is converted into a setting value in a transfer block 30 by an inverse transmission function of the transmission unit of the setting member. The transmission unit with the setting member 31 is controlled by means of this setting value so that the transmission unit then carries out the corresponding operations.

The transfer unit with setting member indicated at 31 is intended to embrace, inter alia, systems with load distribution such as torque converters with lockup clutches or systems without load distribution in the form of a clutch, such as for example friction clutches. For example, clutches which are used in systems without load distribution can be wet clutches, dry clutches, magnetic powder clutches, turning set clutches, safety clutches, etc.

The generation of the energy/force required to operate the setting member 31 can take place, for example, electromotorically, hydraulically, electrohydraulically, mechanically, pneumatically or in another way.

Figure 4:
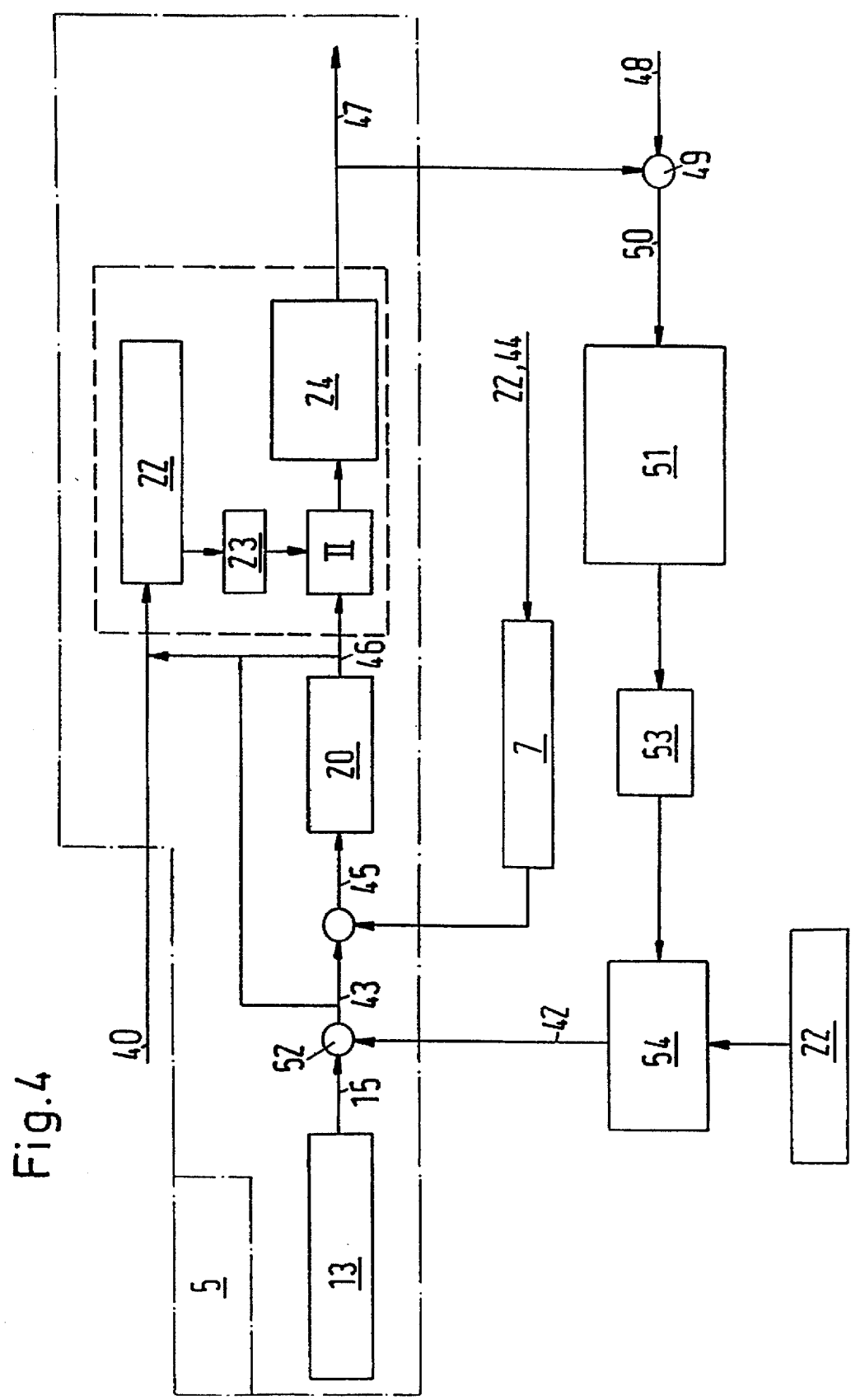

FIG. 4 is a block circuit diagram of a control method with adaption and shows the overlapping control block 5 as well as individual adaption blocks. The block 4 of the control path (not shown in this Figure) with setting member of FIG. 3 is equally valid for the FIG. 4 and can be taken over from FIG. 3.

Starting from the characteristic field block 13, one should assume the presence of an engine torque 15 which is processed additively with a correction torque 42 in such a way that the correction torque 42 is subtracted from the engine torque 15. The torque differential 43 is likewise additively corrected by the branched off torques of the secondary consumers 7 and, here again, the torques of all relevant secondary aggregates are subtracted from the torque differential 43 in accordance with their condition.

The thus treated moments or torques of the secondary consumers or secondary aggregates are ascertained or calculated from data or signals of the operating point 22 of the individual aggregates and/or from additional signals 44, such as for example switch on and/or changeover and/or switch off signals or typical operational signals, such as for example current-voltage signals of the dynamo.

For example, the detection can be carried out in that typical operational signals are stored in a characteristic field or a characteristic line and thus an associated torque requirement of the secondary consumers is determined by reading a characteristic field or a characteristic line. An equally possible alternative mode of detection is to store equations or equation systems where the signal values are entered as parameters and the solving of such equations or equation systems determines the torque requirements.

The corrected signal can undergo a dynamic correction in dependency upon the dynamic block 20. For example, the dynamic block 20 takes into consideration the moments of inertia of the rotary components, such as engine parts and for example the flywheel, or the moments of inertia of other components of the power train. The operating point 22 is ascertained or calculated from the condition values 40 of the system. This can be made possible by ascertaining data from characteristic fields or by solving the equations or equation systems, the condition values being introduced into such equations as parameters.

For example, the torque division factor $K_{ME}$ 23 is ascertained from a characteristic field at the operating point 22. A dynamically corrected signal 46 is multiplied by the torque division factor 23 to thus determine the torque which is transmitted, for example, by a converter lockup clutch of a hydrodynamic torque converter with converter lockup clutch. Again, the signal can be corrected with assistance from the dynamic block 24.

In the example which is shown in FIG. 4, the dynamic block 24 is realized as a gradient restriction, i.e., a restriction of the maximum rise of the torque. Thus, this gradient restriction can be realized in such a way that the rise of the torque is compared, as a function of time within a fixed interval of time, with a maximum permissible value, such as for example a ramp and, when the actual rise exceeds the maximum value of the ramp, the ramp signal is used as the real value.

A further possibility of limiting the gradient can be achieved with a dynamic filter. The time behavior of the filter as a function of time can be selected in a number of ways depending upon the operating point so that, when using for example a $PT_1$ filter, the time constant can be set as a function of the operating point.

As shown in FIG. 3, an output signal 47 of the block 24, namely the desired clutch torque $M_{KSoll}$, is transmitted to the transfer unit with setting member. Such desired clutch torque is compared with an actual clutch torque $M_{KIST}$ 48 at a junction 49. Such comparison is ensured by an additive method according to which the actual clutch torque 48 is subtracted from the desired clutch torque 47 to thus arrive at a difference $\Delta M$ 50. The torque difference $\Delta M$ is processed in the next-following blocks of the block circuit diagram into a correction torque 42 which is processed with the engine torque 15 at a junction 52.

The adaption of, in this example, FIG. 4 does not carry out any localization of the breakdown values but traces the disturbances to fictitious breakdown values or disturbances. The correction of and/or the compensation for real breakdown values by means of fictitional breakdown values no longer requires a localization and, accordingly, no longer the correction of real causes of defects and errors. In the example of FIG. 4, the engine torque or characteristic field of the engine is regarded as the fictitional breakdown source so that all developing errors and disturbances are regarded as disturbances of the engine torque and are compensated for or corrected by an engine correction torque $M_{mot\_korr}$.

The purpose of the adaption is to realize the most accurate achievable setting of the torque division factor $K_{ME}$ as regards the quality of reaction to disturbances and optimizing of the physical behavior of the system.

The correction value $M_{mot\_korr}$ can be ascertained by solving the equations or equation systems and/or by using a characteristic correction field. The characteristic correction field can be arrived at in such a way that the correction value is recorded for example over two parameters. When determining the characteristic correction field, it is possible for example to use the same parameters through which the characteristic engine field is recorded, such as for example the fuel consumption and the engine RPM. However, it is also possible to use as one parameter of this characteristic correction field a value which reflects a dependency of the transfer function upon the path, such as for example the turbine RPM.

The design of such a characteristic correction field over the engine torque and the engine RPM can be effected for example by fixing three supporting points. By resorting to three supporting points, it is possible to fix a plane which determines the characteristic correction field as a function of the two dimensions or parameters. A further possibility consists in the selection of four supporting points to define a surface which determines the characteristic correction field. In this context, a block 51 carries out a weighting or evaluation of the supporting points as a function of the respective operating point. This weighting of the supporting points is carried out since an indication concerning the correction values as at other operating points can be made over the surface of the characteristic correction field from each operating point. However, since this can result in errors, and the indications in partial areas of the characteristic correction field cannot be linearly transferred into other partial areas, one introduces the weighting of the supporting points.

The consequence of such weighting is that, depending upon the corresponding operating point or the region of the operating point, the supporting points are weighted differently and thus the influence of points in the characteristic correction field which are more distant from the operating point has a lesser or greater significance. The weighting of the supporting points takes place in a block 53 which influences the time behavior of the adaption. A block 54 constitutes a characteristic correction field block which determines, on the basis of the operating point 22, the correction value 42 of the engine torque and such correction value is processed with the engine torque 15 at the junction 52.

Figure 5A:
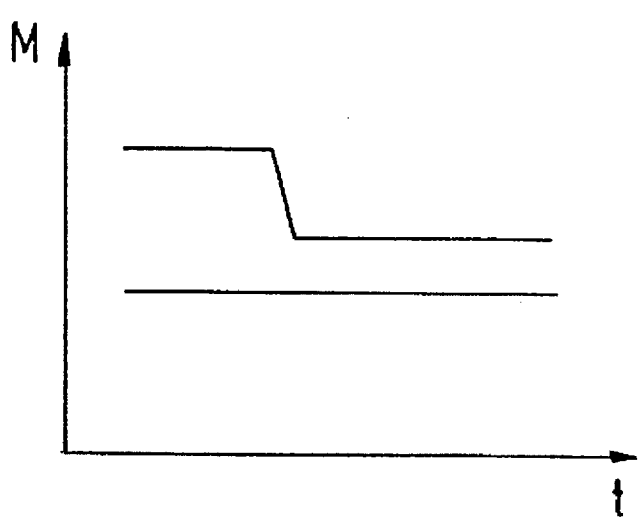
Figure 5B:
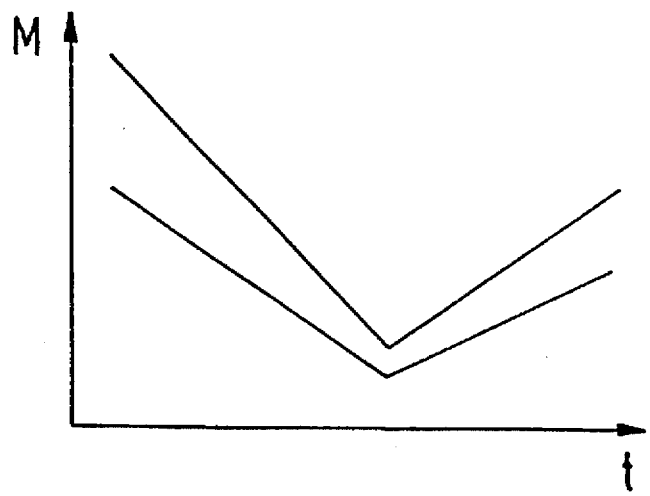
Figure 5C:
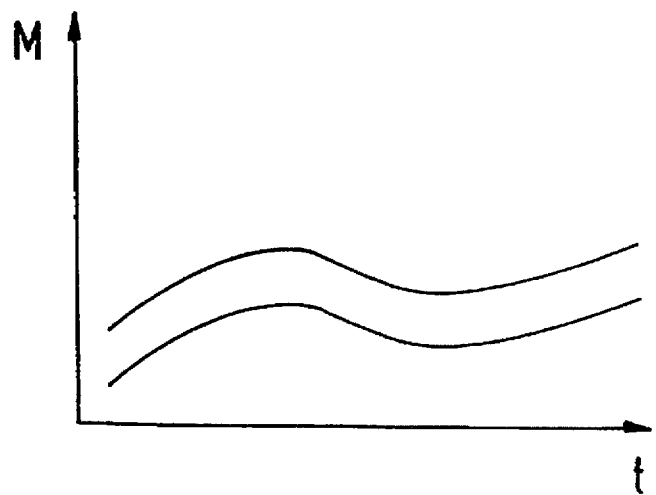

FIGS. 5a to 5c show diagrammatically the possible disturbances of the engine torque as a function of time. FIG. 5a shows the desired torque as a horizontal line, and the actual torque is shown as a horizontal line with a step. This step can be identified as an additive portion of the engine torque which, for example, is caused by additional aggregates. For example, a step in the actual torque develops when an additional aggregate is turned on, into or off a particular operating condition. Depending upon whether the branched off load is increased or reduced, the step can increase or lower the actual torque. Based on the height of the step and its behavior as a function of time, it is possible to obtain an indication as to which additional aggregate was turned on, off or over.

FIG. 5b shows the desired torque and the actual torque at an operating state different from that represented in FIG. 5a. The difference between the two curves can be designated as a breakdown value which influences a multiplicative share of the clutch torque. Thus, a compensation and/or correction of such breakdown value must exhibit a multiplicative characteristic.

FIG. 5c again shows the desired and actual torques but the two torques are separated from each other by an additive portion. The correction and/or compensation for such disturbance can be undertaken through an additive portion of the clutch torque. For example, the example of FIG. 5b can be explained as a result of a change of the friction value and the example of FIG. 5c can be explained as being based upon a deviation of the setting value.

Figure 6B:
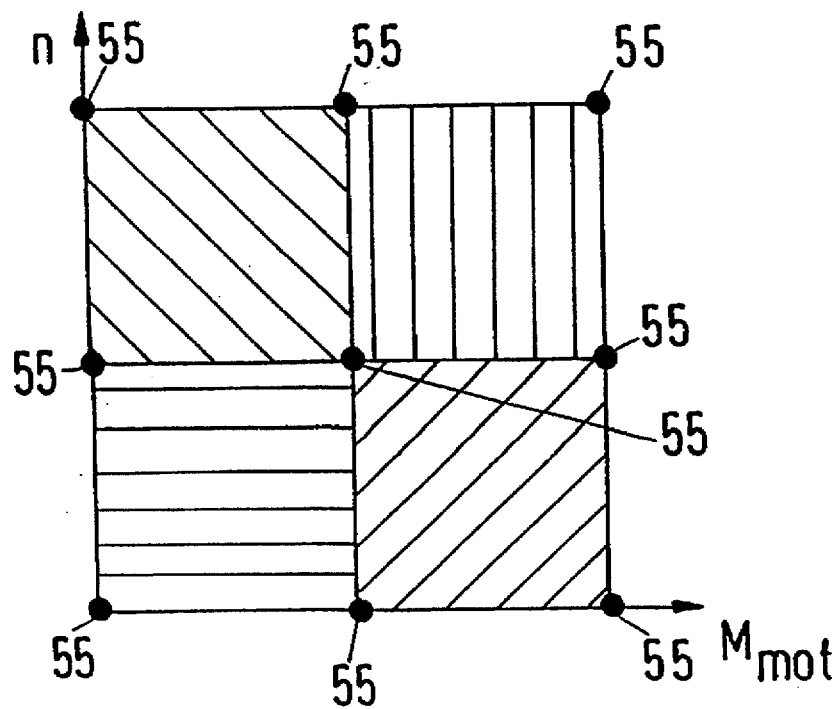
Figure 6:
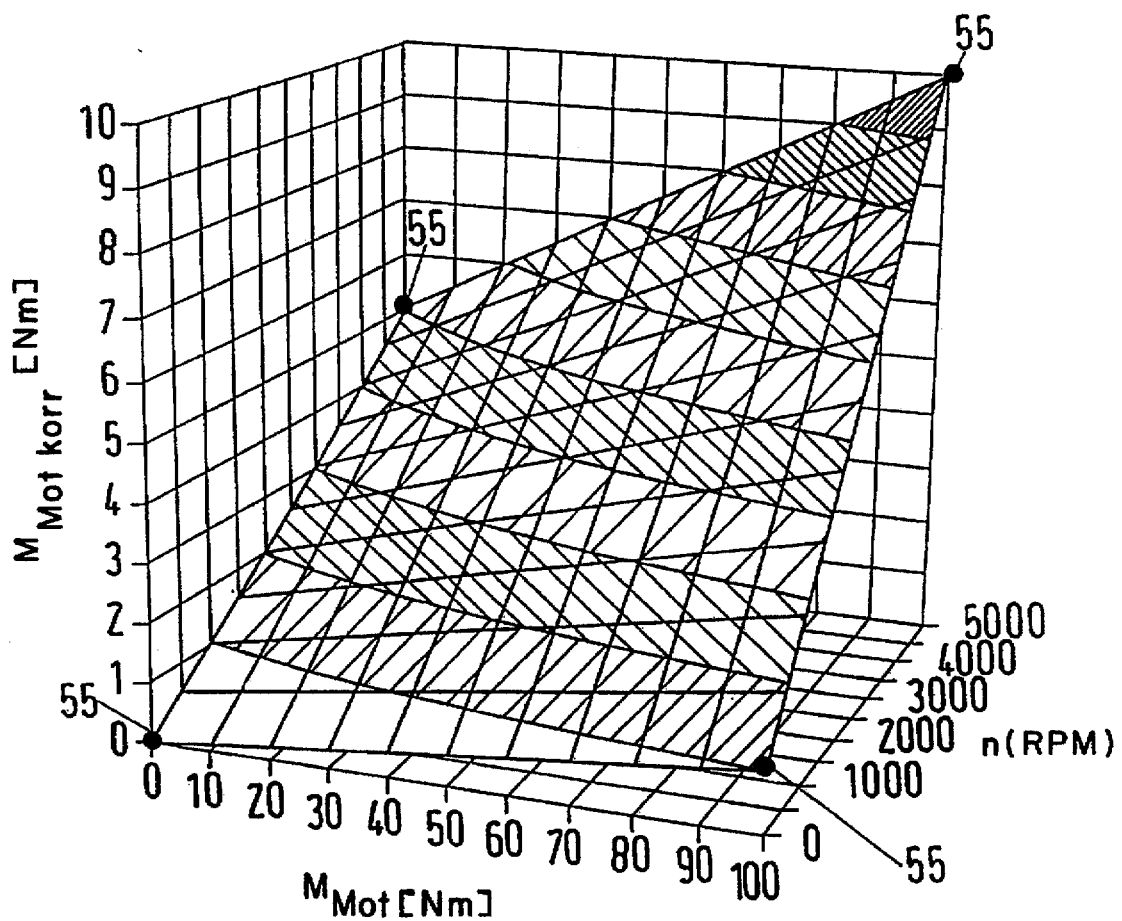
Figure 6A:
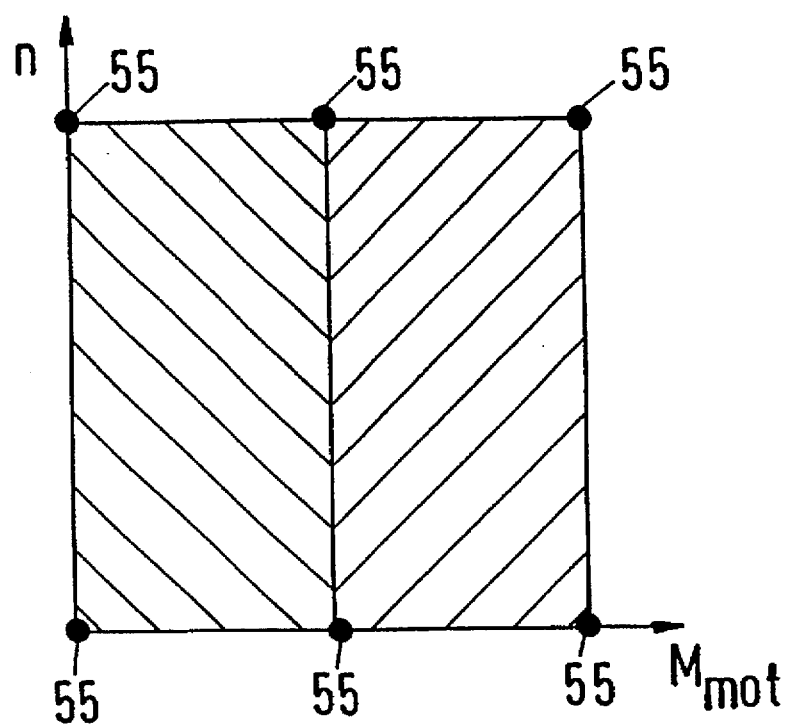
Figure 6B:
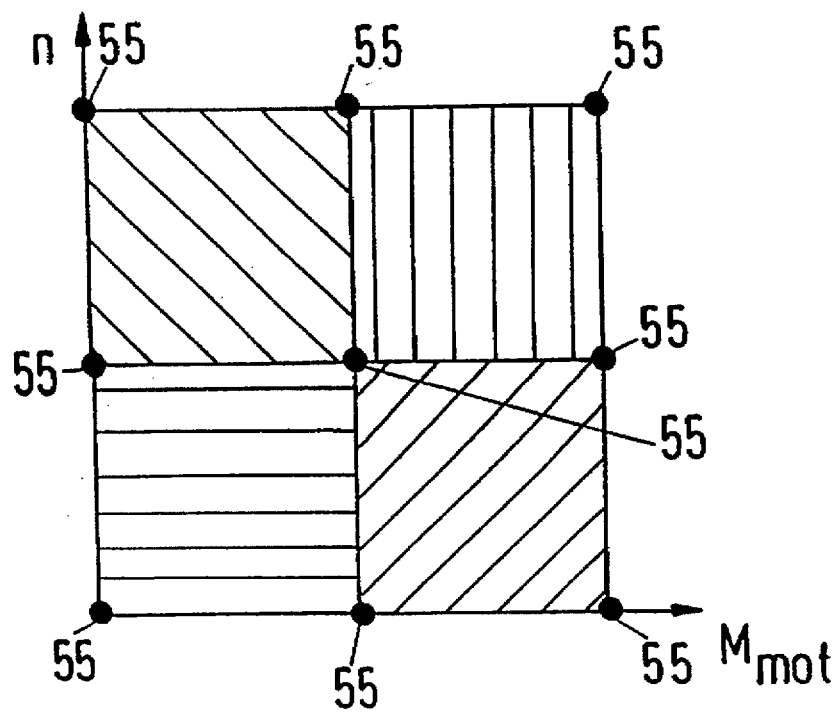

FIG. 6 illustrates a characteristic correction field wherein the engine correction torque is represented as a function of the engine torque and the engine RPM. The four corner points of the value range are used primarily as supporting points 55. The weighting of the supporting points 55 in the block 51 of FIG. 4 can be carried out, for example, in that at a certain operating point the vertical positions of the supporting points are changed so that the area closely surrounding the operating point undergoes a greater weighting. Such weighting as a result of a change of the vertical positions or levels of the supporting points can be designed, depending upon the operating point, in such a way that the change is experienced by one to four supporting points.

The fixing of the four supporting points 55 which define a surface can also be modified in that one starts with six supporting points 55 (see FIG. 6a) with three supporting points always arranged along an axis and the six supporting points define two surfaces each with four supporting points, two supporting points being common to two surfaces.

A further embodiment can be characterized in that one employs nine supporting points (see FIG. 6b) in order to define four surfaces. The characteristic field is set up in such a way that the points of pair of each neighboring supporting points belonging to a common surface are connected with one another by a straight line so that the definition range of such surface is bounded by four straight lines and the projection of the characteristic field onto the definition range constitutes a polygon, as a rule not a rectangle or a square. The connecting lines between two opposing straight boundary lines of the characteristic field which lie in a common plane spanned by a straight marginal line of the characteristic field and the axis of the definition area of the characteristic field likewise constitute sections of straight lines.

A further embodiment of the characteristic field of FIG. 6 can represent a curved surface which is generated in a three-dimensional space according to a functional connection, such as for example a parabola of the second order. The surface which characterizes the characteristic field can be a curved surface which is defined by certain supporting points and/or by a functional connection or an equation or equation system.

Figure 7:
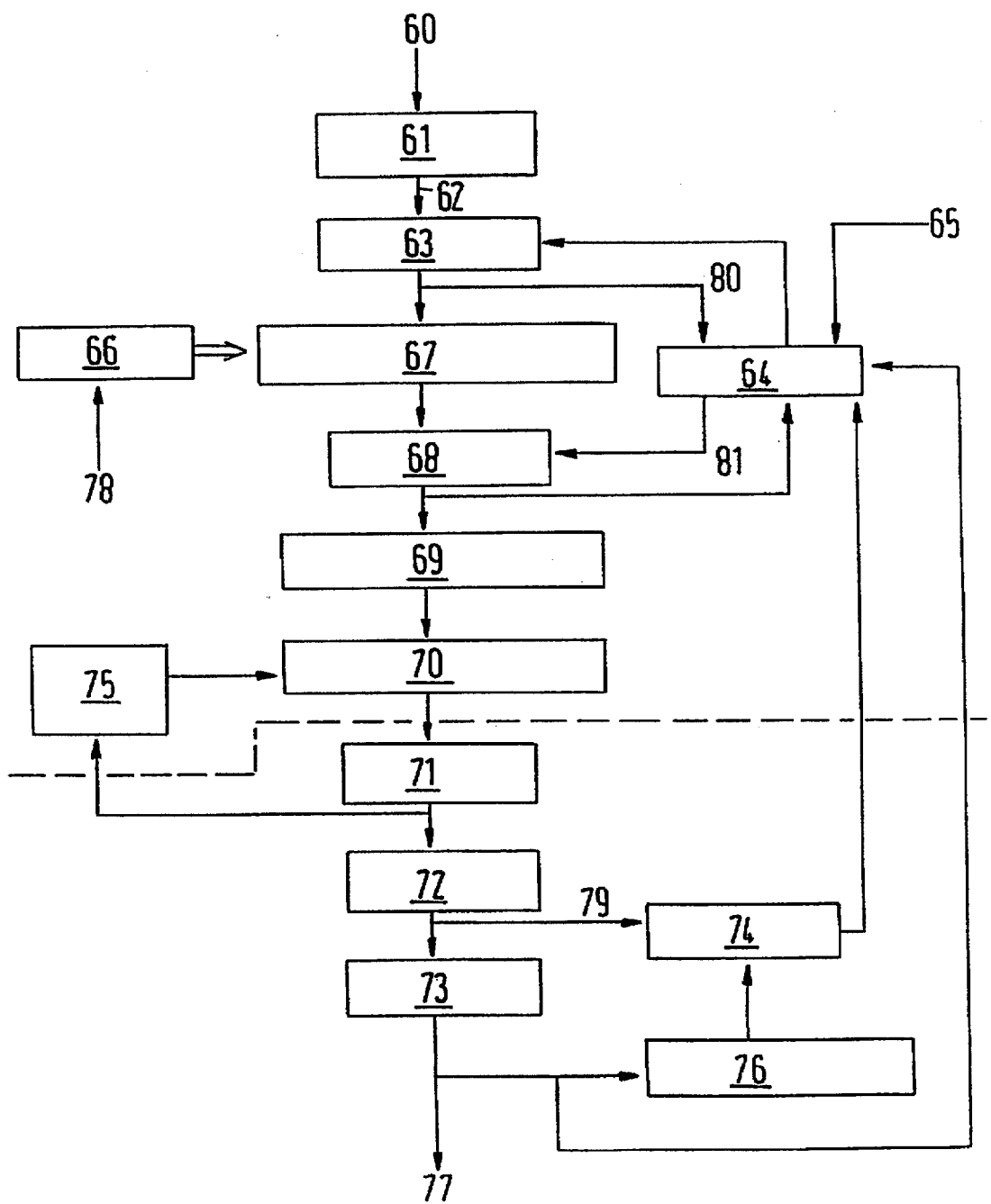

FIG. 7 shows a block circuit diagram resp. a flow or development diagram of a torque regulation with adaption of a torque transmission system which will be explained in greater detail below. For example, the torque transmission system can be a clutch, such as a friction clutch and/or a starting clutch of an automatic gearbox and/or a transfer means of an infinitely adjustable cone pulley belt contact gearbox and/or a hydrodynamic torque converter with a converter lockup clutch and/or a turning set clutch and/or a safety clutch. The actuation of the torque transmitting parts can be carried out by way of an electromechanical, an electrohydraulic and/or a mechatronic and/or a mechanical and/or a hydraulic and/or a pneumatic setting member.

As shown in FIG. 7, the driving torque 62 of a driving aggregate 61, especially an internal combustion engine, is first calculated from different input values 60. The values used here comprise at least two of the following values, namely the RPM of the driving aggregate, the load lever position or accelerator pedal position of the fuel supply, subatmospheric pressure in the suction intake manifold, injection time, consumption, etc. As already stated above, the driving aggregate is denoted by the block 61 and the input torque of the driving aggregate is indicated at 62. The block 63 represents a junction which effects a correction of the input torque. Such correction is carried out by means of correction factors which are supplied by the system adaption 64. This system adaption 64 can constitute a program module which, based on additional input values 65, on analytically or numerically determined values, and on values of characteristic line fields, carries out a correction of the average input torque. These correction factors can compensate for deviations from a desired state which deviations develop in the system, namely by compensating for such deviations by additive, multiplicative and/or non-linear shares. A block 66 represents the determination or selection or calculation of a torque division factor $K_{ME}$ which is correct for each existing operating condition and which (as a rule) is between 0 and 2. However, system conditions can also occur which render it necessary to use a larger $K_{ME}$ factor. This $K_{ME}$ factor denotes the torque ratio $M_{Kupplung}$ to $M_{Antrieb-korrigiert}$ to be set by the controls as one of the values fixed in advance for each operating point in the manner of a characteristic field from the relevant selected weighting of the criteria indicated in FIG. 2, i.e., the $K_{ME}$ factor is memorized in a characteristic field for the individual operating conditions.

However, the $K_{ME}$ factor can also be considered to be constant within the entire operating range. Fixing or calculation of the $K_{ME}$ factor can also be undertaken through an equation or through an equation system whereby the solution of the equation or equation system determines the $K_{ME}$ factor.

Condition values or parameters of the vehicle and the design of torsion dampers which may be present can be realized or considered in the characteristic field of the $K_{ME}$ factor or in the analytical equations for determining the $K_{ME}$ factor. The design of the damper or dampers, if used, for example in a lockup clutch, is of particular importance since if a damper is present, the $K_{ME}$ factor can be kept constant at least within a comparatively large section of the operating range of the internal combustion engine or of the hydrodynamic torque converter.

A $K_{ME}$ factor which is kept constant within a wide operating range can also be arrived at for clutches, such as friction clutches or starting clutches.

The ratio of clutch torque to input torque is fixed by the torque division factor $K_{ME}$. This renders it possible to operate, for example, with torque-controlled slip. In systems having a load distribution (e.g., in converters with lockup clutches), that share of the torque which is to be transmitted by the lockup clutch is fixed by such factor. In systems without load distribution, e.g., in clutch systems, not less than 100% of the torque existing at the input side can be transmitted in a stationary operation. In such instances, the factor determines that proportion which is directly transmitted by the torque control. The remaining share of the torque is controlled by follow up through a slip-dependent safety torque which copies a converter-like behavior. The calculation of the desired clutch torque is carried out at 67 by means of the then existing $K_{ME}$ factor, and the corrected input torque of the driving aggregate. A further correction of the desired clutch torque can be carried out at a junction 68 by the additive, multiplicative and/or non-linear shares resulting from the system adaption 64. Thus, it is possible to provide the junction 68. In this manner, one arrives at a corrected desired clutch torque. It is sufficient, for many applications, if only one of the two junctions 63, 68 is provided; it is preferred to retain the junction 63.

The calculation of the setting value is carried out at 69 on the basis of the corrected desired clutch torque of the inverse transfer function of the path which represents the lockup clutch or the clutch. A block 70 represents the inverse transfer function of the setting member which is resorted to in order to calculate the setting value which is required for a setting member 71. The setting value thus influences a control path 72 which, in turn, influences the vehicle 73. The value selected by the setting member 71 can be reintroduced into the control device in order to enhance the quality of the control method. For example, this can relate to the position of the master cylinder of a hydraulic system set by the electric motor of an electrohydraulic setting member. Such reintroduction takes place in two blocks 74 and 75. A further block 76 denotes a calculator unit which serves to simulate a model of the vehicle and of the torque transmission system.

A block 77 denotes the transmission of those measured values or parameters of the vehicle which are processed as input values at another location, namely in a block 78.

The broken line denotes in FIG. 7 the transition area between a central computer or control unit and the vehicle. The regulator output value can be calculated at 70, and such value is formed on the basis of the setting value ascertained at 69 and the inverse transfer function of the setting member. The setting member preferably constitutes an electrohydraulic or electromechanic setting member. It is advantageous to use a proportional valve or a pulsewidth modulated valve.

A feedback of the setting value can take place at 75 in the form of a regulation or adaption. However, such feedback can be dispensed with. A measurement of the actual clutch torque can be carried out at 79, e.g., through a torque sensor or through an expansion type measuring strip (DMS).

In lieu of measuring the actual clutch torque at 79, it is also possible to carry out a calculation of such torque on the basis of the condition values and the vehicle and converter physics. For example, to this end the characteristic field of the engine and/or the characteristic field of the converter or values representing such fields can be processed in a processor or in a central processor unit and/or they can also be stored in a memory. Furthermore, it is also possible to memorize for this purpose a characteristic field (or a value representing such field) denoting the torque transmitting capacity of, e.g., a converter lockup clutch.

If a determination of the actual clutch torque is carried out at 79 as well as according to the at 76, it is possible to balance the measured actual clutch torque with the actual clutch torque which was calculated by resorting to a model. The balancing can take place as a logical interlinking, e.g., on the basis of the minimum-maximum principle or as a probability comparison. The system adaption which is shown at 64 in FIG. 7 can be utilized to carry out, inter alia, the following comparisons and to complete the corresponding corrections:

A: Comparison of the corrected desired clutch torque with the actual clutch torque. Such comparison can also be made a long-term comparison, e.g., by observing the deviation through a simultaneously moving time window. One can make a comparison between the corrected driving torque and the backwardly calculated driving torque, and such comparison can also be carried out long-term, e.g., by observing the deviations through a simultaneously moving time window. Likewise, it is possible to carry out an evaluation of additional signals, such as for example switching on or off of additional aggregates, for example, the climate control, the compressor, the gear shift, etc.

B: Detection of the system deviation determined at A into additive, multiplicative and/or non-linear shares of $M_{Antrieb}$ and $M_{Kupplung}$ and the resulting division into the corresponding adaption loops 80 and 81 or into the junctions 63 and 68.

The detection or determination of the corresponding shares of $M_{Antrieb}$ and/or $M_{Kupplung}$ can be carried out, for example, according to the three diagrams of FIGS. 5a to 5c.

FIG. 7 shows a development diagram of the control method with the individual process steps. In a first process step, a driving torque of the engine is determined on the basis of a plurality of input values. There follows a first correction of this value according to the prorating by a system adaption. This system adaption is a program module which carries out a correction of the average driving torque on the basis of additional input values, analytically determined values and characteristic line fields. In a further process step, such corrected driving torque is multiplied with a proportion factor $K_{ME}$ which can be between zero and two. Such proportion factor K is memorized in a characteristic field for the individual operating conditions. This characteristic field can store parameters or condition values of the vehicle and the design of the torsion damper or dampers, if any. The ratio of clutch torque and driving torque is fixed by the proportion factor $K_{ME}$. In this manner, it is possible to achieve an operation with controlled slip.

In systems with load distribution (converter with lockup clutch), such factor determines that percentage of the torque which is to be transmitted by the lockup clutch. In systems without load distribution (clutch system without a parallel-connected converter), not less than 100% of the torque existing at the input side can be transmitted in a stationary operation. In this case, the factor fixes that part of the torque which is directly transmitted through the torque control. The remaining part of the torque is controlled afterwards through a slip-dependent safety torque which copies a converter-like behavior.

The achieved desired clutch torque is corrected again in a next process step on the basis of system adaption. In this manner, one arrives at a corrected desired clutch torque. In the last step, a setting value is ascertained from such corrected desired clutch torque with assistance from an inverse transfer function of the control path. By using the inverse transfer function for the setting member, the value appearing at the output of the control device is obtained from such setting value. The thus obtained output value is transmitted to the setting member which, in turn, acts upon the control path and the vehicle. The value set by the setting member can be retransmitted to the control device to improve the quality of the regulating method. For example, this can involve the position of the master cylinder as selected by the electric motor. Furthermore, additional system values, such as for example the clutch path, or vehicle values, can be transmitted to the control device. These additional input values are then introduced into the described regulating or control method through system adaption.

Figure 8:
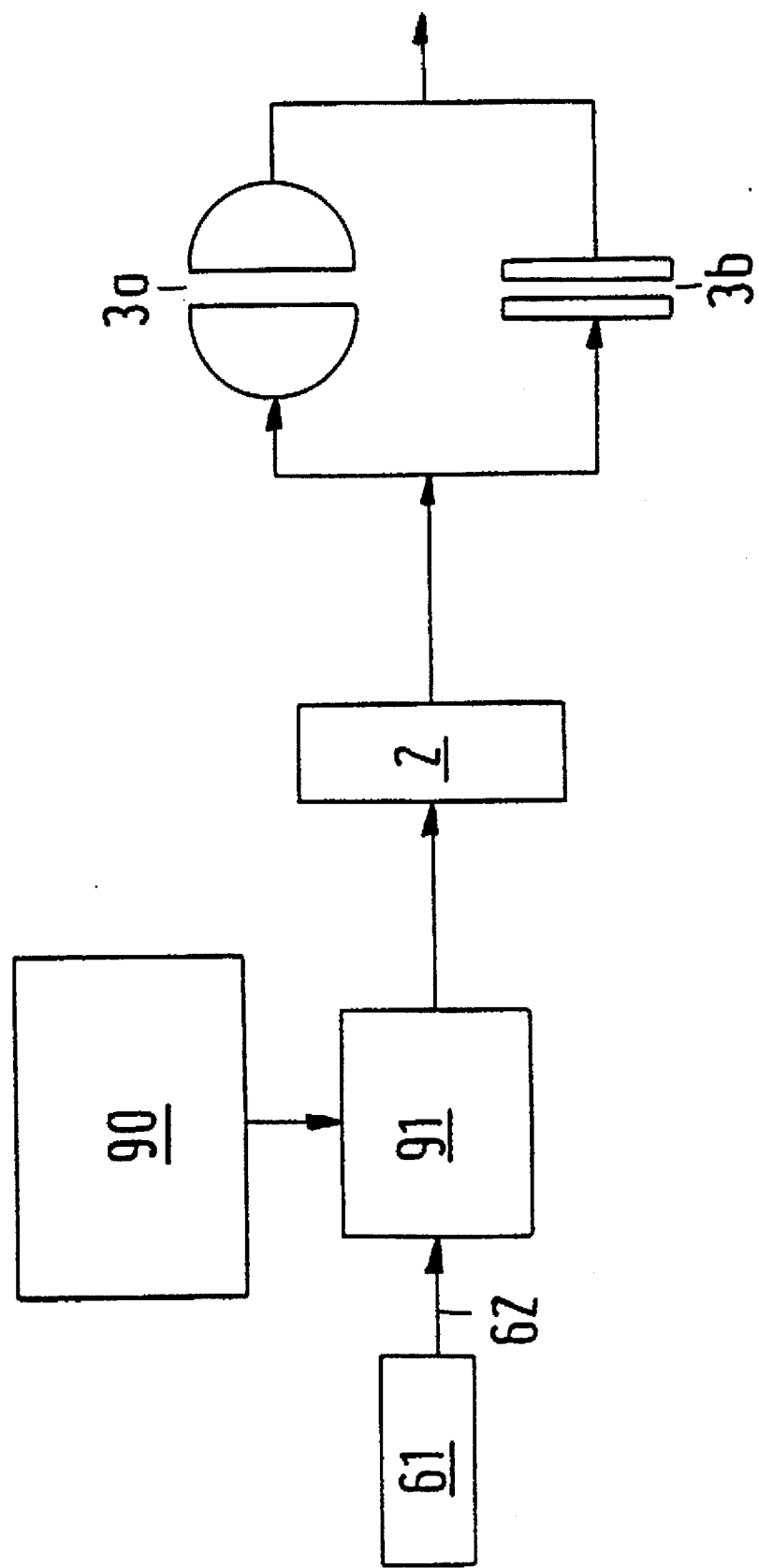

FIG. 8 shows a simple model of an adaption which is limited to additive correction of the input torque. The deviations which result from the difference between the desired and actual clutch torques are adapted through virtual breakdown sources. The block 61 of FIG. 8 denotes the driving aggregate, such as an internal combustion engine, which generates an engine torque 62. A block 90 represents the adaption by means of virtual breakdown sources, and its output signal is processed additively with the engine torque 62 at a junction 91. The corrected engine torque is corrected dynamically in the block 2 by means of dynamic correction based upon moments of inertia of the flywheel.

The torque arising for example at the torque converter with lockup clutch is divided into two parts by the torque division factor. One part is transmitted by the lockup clutch 3b, and the differential between the existing torque and the torque transmitted by the lockup clutch is transmitted by the torque converter 3a.

Figure 9:
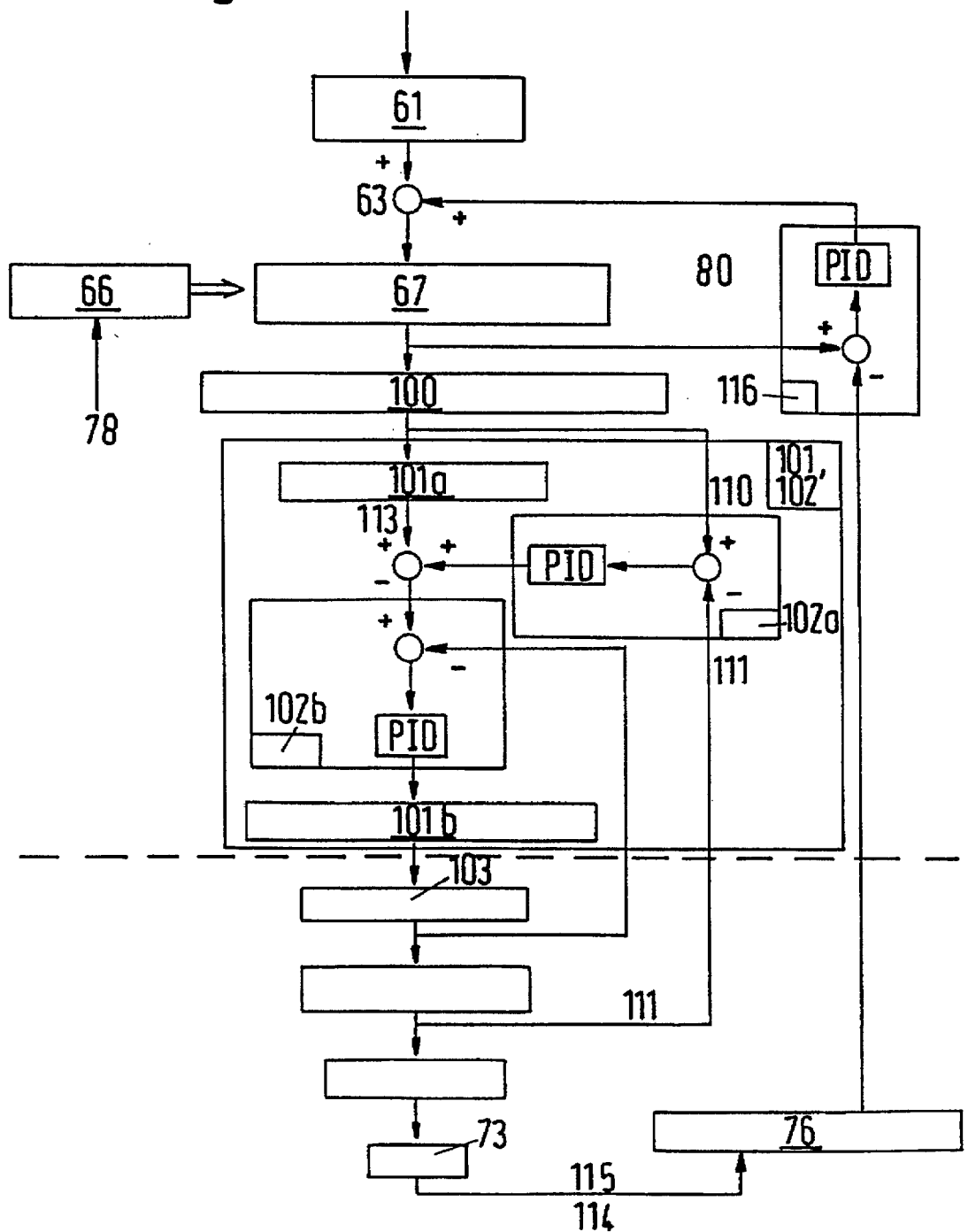

FIG. 9 shows a block or flow diagram of a control method for torque transmission systems. The broken line in the lower half of FIG. 9 represents the separation between the central computer unit and the vehicle. The regulating or control method of the block circuit diagram shown in FIG. 9 represents a simplified adaption. The lockup clutch is started electrohydraulically through a proportional valve or a pulsewidth modulated valve. The output signal of the regulating computer or the computer output value is a setting current which is set in proportion to a scanning ratio being applied, for example, at a pulsewidth modulated output of the computer. For example, the clutch torque results from the pressure differential applied in this way to the converter lockup clutch or between the plenum chambers of the lockup clutch. The system adaption is restricted to the adaptive correction of the input torque whose deviation results from the difference between the desired and actual torques.

In comparison with FIG. 7, the embodiment of the control or regulating method according to FIG. 9 omits the junction 68 or the return transmission of the corrected input torque ($M_{ANkorr}$). In FIG. 9, the desired pressure differential $DP_{Soll}$ is determined at 100, namely as the main value in dependency upon the desired clutch torque and, where applicable, also in dependency upon the corrected input torque $M_{ANkorr}$ and the turbine RPM N-turbine as parameters.

An additional function block 101, corresponding to the block 70 of FIG. 7, is divided into two subfunction blocks 101a and 101b. Feedback couplings 102a and 102b are provided for the respective function blocks 101a and 101b. The input value of the inverse transfer function of the setting member (101=101a and 101b) is the desired pressure differential ($DP_{Soll}$) which is calculated in the block 100. The output value is obtained through the associated scanning ratio and constitutes the regulator output value.

The setting member, which follows, is divided into an electrical setting member portion which is formed by an end phase and the valve winding, as well as into the hydraulic setting member portion which is relevant for the corresponding pressure application at the converter lockup clutch, see the block 103. The input value of the electrical setting member portion is the scanning ratio. This is converted at the output side into an actual current. Depending upon this actual current (I-Ist), the hydraulic setting member portion selects a corresponding pressure application to the converter lockup clutch. This takes place by selecting a corresponding pressure differential between the chambers of the converter lockup clutch.

The block 101a denotes the inverse function of the hydraulic setting member portion in that the corresponding desired current is calculated from the desired pressure. Such portion of the setting member includes a feedback of the measured actual pressure in the form of a pressure adaption which is denoted by the block 102a. This pressure adaption 102a supplies the corrected desired current. The second part 101b of the inverse transfer function 101 of the setting member constitutes the electrical portion which calculates the corresponding scanning ratio from the corrected desired current. A PID regulating algorithm is used to this end. The input value $I_{Soll-R}$ for the inverse transfer behavior of the electrical setting member portion is calculated with the PID regulator from the control deviation $I_{Soll-Korr}=-I_{Ist}$ ($I_{Ist}$ is measured past the valve winding).

The numbering of individual blocks which is selected in FIG. 9 corresponds essentially to the numbering of the individual blocks in FIG. 7. In this way, the individual function blocks of the special electrohydraulic embodiment shown in FIG. 9 can be related to those of the generic design according to FIG. 7.

The individual reference characters shown in FIG. 9 denote the following:

$DP_{Soll}$=110=desired pressure differential at the lockup or converter lockup clutch. It corresponds to the differential between the pressures prevailing in the chambers at opposite sides of the piston of the lockup clutch.

$DP_{Ist}$=111=actual pressure differential between the two chambers of the converter lockup clutch.

$P_{Nach}$=pressure downstream of the lockup or converter lockup clutch.

$I_{Soll}$=113=desired current for the electrohydraulic valve.

$\Delta N$=114=RPM differential between the pump and the turbine of the converter; thus, $\Delta N$=N pump–N turbine.

The parameters of the vehicle 115 indicated in FIG. 9 in front of the block 76 are indicative of the slip in the lockup clutch or in the converter.

As can be seen in FIG. 9, the RPM differential $\Delta N$=N pump–N turbine does not represent any regulating value as is the case in connection with conventional slip regulations. In accordance with the novel torque regulation or control, this RPM differential $\Delta N$ is used as a condition value of the path to be controlled to monitor possible torque deviations which, in turn, have a correcting backlash effect upon the regulation in the adaption through corresponding junctions. The ascertained torque values can be stored, e.g., in the manner of a simultaneously moving time window, for a certain period of time in order to detect the proportions of deviations at the clutch and at the engine. This takes place in a system adaption shown at 116.

The control or regulation according to the invention exhibits the additional advantage that the adaption of the breakdown proportions of the driving torque can also take place with the lockup or converter lockup clutch fully disengaged, i.e., with $K_{ME}$=0. To this end, the nominal driving torque is compared with the torque acting upon the converter; this takes place at the junction 63 shown in FIG. 7 or at the process step of FIGS. 7 and 9. Through this adaption, and in anticipation of a later engagement of the lockup clutch, possible deviations of driving torque are considered already in the disengaged condition of the lockup clutch. To this end, the torque being applied to the converter is determined in the system adaption 116 or 64. Preferably, the converter characteristic field is stored or memorized in this system adaption for such purpose. By determining the RPM differential between the turbine and the pump of the converter, it is thus possible to determine the applied torque. Such converter torque is then compared with the nominal input torque of the engine or driving aggregate. This input torque can be derived from a stationary characteristic field of the engine which is memorized in the block 61 of FIGS. 7 and 9, namely as a result of the measured condition values such as especially the engine RPM, load lever position, fuel consumption, injection amount or injection time, etc. The RPM differential between the turbine and the pump of the torque converter can be determined in the block 76.

Furthermore, it is possible to determine the converter torque already in the block 76; the converter characteristic field is then memorized in the block 76.

Figure 10:
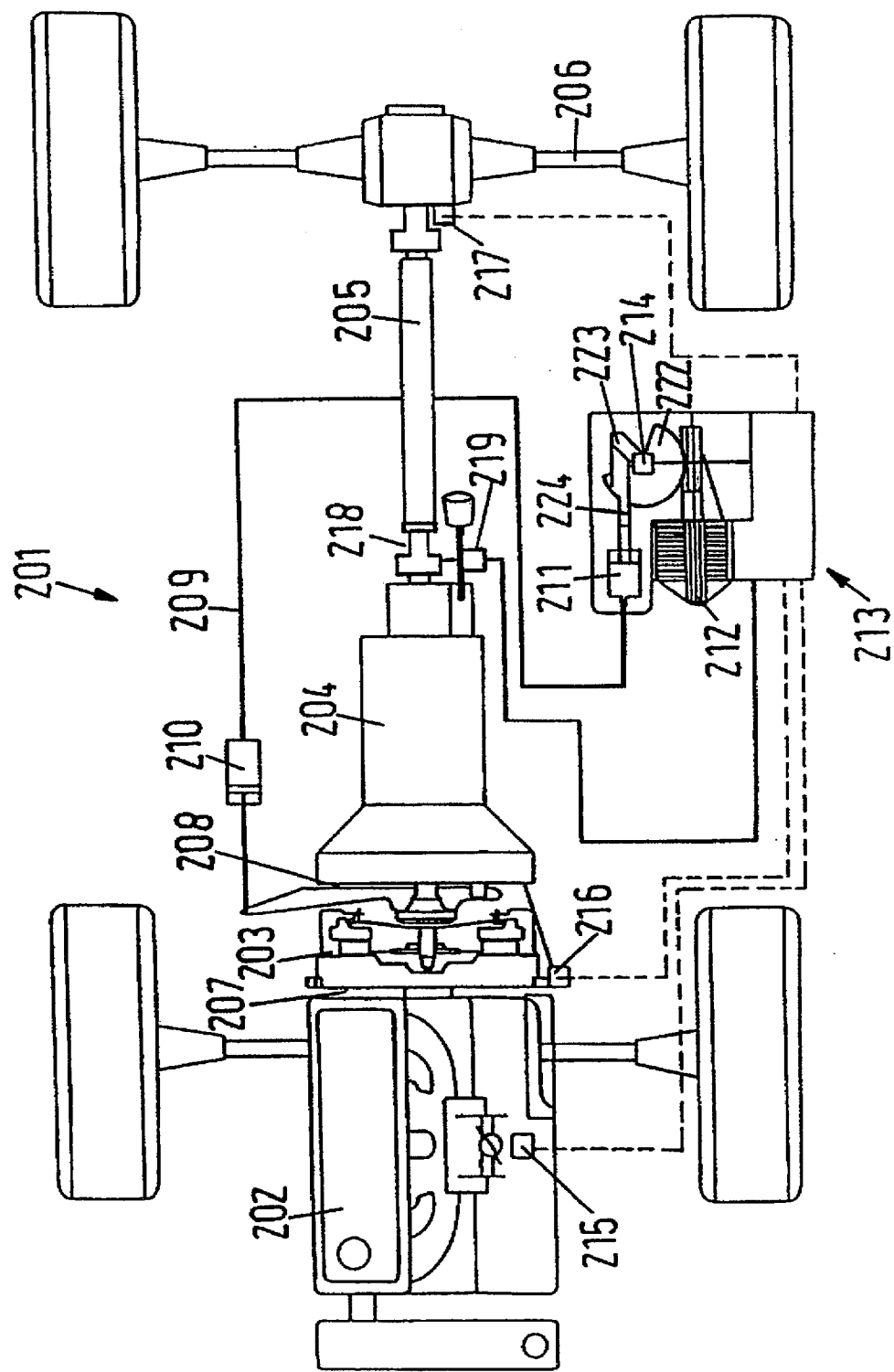
Figure 11:
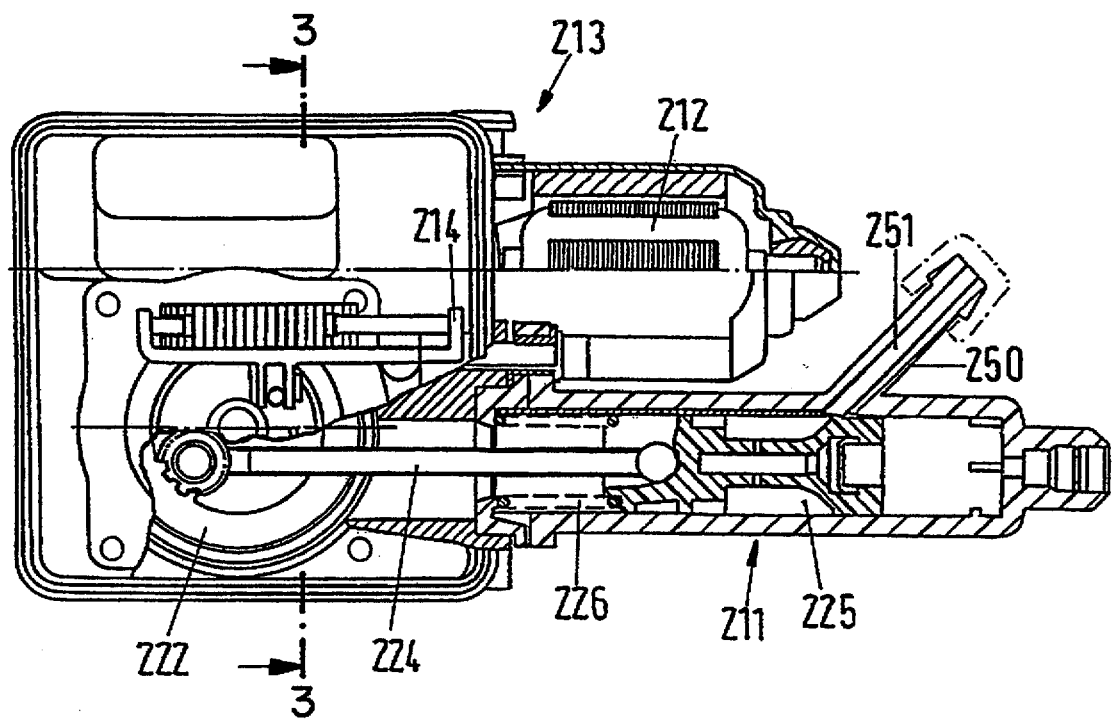
Figure 11:
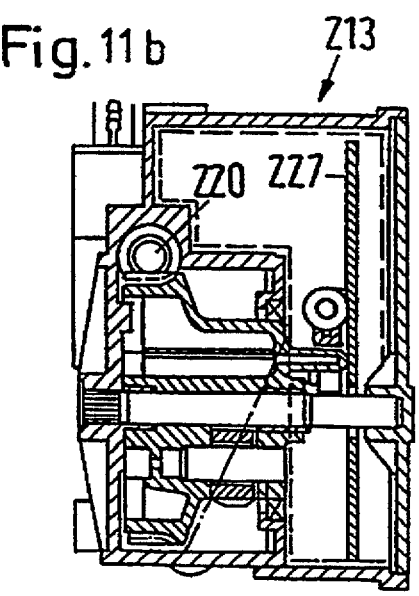

FIG. 10 shows a vehicle 201 with a combustion engine 202 which acts upon a gearbox 204 through a clutch 203 which is self adjusting or compensates for wear. A gearbox 204 is connected, through a drive shaft 205, with a driving axle 206 of the vehicle 201. With the self adjusting clutch 203 or with a clutch which compensates for wear, one distinguishes between an input side 207 which is adjacent the combustion engine 202 and an output side 208 facing the gearbox 204. The engaging and disengaging system for the clutch 203 is connected with a slave cylinder 200b which is connected with a master cylinder 211 through a hydraulic conduit 209. The engaging and disengaging system, such as a mechanical disengaging bearing, can come into contact with the tongues or prongs of the diaphragm spring in such a way that it determines the bias of the diaphragm spring upon the pressure plate in a direction toward the engine and thus the bias upon the friction linings between the pressure plate and the flywheel. The hydraulic conduit 209 is connected, by the master cylinder 211, with an electric motor 212 which is confined in a housing together with the master cylinder 211 to constitute therewith a setting member 213. A clutch movement detector 214 is mounted in the same housing immediately adjacent the master cylinder 211. Furthermore, a control apparatus (not shown in the drawings) is mounted on a circuit board 227 in the setting member housing. This electronic control device contains the output and also the control electronics and is thus mounted entirely within the housing of the setting member 213.

The control apparatus is connected to a throttle valve sensor 215 which is mounted directly on the combustion engine 202, with an engine RPM sensor 216, and with a tacho sensor 217 which is mounted on the driving axle 206. Furthermore, the vehicle 201 comprises a gear shift lever 218 which acts upon the clutch 203 through a switching linkage. A switching path sensor 219 is provided on the gear shift lever 218 and is likewise in signal transmitting connection with the control apparatus.

The control apparatus provides the electric motor 212 with a setting value in dependency upon the attached sensor system (214, 215, 216, 217, 219). To this end, a control program is implemented in the control apparatus, either as hardware or as software.

The electric motor 212 acts upon the self adjusting clutch 203 through a hydraulic system (209, 210, 211) in dependency upon the signals from the control apparatus. The mode of operation of clutches corresponding to the clutch 203 is described in detail in published German patent applications Nos. 42 39 291, 43 06 505, 42 39 289 and 32 22 677. The disclosures of these publications are referred to herein as forming part of the disclosure of the present application. An advantage of a self adjusting clutch 203 is that the forces which are necessary to operate the clutch are considerably smaller than in conventional clutches due to the wear compensating design of the self adjusting clutch. Thus, the electric motor 212 can be dimensioned to consume and transmit smaller amounts of power and, therefore, the apparatus can employ a more compact setting member 213. The setting member 213 of FIG. 10 is not drawn to scale as compared with the other components of the vehicle 201.

The setting member 213 will be explained in greater detail with reference to FIGS. 11a, 11b and 12a, 12b. The electric motor 212, preferably a direct-current motor, acts through an engine shaft 220 upon a worm which meshes with a segment gear 222. The segment gear 222 carries a pusher crank which is operatively connected with a piston 225 of the master cylinder 211 by a piston rod 224. A snifting member 250 with a snifting bore or hole 251 is provided on the master cylinder 211 to compensate for thermal influences upon the hydraulic fluid.

The electric motor 212, such as a direct-current motor, exerts a pull or push upon the hydraulic master cylinder 211 through the gearbox which can be self locking. Such forces are transmitted to the clutch 203 through the hydraulic conduit 209. In this manner, the clutch 203 is engaged or disengaged in a controlled manner.

Since the parallel axes of the master cylinder 211 and the engine shaft 220 are located in different planes, i.e., they are offset, the setting member 213 occupies even less room.

A servo spring 226 is provided in the piston 225 or within the master cylinder housing 221 concentrically with the axis of the master cylinder 211. This servo spring 226 supports the electric motor 212 during disengagement of the clutch. The spring 226 is tensioned, in that its bias is overcome, during engagement of the clutch.

The cooperation between the electric motor 212 and the spring 226 will be explained with reference to the diagram of FIG. 13. The progress of forces is entered over the clutch movement. The solid line 237 denotes the force which is supplied by the electric motor 212 during engagement and disengagement of the clutch 203. The upper line denotes the force path during disengagement and the lower line during engagement. Such progress of force indicates that the disengagement necessitates the application of greater forces than the engagement. The dot-dash line 239 is the characteristic curve of the servo spring 226. The broken line 238 denotes the cooperation of forces of the spring 226 and the electric motor 212.

The overall force 238 to be applied by the electric motor 212 is greatly reduced, as shown by the displacement of the broken force line in the direction of smaller forces. Owing to the supporting action of the properly selected servo spring 226, the characteristic curve of the electric motor or the diaphragm spring is shifted in the negative direction and the maximum values observable in FIG. 13 in the positive and in the negative directions of the broken line are approximately equal. Due to such supporting action of the servo spring 226, it is possible to reduce the dimensions of the electric motor 212 in comparison with the dimensioning without the assistance from the servo spring 226. The assistance by the servo spring in this way presupposes that the electric motor is used in the pull and push directions.

Figure 12B:
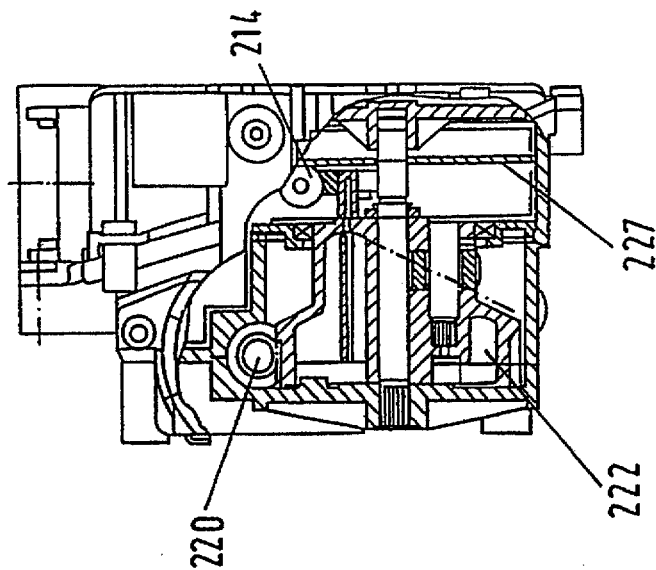
Figure 12A:
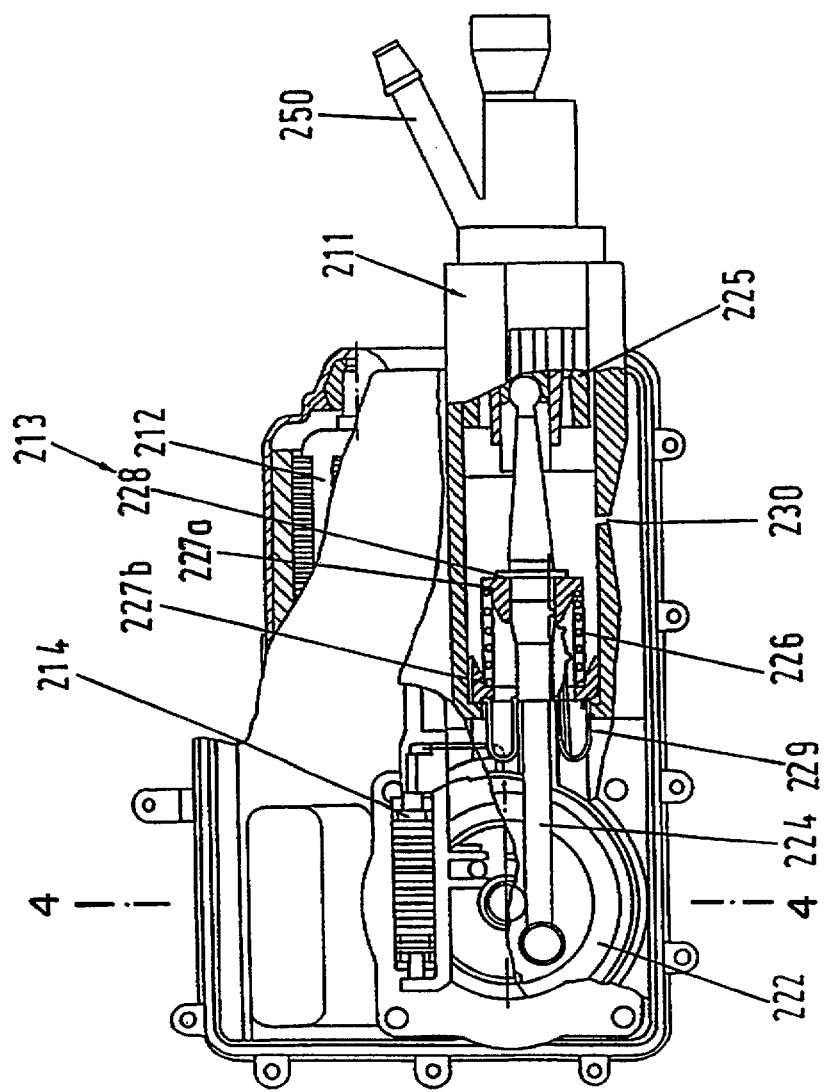

In FIG. 12a, the servo spring 226 is mounted in the actor housing wherein it is installed between two abutments 227a, 227b. The abutment 227a is spring biased against a spring ring 228 which is connected to the piston rod, and the abutment 227b bears against a portion of the actor housing. The gearbox is protected against contamination by a rubber membrane 229 which is adjacent the abutment 227a. Furthermore, the housing is provided with an aeration or ventilation bore 230 which allows drainage in the event of the escape of hydraulic fluid.

Figure 14:
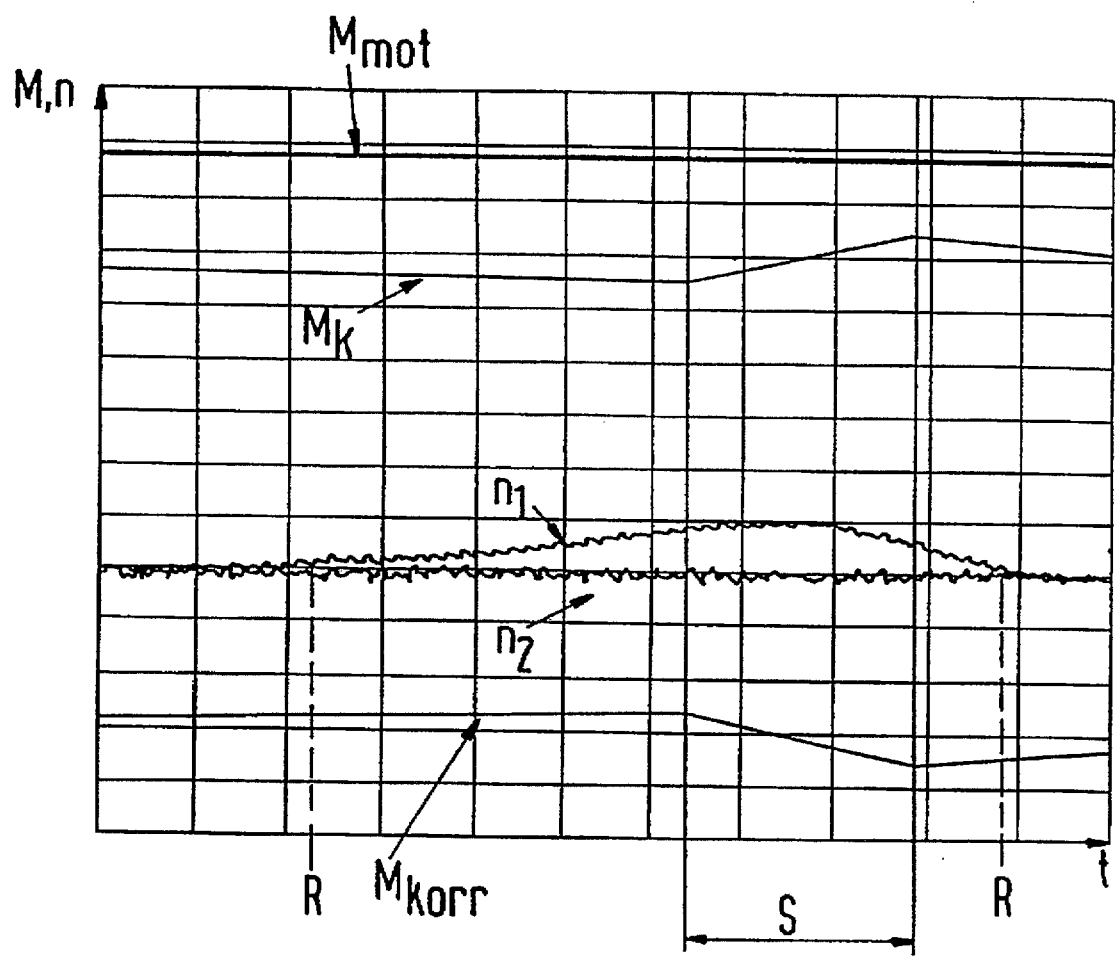

The carrying out of the control or regulation method which can be implemented with the control apparatus to regulate the torque in the torque transmission system, such as a friction clutch, is shown in simplified form in FIG. 14. The regulating method is stored as a software program, for example, in an eight-bit processor of the control apparatus. This regulating method can be used, for example, to control the operation of the electric motor 212.

The input torque $M_{Mot}$ of the engine 202 is ascertained with assistance from the throttle valve sensor 215 and the engine RPM sensor 216, and is made available to the control program as an input value. The engine RPM sensor 216 detects an engine RPM N1, and the tacho sensor 217 registers an RPM of the driving axle 206; the additional input values are also transmitted to the control program. A gearbox input RPM N2 is calculated based on the RPM of the driving axle 206. The difference between the rotational speeds N1, N2 is designated a slip RPM. The slip RPM is determined analytically within the control program and is monitored in order to ascertain whether or not its exceeds a threshold value of the slip. The rise of the slip beyond the threshold value is detected as a slip phase S. Such slip phase S prevails until the actual slip decreases below the threshold value.

The clutch torque $M_K$ is calculated by means of a correction value $M_{Korr}$ in accordance with the equation $$M_K = M_{mot} - M_{korr}.$$

The correction value $M_{korr}$ is a torque which is increased incrementally with the computer cycle and is reduced during the intervals detected as slip phases S in accordance with the control program. This method ensures that the clutch 203 is continuously close to a slip limit R. The slip limit R is the instant when the engine RPM N1 begins to exceed the gearbox input RPM N2. This happens exactly when the torque being applied at the input side is greater than the then transmissible clutch torque. Such method is satisfactory also when the input torque is not constant.

Figure 15:
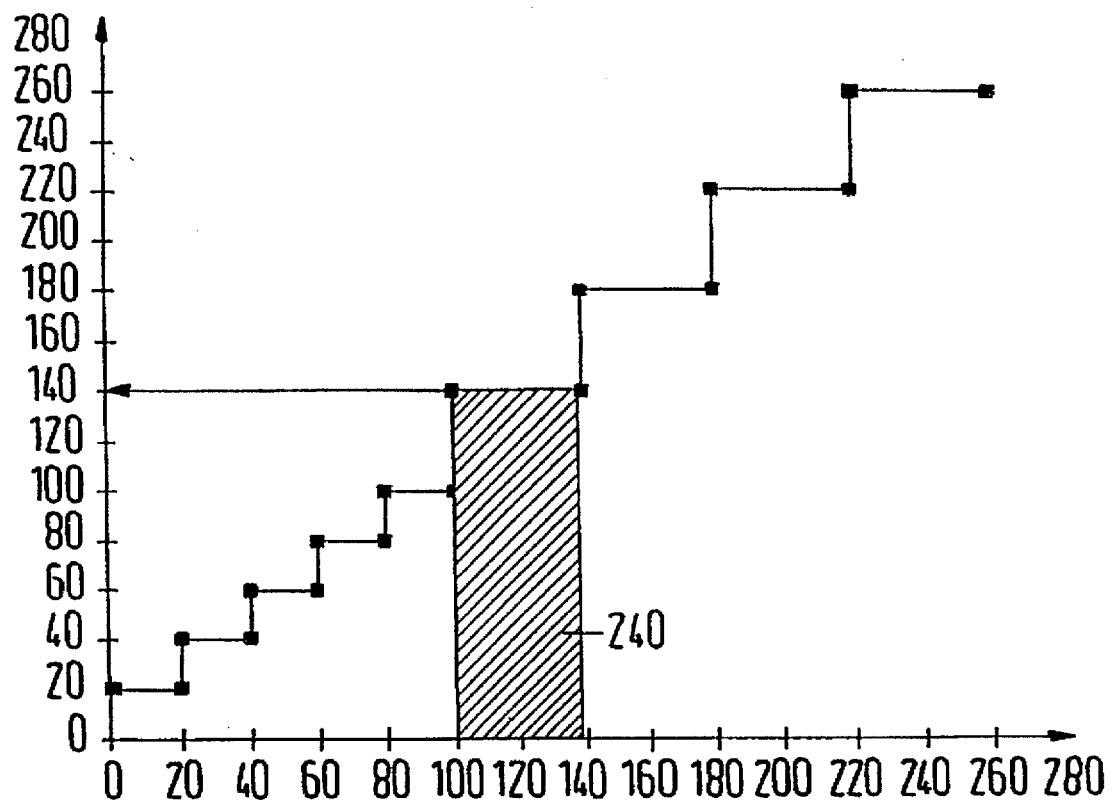
Figure 15A:
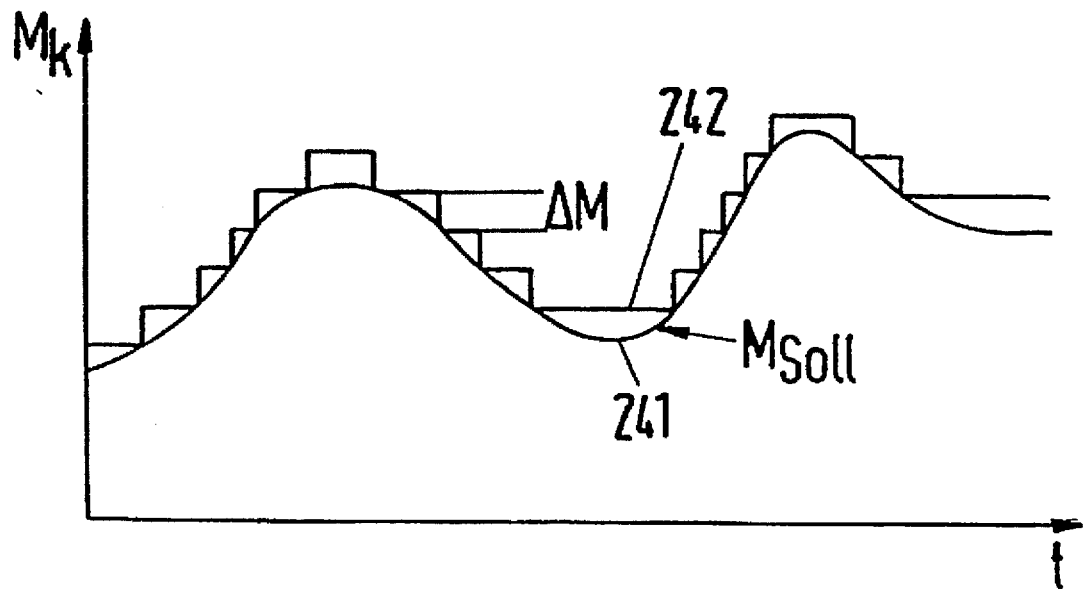

The characteristic line field which is illustrated in FIG. 15 is evaluated prior to transmission of the setting value to the setting member, especially in a torque transmission system such as a friction clutch.

The region of possible positioning of the setting member, i.e., the range of transmissible clutch torque, is measured along the abscissa. This region is divided into partial zones 240 one of which is highlighted by hatching. This highlighted area or zone 240 denotes that clutch torque which can be transmitted between 100 and 140 Nm. As long as the transmissible clutch torque which has been calculated according to the regulating method of the invention is within this partial zone, a permissible value of 140 Nm is assigned to the setting member. The procedure is analogous within other partial zones 240.

In accordance with this method, the number of setting movements of the setting member is further reduced. The setting movement, namely from one plateau to another plateau, is limited to a certain magnitude. This design of the characteristic field regarding the setting movement can be such that the number of blocks or zones 240 can vary in dependency upon the nature of application. In general, these undertakings prolong the life expectancy and reduce the energy requirements of the actuatorism of the torque transmission system.

FIGS. 15a to 15e show a selection of setting member positions to be assumed in accordance with the regulating method for a desired clutch torque.

By automating the actuation of the clutch, it is necessary to provide an actor to facilitate the conversion of control signals into disengaging or engaging steps or movements of the clutch. An adaptive control of the setting behavior of the actor can be carried out in such a way that one achieves a torque matching or torque follow up. The reliance upon torque matching is advantageous because it can ensure that the setting member not only carries out the engagement and disengagement during gear shifting and starting but also sets the clutch contact pressure during each stage of the driving operation so that the transmissible clutch torque always corresponds to a desired clutch torque reflecting the driving conditions or the operating point, or a corresponding desired contact pressure or reduced contact pressure in comparison with the clutch torque can be established. This ensures that, during gear shifting, the setting device or setter need not move from the fully engaged position and through the entire setting range in order to disengage the clutch since, as a result of torque matching or follow up, the setting device already occupies a position which corresponds to the actually selected torque plus a desired offset value. In this manner, the demands upon the dynamic behavior of the system, especially of the actor, can be reduced to ensure a maximum adjustment speed since, as a rule, shorter adjustment distances must be covered.

A dynamic torque matching or follow up designed in the above outlined manner renders it necessary that the actor and the electric motor remain in operation during the entire period of operation or driving time in order to be able to carry out a quasi instantaneous adjustment according to dynamic changes of the actual torque.

With a regulating or control method which ensures a continuous torque matching, an electric motor must constantly copy for example variations of the transmissible torque. A possibility of using the electric motor only when required can lead to a copying of the clutch torque which is realized in stages or in stepwise fashion.

The regulating or control method can ensure at all times that the clutch can transmit a desired clutch torque as determined at each successive interval of time. Copying of the clutch torque entails that one can tolerate slight overpressures $\Delta_m$ within a certain scatter band. This, in turn, means that follow-up movements of and thus the load upon the setting member can be reduced. The curve 241 of FIG. 15a denotes the calculated desired clutch torque wherein the function 242 corresponds to the desired clutch torque plus a certain scatter band. The values of the scatter band of the function 242 are derived from the step height $\Delta M$ and from the requirement that the selected clutch torque may not exceed the calculated clutch torque as well as that a change of the selected clutch torque is carried out only if the change exceeds a threshold value.

Figure 15B:
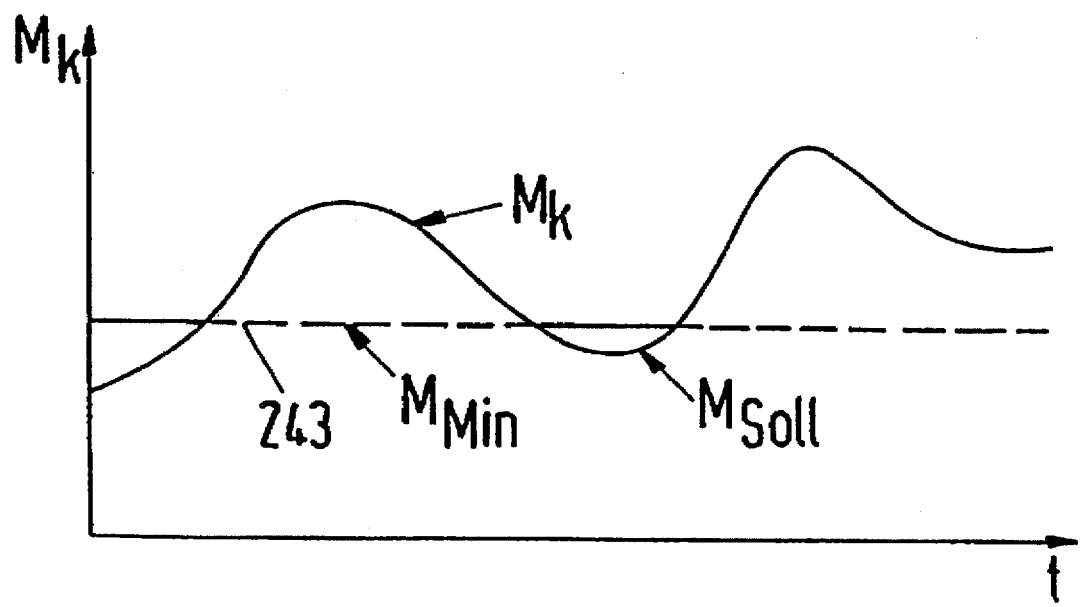
Figure 15C:
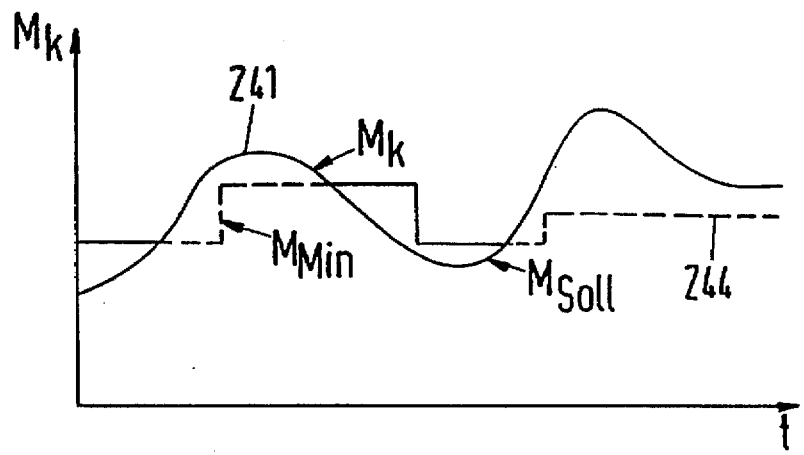

FIG. 15b shows by way of example a mode of operation in accordance with a control or regulating method wherein the desired clutch torque is adjusted above a threshold value 243. When the value of the desired clutch torque is less than or equal to the threshold value, the selected clutch torque assumes a value which can be the same as or different from the threshold value. By fixing the scatter band and a corresponding starting up, a definite excessive contact pressure develops within certain operating ranges which, however, leads to a timely shortened action of the setter and, hence, the load upon the setter is also reduced. The method according to FIG. 15b shows that a minimum clutch torque is selected at low desired clutch torques and thus the setter movements which are associated with a stressing of the setting system can be reduced. For example, the minimum clutch torque 243 can be dependent upon the operating point, e.g., upon the transmission ratio, the setting of the gearbox, the engine RPM, the position of the accelerator pedal, or upon a brake signal. FIG. 15c shows a dependency of the minimum clutch torque as a function of the operating point; the stepped curve 244 conforms to the dynamic behavior of the operating point and the copied clutch torque 241 is adapted accordingly.

Figure 15D:
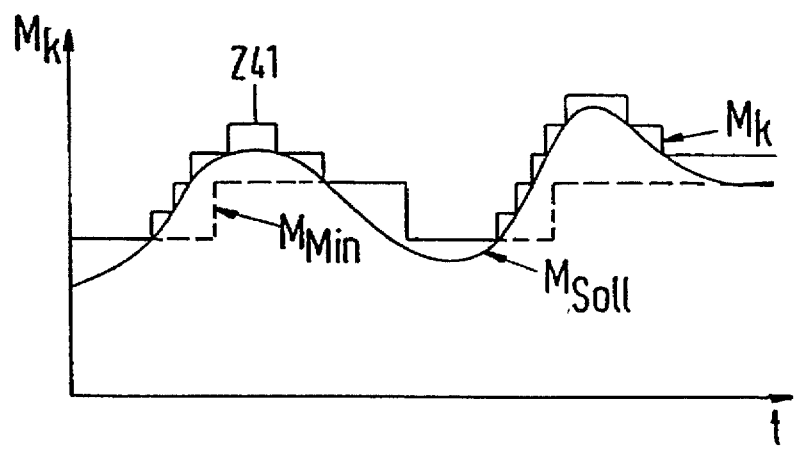

The method which is shown in FIG. 15d leads to a minimum clutch torque which is dependent upon the operating point plus a behavior combined according to the method of stepwise matching in relation to a scatter band.

Figure 15E:
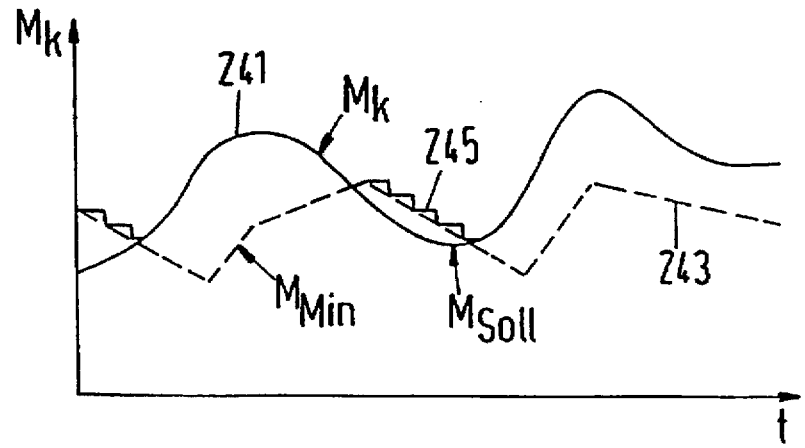

FIG. 15e indicates a behavior of the clutch torque as determined by a minimum clutch torque 243 which, however, cannot be illustrated in areas with constant value because it is a function of the time. This minimum torque is caused to conform through a step function 245 and, when the desired clutch torque 241 exceeds the minimum clutch torque, a quasi instantaneous copying of the torque is carried out without undertaking an adaption in relation to a scatter band.

Figure 16:
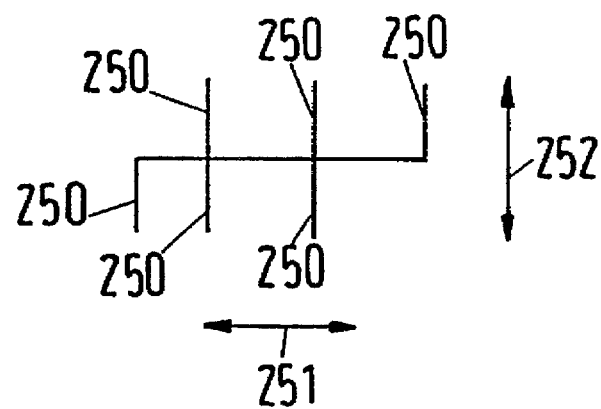

FIG. 16 shows the circuit diagram of a conventional H-circuit. One distinguishes between individual shift lanes 250 and a selection path 251 for the selection of individual shift lanes 250. The path covered by the gear lever 218 within the shift lanes 250 is designated as a shift path 252. The directions of movement along the shift path 252 and the selection path 251 are indicated in FIG. 16 by corresponding arrows.

Figure 17:
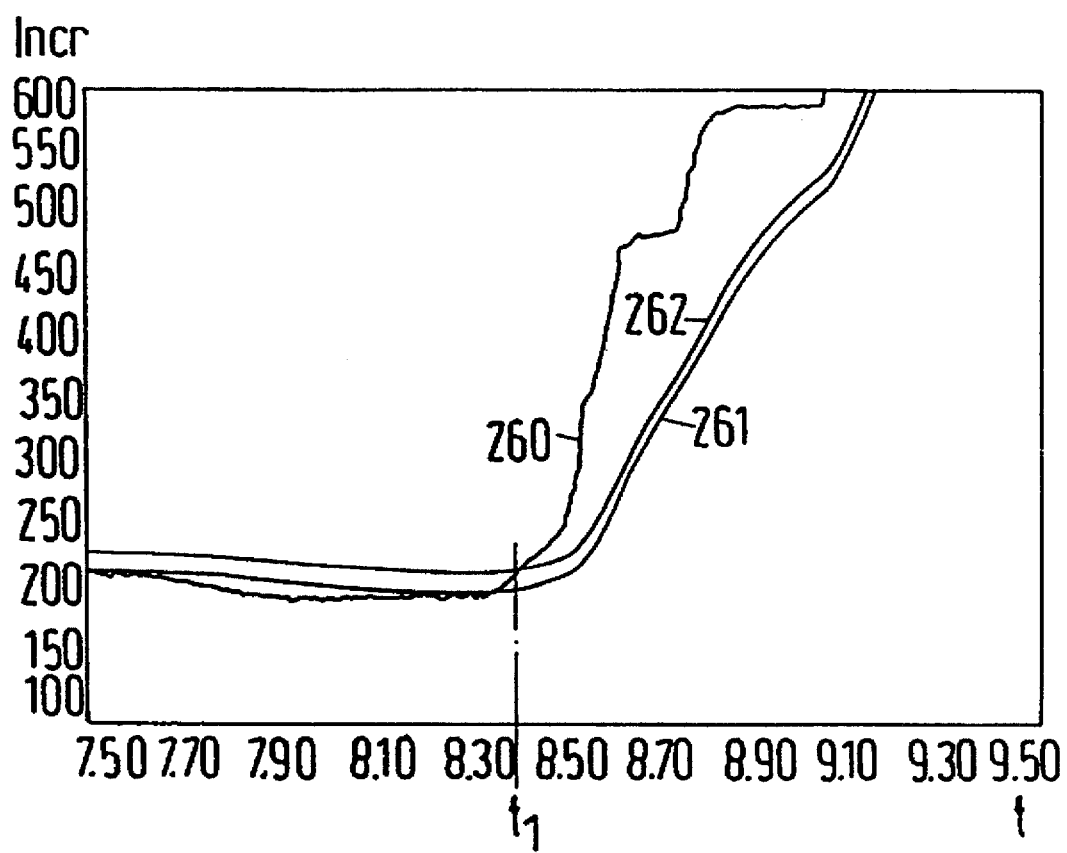
Figure 18:
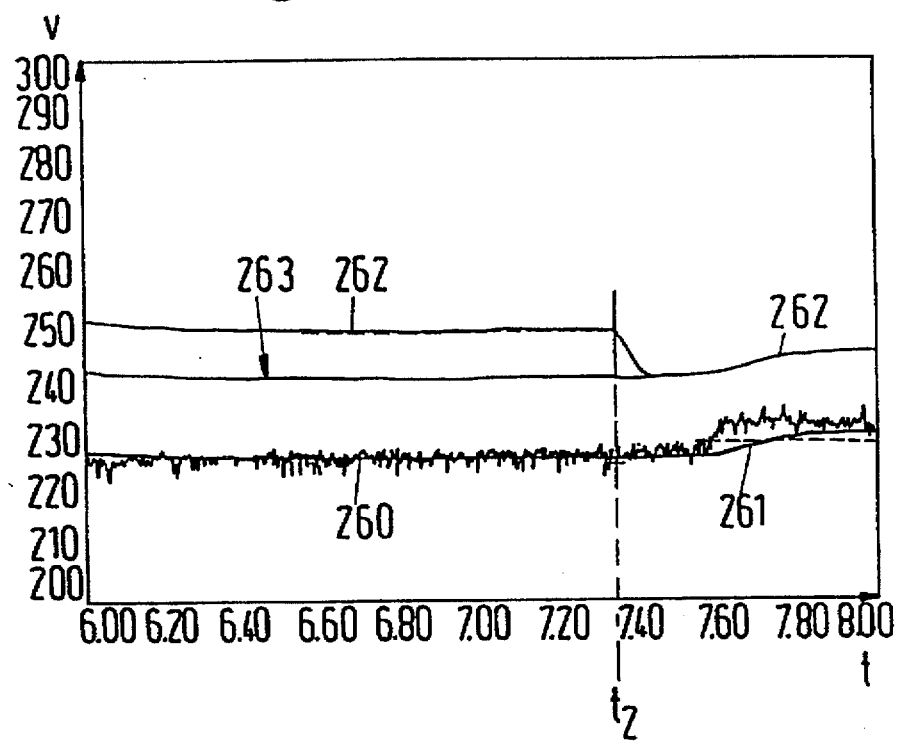

The position of the shift lever 218 can be monitored by two potentiomers, especially linear potentiometers. One of the potentiometers monitors the shift path, and the other potentiometer monitors the selection path. In order to carry out the monitoring operation which can likewise be implemented in the control apparatus, one monitors and evaluates the shift path and/or the selection path. The mode of practicing the monitoring method will be explained with reference to FIG. 17. In FIG. 17, the signal paths which are relevant for the monitoring method are shown in the form of a diagram as a function of the time t. The coordinate inscriptions correspond to any desired subdivision of the monitored shift path 252 within a computer. More specifically, a gear lever signal 260 is plotted as a function of time t and such signal is directly proportional to the monitored shift path 252.

The plotted path of the gear lever signal 260 corresponds to a typical gear shifting procedure. The gear lever 218 remains in its position approximately up to the time t denoted here as 8.3 seconds. Up to such time, the gear lever signal 260 exhibits only the vibrations which are typical of a driving operation. Such vibrations typically develop in the torque transmission system and are additionally caused to develop from the outside, for example, due to unevennesses of the road surface. After elapse of the time interval of 8.3 seconds, the gear lever 218 is moved along the shift lane 250 so that the intensity of the gear lever signal 260 increases from an approximate value of 200 increments to about 480 increments. This value remains constant for a certain interval of time and corresponds either to a holding still by the user or to the interval of time which is required to complete the advancement along a selection path 251. Finally, a gear is engaged. The value of the gear lever signal 260 increases to about 580 increments and remains substantially constant for a certain period of time. This corresponds to the time interval which is required for the synchronization of the gearbox ratio to be engaged. The intensity of the gear lever signal then rises to a value which corresponds to the newly selected and engaged gear ratio.

In addition, the gear lever signal 260 is subjected to a digital or analog filtering with an adjustable time delay so that one obtains a linearized filter signal 261 following the gear lever signal 260. The filter signal 261 is acted upon by a constant value and by an offset signal which is a function of the input torque of the driving unit 202. The thus obtained sum signal is shown in the diagram of FIG. 17 as a comparison signal 262.

The switching intent detection is carried out in dependency upon the monitoring of the time dependencies of the progresses of the gear lever signal 260 and the comparison signal 262. As soon as the path of the gear lever signal 260 crosses the path of the comparison signal 262, a switching intention counter is set to zero and is started. This point of time is shown in the diagram, as at $t_1$. The count of the switching intention counter thereupon progresses in dependency upon a computer cycle toward a predetermined maximum point of the counting value. In this manner, one provides an accurately determined control time interval during which the detected switching intent is verified. During such interval, the counter can be stopped and reset to zero at any time in response to the application of control signals. Such control signals can be transmitted by an attached system of sensors. These sensors monitor further influence values, such as the input torque, the attached load or the further progress of movement of the gear lever 218. As soon as this sensor system picks up measured values which contradict the detected switching intention, a control signal is transmitted to the switching intention counter. In this manner, the torque transmission system is protected by the aforedescribed monitoring method against faulty releases. A switching intention signal is transmitted to the next-following operating system only when the switching intention counter reaches the predetermined count prior to transmission thereto of a control signal.

The gear lever signal 260 and the filter signal 261 generated thereby are again shown drawn to a different scale. In order to generate the comparison signal 262, the intensity of the filter signal 261 is increased by a constant value and by an offset signal which is dependent upon the input torque. The constant value must be sufficiently large to ensure that the path of the gear lever signal 260 does not intersect the path of the comparison signal 262, without the existence of a switching intention, as a result of typical operational vibrations of the gear lever 218 during operation of the vehicle because this could lead to undesired releases. This must apply even if the input torque, for example, as a result of an interruption of fuel admission, has become zero and thus the offset signal has become zero. The time point for the withdrawal of the driving torque is here designated as $t_2$. Thereafter, the comparison signal 262 corresponds to an intermediate comparison signal 263 which is obtained additionally only from the filter signal 261 and a constant value. In operation, the constant value preferably conforms to the elasticity of the gear shift linkage and thus to the potential extent of vibration, such as the vibration amplitude of the gear lever.

Figure 19:
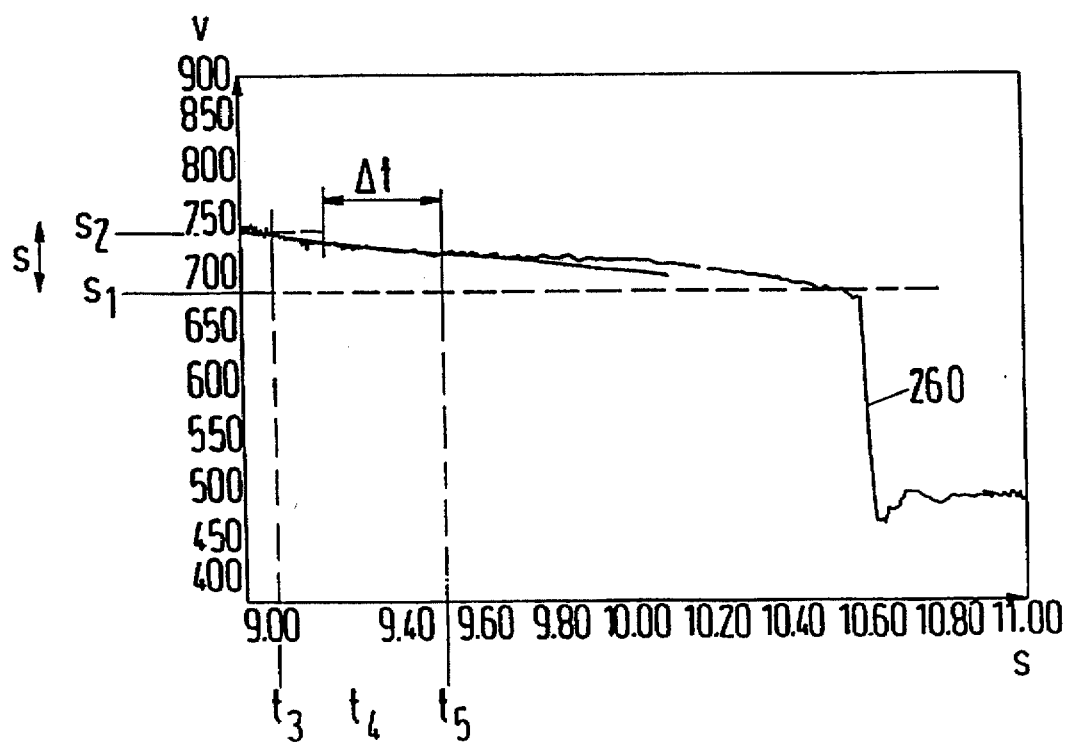

FIG. 19 shows the progress of a gear lever signal 260 in the course of an extremely slow gear changing operation. When the gear shifting is carried out with such pronounced delay, there exists the danger that the gear lever signal will not intersect the comparison signal. This would entail that the existing shift intention would not be reliably recognized. For this reason, the monitoring method is additionally expanded by the illustrated monitoring of the gear lever change, i.e., of a change of the gear lever path as a function of time. Thus, the change of the gear lever signal 260 is monitored in that the path change ascertained in a time window in a predetermined zone outside of the space which the non-operated gear lever occupies is checked to ascertain whether the intensity of the signal has decreased below a threshold value. If the intensity of the gear lever signal has decreased below such threshold value, this is presumed to denote a switching intention independently of the progress of the comparison signal 262. In the illustrated case, the shifting operation begins a time point $t_3$. The monitoring area of the gear lever path extends from a first path $s_1$ to a second path $s_2$. The monitoring time window extends from a time point $t_4$ to a time point $t_5$. The path change established during the time interval $\Delta t$ between the time points $t_4$ and $t_5$ within an area s is below a memorized threshold value and, accordingly, a switching intention signal is transmitted to the following operating systems.

Figure 20:
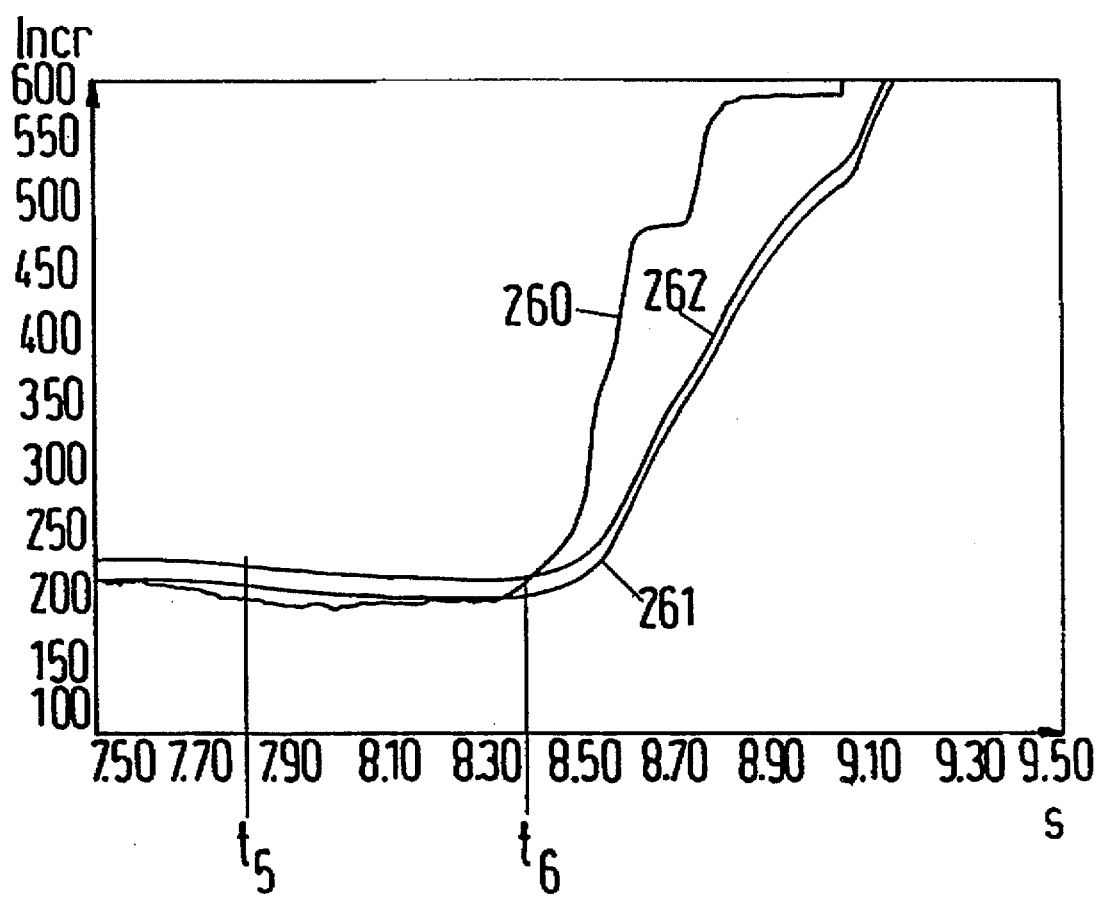

The mode of operation of the switching intention counter will be explained with reference to FIG. 20. In the embodiment which is shown in FIG. 20, the gear lever signal 260 reaches a peak at the time point $t_5$. This peak causes a crossing of the gear lever signal 260 with the comparison signal 262. Thus, the switching intention counter is started at the time point $t_5$. In addition, a timer is started simultaneously with the switching intention counter. The timer receives a signal when the peak of the gear lever signal path 260 decreases which results in a renewed crossing of the gear lever signal 260 with the comparison signal 262. The timer is thereby arrested and the then indicated time is compared with a memorized minimum time interval. In the present case, it is assumed that the time detected by the timer is shorter than the memorized time interval. As a consequence, a control signal is transmitted to the switching intention counter. The switching intention counter is thereby arrested and is reset to zero. Thus, a switching intention has been recognized through the peak at the time point $t_5$ and, consequently, the switching intention counter has been started but a transmission of the switching intention signal to the following operating systems has not taken place since a control signal was detected within the control time interval between the starting of the switching intention counter and the reaching of the maximum count. In contrast to the above, the switching intention actually existing at the time point $t_6$ is recognized and evaluated in the described way. A switching intention signal is transmitted to the following operating systems shortly after the time point $t_6$.

Figure 21:
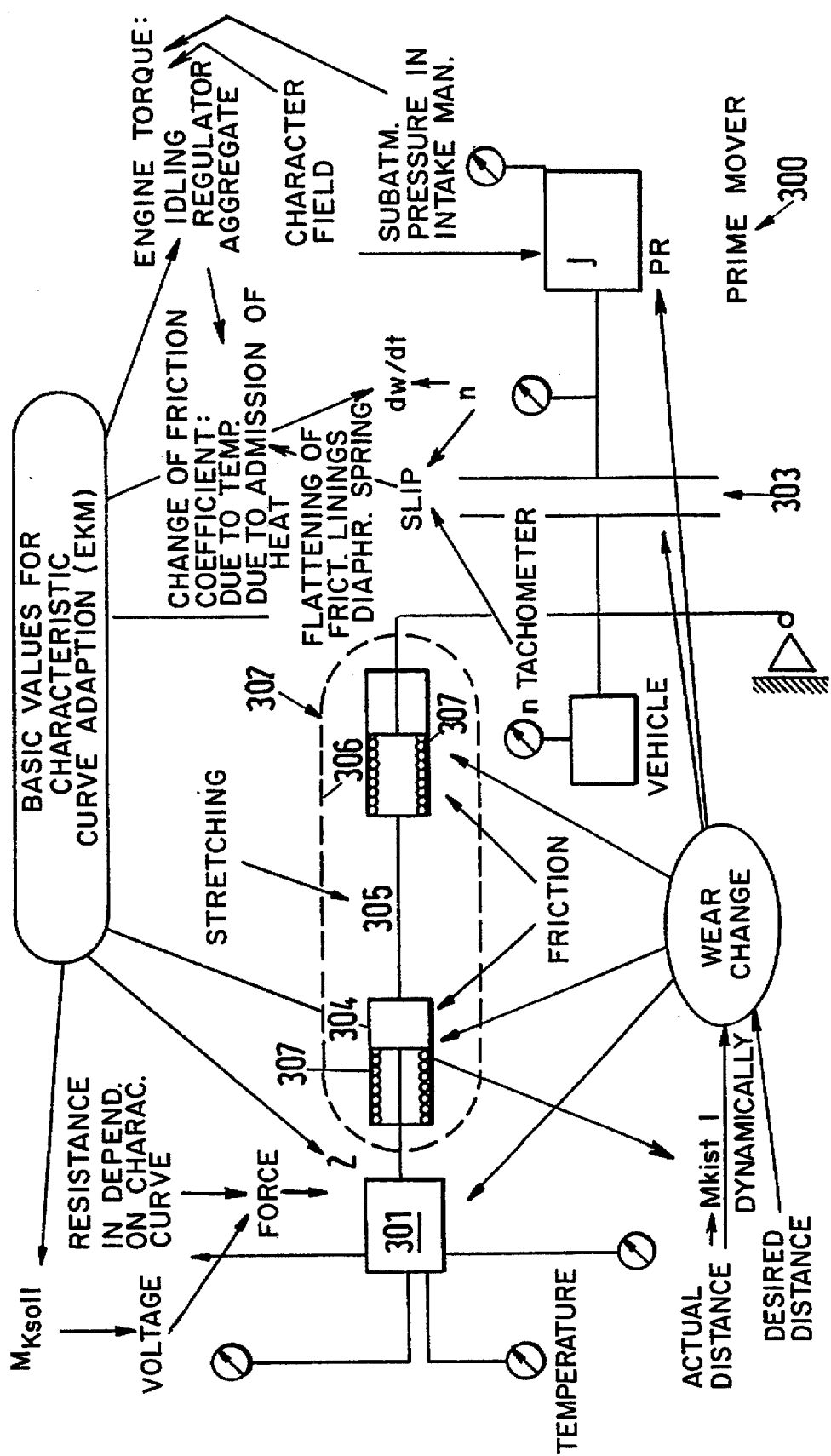

FIG. 21 is a diagrammatic illustration of a clutch operating system 300 for a motor vehicle. The total path which is being considered is established essentially by the partial system including the engine, a setting member 301 (such as for example an electric setter), a connecting system 302 and a torque transmission system 303 (such as a clutch).

The setting member 301 can constitute a mechanical or hydraulic or pneumatic setting member. The connecting system which is mounted between the setting member 301 and the torque transmission system 303 (such as a clutch) can be a linkage in the widest sense or a hydraulic connecting unit. One embodiment of a hydraulic unit is illustrated in FIG. 21 wherein a master cylinder 304 is connected to a slave cylinder 306 by a hydraulic conduit 305.

A power amplifying device can be mounted in the master cylinder 304 and/or in the slave cylinder 306. For example, the power amplifying device 307 can be a coil spring or a diaphragm spring.

The torque transmission system 303, such as a clutch, can be a friction clutch and/or a self adjusting clutch or a clutch, such as a SAC clutch, which automatically compensates or adjusts for wear.

The regulating or control method with path adaption of the clutch operating system is based on that, as a prerequisite for a successful adaption, the individual parts of the system are examined for possible changes.

In order to ensure the success of such adaption, it must first be understood which problems or which effects can play a role in or can affect the individual parts of the system and/or can influence an adaption. For this reason, the components mentioned above will be briefly dealt with again and anticipated sources of defects and problem areas will be pointed out.

The engine torque is generally determined or calculated from a characteristic field on the basis of the engine RPM and the subatmospheric pressure in the suction intake manifold (or, as an alternative, the angle of the throttle valve). In the same way, the solution of the same system or systems can be used to determine the engine torque. Errors in the characteristic field and/or when determining the subatmospheric pressure in the suction intake manifold can result in deviations from the actual torque. Furthermore, the torque takeup of the auxiliary aggregates is not known. To this extent, there develops a further departure from an accurate determination of the actual engine torque. Still further, special features of the engine control (idling regulator, knocking control, coasting switch off) can likewise entail faulty conclusions in connection with the determination of engine torque. An adaption of these special features of the engine control can be taken into consideration in connection with an adaption strategy in order to ensure an accurate determination of the engine torque. The electronic systems which are provided, for example, to turn off the coasting render it possible to process, for example, signals which in relation to terminating a coasting operation transmit a signal to the electronic clutch management in order to ensure as accurate determination of the engine torque as possible.

The setting member 301 can constitute an electric setter. In this system, a selection of a desired path, for example, of the clutch pressure plate, is converted through a path control or regulation. For a regulation, the knowledge of the actual path is absolutely necessary in order to be able to regulate in the system without permanent control deviation. The actual path can be measured and is thus available for further calculations. On the basis of a theoretical clutch characteristic line, it is possible to calculate from the actual path a theoretical actual torque $M_{KIsth}$ (thus, it is not necessary to use the desired path and to approximate the time behavior of the controls through a model).

A further possibility of obtaining an additional auxiliary value for the adaption is to calculate a theoretical push force by way of the tension and resistance. By means of this push force, it is possible to calculate a second theoretical torque $M_{KIst2}$. Any changing of the push force must reflect changes of the clutch torque. If this is not the case, then corresponding corrections can be carried out. A further possibility resides in the utilization of general forces for the transmission of torque in that the relevant actual value of the forces can be compared with the corresponding value of the actual torque in order to determine whether correspondence of the numerical value is established in the engaged and/or disengaged condition of the clutch.

If a hydraulic system is used as a connection between the setting member and the clutch, the temperature of the system and the viscosity of the torque transmitting hydraulic fluid medium play a decisive role. Furthermore, the length of the conduits and the cross sections of the pipes can be taken into consideration since, in the event of temperature changes and temperature differences, these parameters are subject to variation and may lead to inaccuracies. For example, the connecting conduit between the slave cylinder and the master cylinder can be subjected to expansion, such as a change of length or a change of the cross section each of which would be indicative of a position other than the actual position of the clutch.

The torque transmission system can be a clutch or a self adjusting clutch. The so-called influences are to be ascertained as a change of the contact pressure forces or a change of the friction value. The changes which develop in relation to the contact pressure forces will be described hereinbelow.

An adaption can also involve a change of the friction value over the energy input and a change of the friction radius as a change of the friction energy input.

Figure 22:
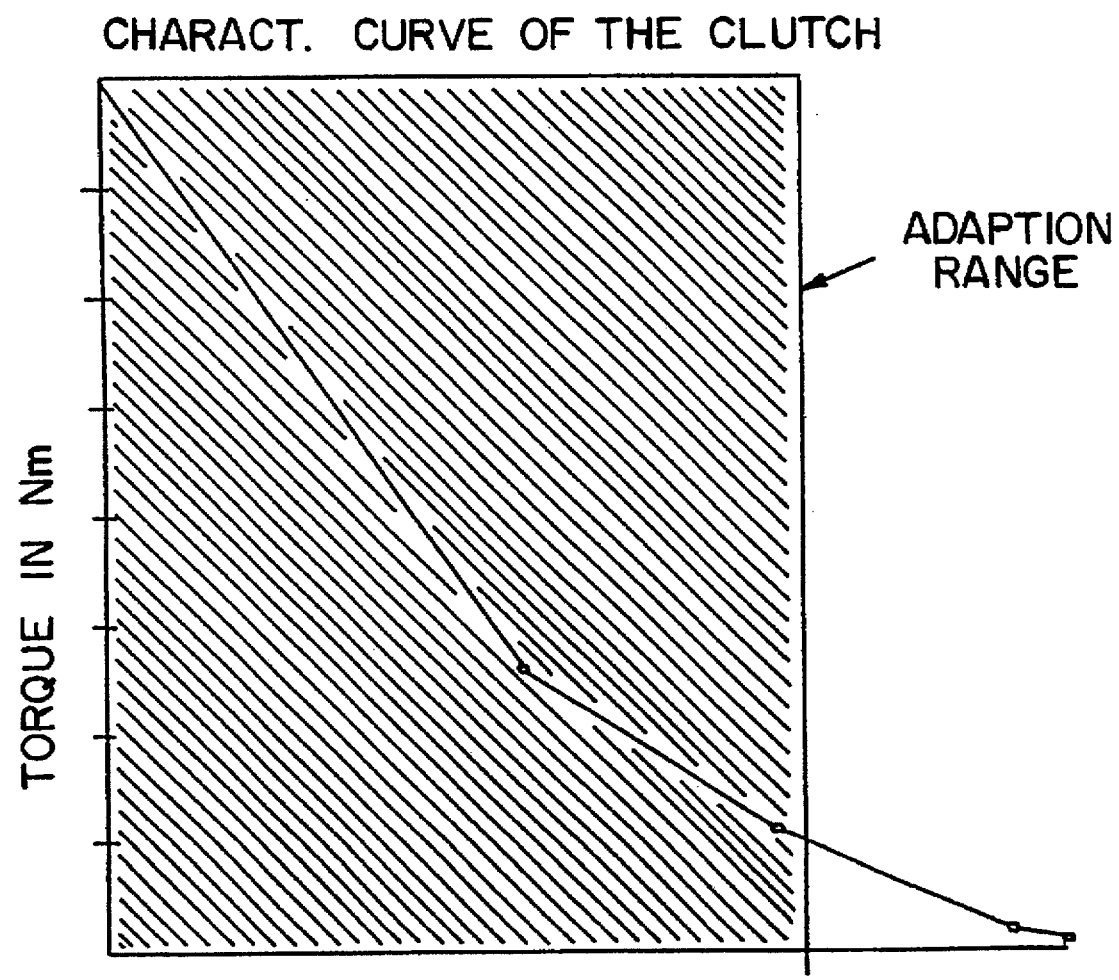

An adaption strategy can provide that the clutch torque is adapted only from a certain minimum value, see FIG. 22.

An adaption of the overall setting system of the clutch actuator unit (comprising the engine, the setting member, a hydraulic system and a clutch) provides for an identification of the contributions of the individual partial systems. Each partial system is analyzed and the possible sources of defects can be detected and the consequences of these possible sources of defects can be estimated and eliminated or reduced. It can also be ascertained which sources of defects are important and which can be disregarded.

The adaption can provide for additive shares which are taken into account. The additive shares are intended to encompass those shares which are independent of the absolute value or the absolute level of the torque. For example, the additive share can be taken up e.g., by auxiliary aggregates (consumers ahead of the clutch). However, defects of the characteristic field of the engine torque can also be compensated for through additive shares.

Figure 23:
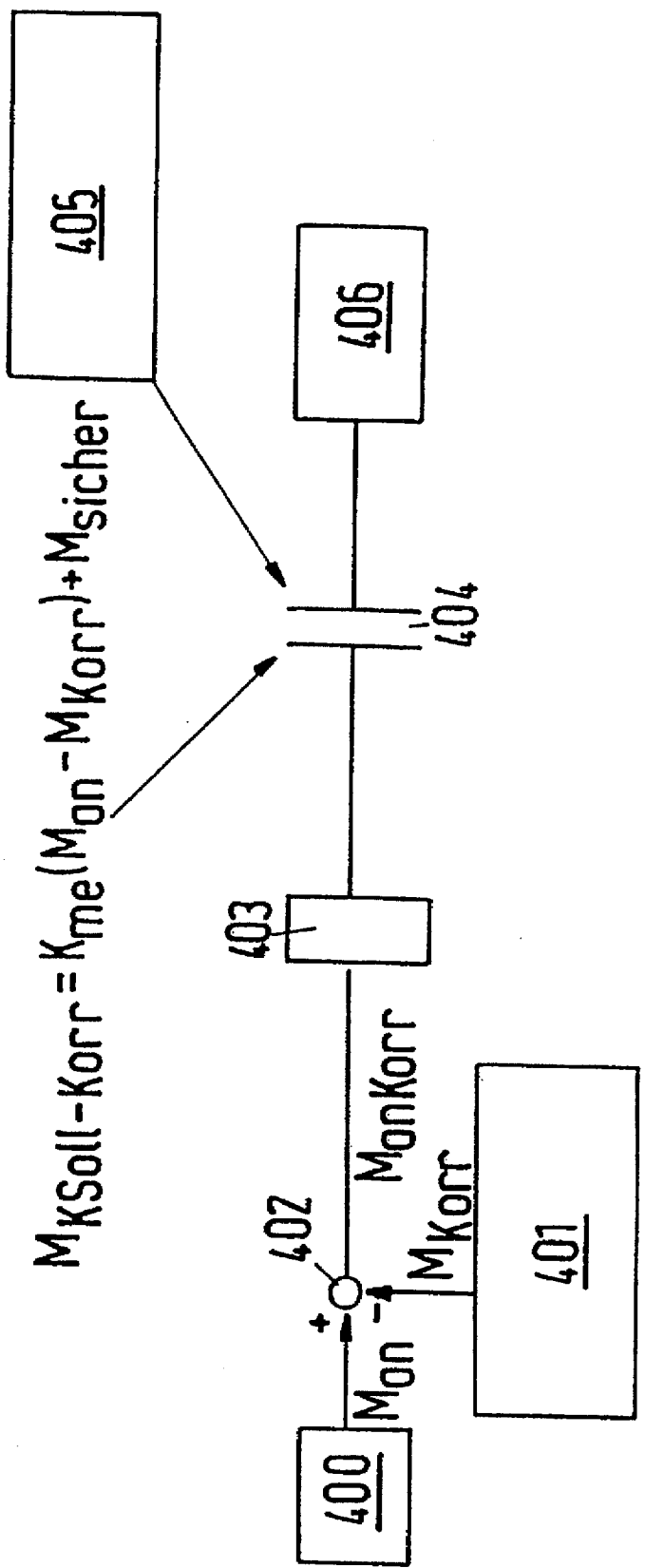

FIG. 23 illustrates a diagrammatic model or a block circuit diagram which takes into consideration the additive shares. A block 400 contains the engine with the applied engine torque $M_{an}$. A block 401 shows the taking into account of the additive shares of e.g., secondary aggregates and defects in the characteristic field of the engine. The correction torque $M_{Korr}$ to be introduced thereby is taken into consideration at the junction 402. It applies that:

$$M_{anKoor} = M_{an} - M_{Koor}.$$

The moment of inertia of the system is considered at the block 403. This can mean that, for example, only the moment of inertia of the flywheel or also of the parts of the power train is taken into consideration. A dynamically corrected torque is formed at 403 in order to determine the torque being applied by a clutch 404.

The torque can be corrected or adapted by a multiplicative share. Sources for the necessity of multiplicative shares are, for example, the changing friction value, e.g., as a function of the temperature and aging of springs for the linings with their changed spring characteristics.

If the assumed and the actual friction values differ from each other, the error becomes greater the greater the required clutch torque.

A block 406 denotes the vehicle mass in the block circuit diagram of FIG. 23.

An adaption method can be designed in that, in the case of a consumer adaption, one ensures that the clutch torque $(M_{KSoll-Korr})$ is reduced to such an extent that it leads to slippage of the clutch. This can be explained in that the value of $M_{Korr}$ (correction of the aggregates) is increased according to the equation $$M_{KSoll-Korr} = K_{me} * (M_{An} - M_{Korr}) + M_{sicher}$$

until the development of a slip. During such slip phase, the clutch torque can be increased again according to a predetermined always accurately defined function (e.g., ramp-like lowering of $M_{Korr}$) until the slip is reduced. Based on such behavior, an evaluation of the consumer can take place; the evaluation can be carried out each time or only once or several times per slip cycle.

In an ideal case when the actual characteristic curve of the clutch corresponds to the assumed characteristic line, the value of $M_{Korr}$ contains that proportion of the torque which the consumers branch off or require. On the basis of such estimation or calculation, and assuming the presence of a defect in the engine torque, it is possible to furnish information concerning the friction value.

Since there are no negative consumers, negatively adapted consumers can be adapted or interpreted as a friction value which is too low. Furthermore, the torque takeup of the individual consumers is restricted, and the corresponding absolute level need not be known at all. Thus, exceeding a threshold value can be interpreted as a friction value which is excessive.

Based on an appropriate selection, fixing of an upper barrier or threshold value renders it possible to avoid the selection of a value which is excessive so that the detection of a change of the friction value would be too late. It can likewise be avoided that, when the threshold value is too low, the secondary consumers would be interpreted as a change of the friction value.

It can be advantageous if the adaption is carried out only in the course of a pulling operation; in such event, the adaption should be carried out above a minimum torque.

Such simple adaption method (see also FIG. 14) entails that a splitting of the adaption model into an additive portion (consumers, etc.) and a multiplicative portion takes place only by fixing or determining the limits. Within the limits, the portion is assumed to be additive, and outside of the limits the portion is assumed to be multiplicative defects of other causes, such as for example of the engine torque.

In this manner, an error or a breakdown of the engine torque is added to the consumers or to the characteristic curve of the clutch.

Figure 24:
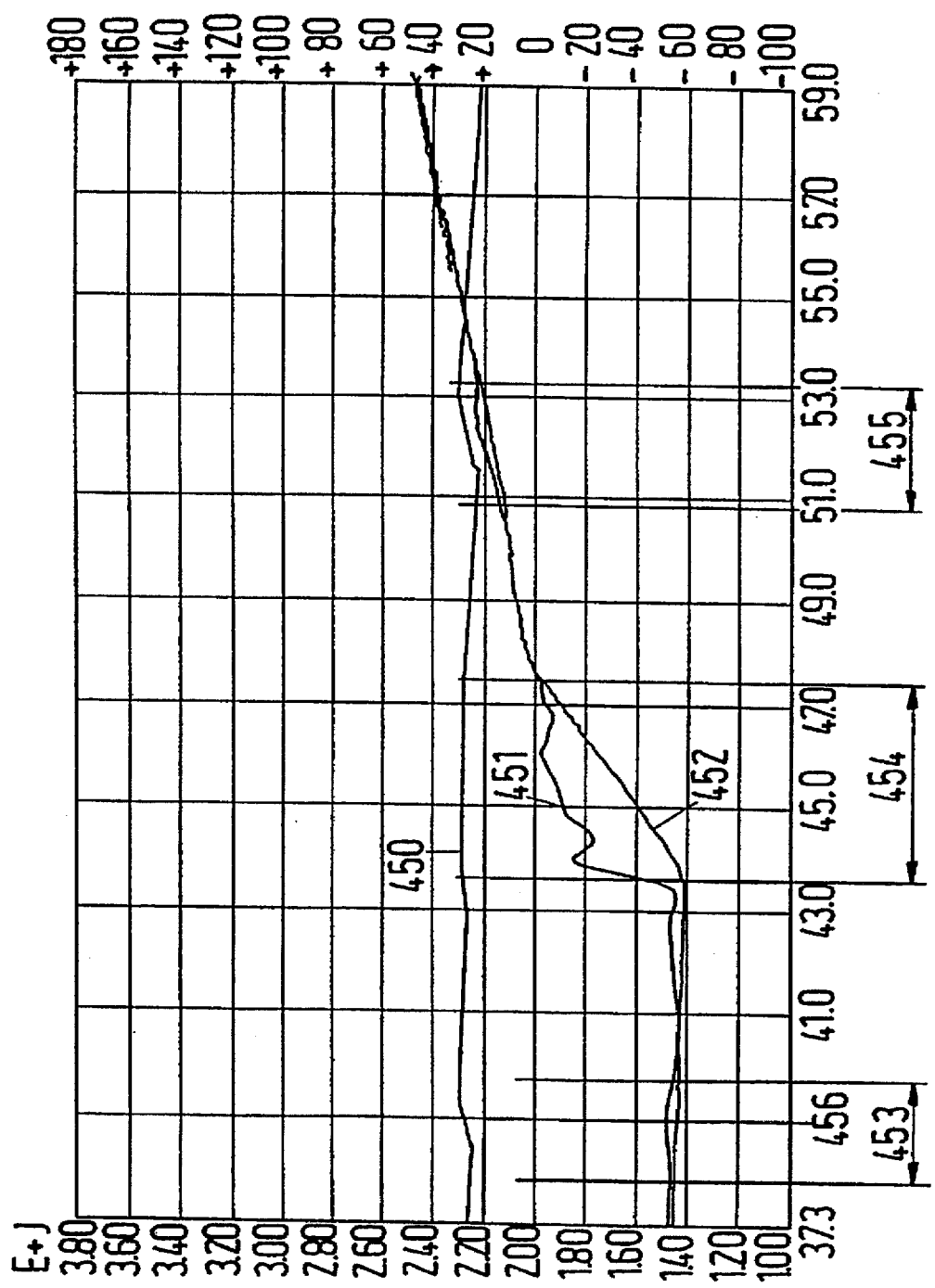

FIG. 24 provides an example of an embodiment, namely an estimate or appraisal of the additive and multiplicative portions in the slip phases with different load conditions.

The curve 450 denotes the timely progress of the corrected clutch torque. The curve 451 indicates the timely progress of the engine RPM $n_{mot}$, and the curve 452 the timely progress of the gearbox input RPM $n_{Getr}$.

At the onset of the observation time point shown in this example, the engine RPM 451 is approximately equal to the gearbox RPM 452. The corrected clutch torque shows a slightly decreasing time behavior.

A slip phase takes place during the time interval 453 and the engine RPM 451 is slightly above the value of the gearbox RPM. The clutch torque 450 rises after the detection of the slip phase. At the time instant 456, the engine RPM 451 reaches a relative maximum and the increase of the clutch torque permits the engine RPM to drop again. A so-called tip-in takes place at the beginning of the time period 454, i.e., an increase of the engine RPM is introduced for a short interval of time. No adaption takes place during this phase and the gearbox RPM follows the engine RPM 451 with a time delay.

The time period 455 involves a slip phase, the same as the time period 453.

Since the consumer adaption is or can always be close to the slip limit, there exists the additional possibility of evaluating those slip phases at which the overall contact pressure changes or has changed, i.e., the desired torques at the clutch or at the torque transmission system lie at different levels, for example, by showing different engine torques and/or load conditions. A prerequisite for this is that the actual consumer has not changed, i.e., too long a time span between the slip phases is not a very favorable indication.

If the consumer value does not change at different load conditions, such as in the slip phases 453 and 455, it can be taken for granted that the assumed and/or determined and/or calculated friction value corresponds to the actual friction value of the clutch.

In such a case, the friction value can be corrected or a correction can be carried out.

In this embodiment, it is advantageous to carry out a division into an additive and a multiplicative portion.

In the event of a consumer change during the interval of adaption, a separation of a friction value change and a consumer change cannot be correctly carried out; however, this can be compensated for to a large extent through an increased frequency of the adaption procedure.

Furthermore, it is possible to carry out adaption during the constant phase after load changes, and such adaption can be combined with other adaption strategies as a result of potentially long intervals of time.

It is also possible to carry out an adaption of the multiplicative portion in dynamic areas or cases, such as e.g. a tip-in and/or during starting. In the event of a slip, it applies that $$M_{an} - M_{korr} - \frac{\mu_{ist}}{\mu_{theo}} * M_{KSoll_{korr}} = J * d\frac{\omega}{dt}.$$

By means of this equation, it is possible to detect the unknown values, $\mu_{ist}$ and $\mu_{theo}$ being the actual and theoretical friction values.

Figure 25:
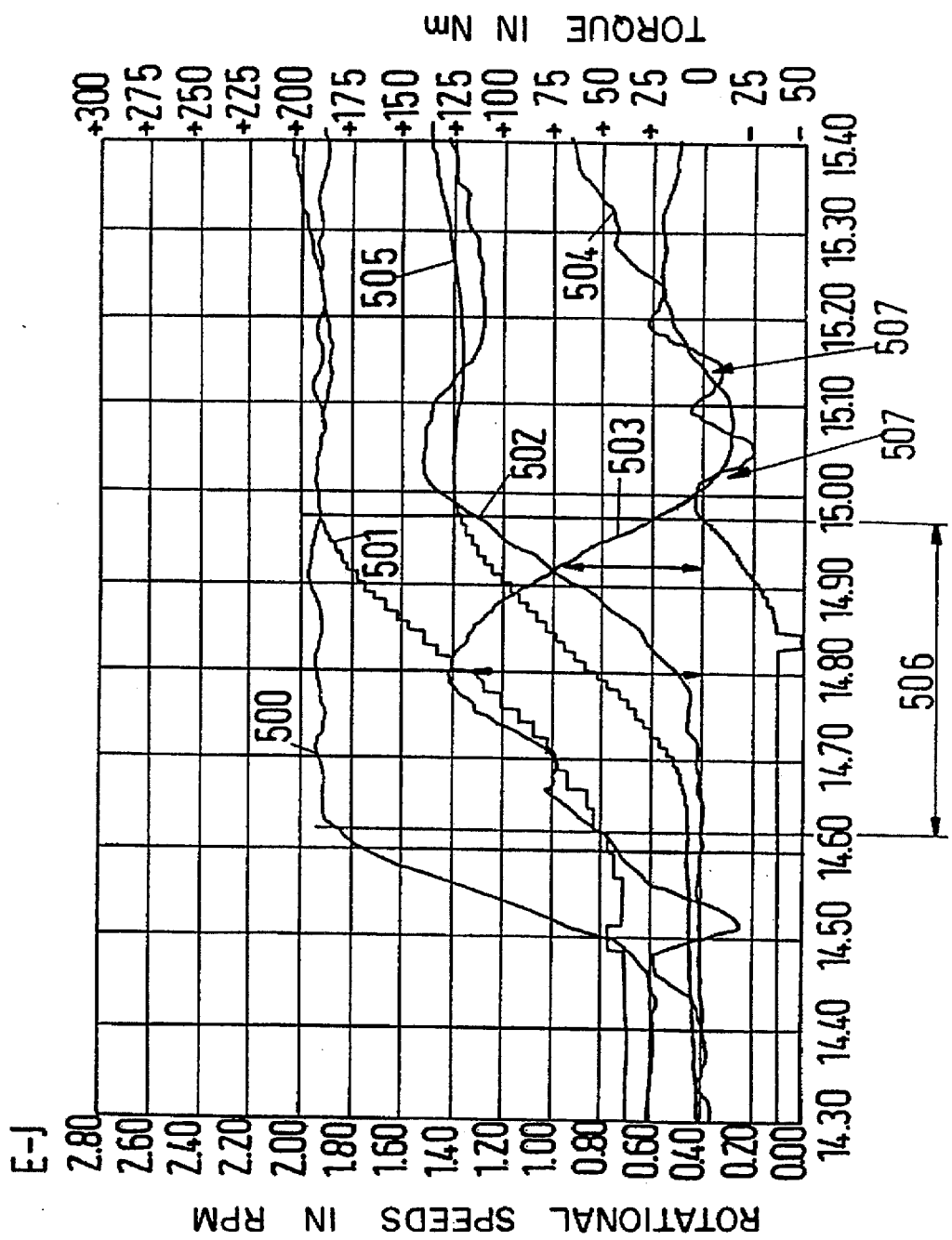

This adoption method will be explained in greater detail with reference to FIG. 25 which shows the timely behavior of the applied torque 500, of the actual clutch torque 502, engine RPM 501, J*dω/dt 503, the gearbox RPM 504 and the corrected desired clutch torque 505.

In the phase 506 in which the applied engine torque 500 is constant, a change of J*dω/dt 503 must be correlated with a change of the corrected desired clutch torque when the selected clutch torque 505 does not change. However, such condition is fulfilled in most situations since, as a rule, the consumers hardly change on short notice. If these alterations are not correlated, i.e., if a change of the corrected desired clutch torque 505 does not entail a change of J*dω/dt (503), the friction value must be corrected accordingly. If the change of the torque 505 exceeds that of 503, the theoretical friction value must be lowered because the actual friction value is less than the assumed value. If the reverse happens, it is necessary to proceed accordingly.

This method renders it possible to directly calculate or determine the friction value. It is therefore possible to calculate the level of the value of the secondary consumers at a point of time when the engine RPM gradient is zero, such as e.g., at the positions 507 because the engine torque is known. At such time, it applies that:

$$M_{korr} = M_{an} - \frac{\mu_{ist}}{\mu_{theo}} * M_{KSoll_{korr}}.$$

Since the setting member lies between the calculated desired torque $M_{KSollkorr}$ 505 and the actual torque of the clutch 502, and since as a rule the setting behavior is not to be disregarded, it is possible to carry out a modelling of the setting member in order to further enhance the quality of adaption in dynamic cases. If the setting device of an electronic clutch management system is operated by an electric motor, it is possible to calculate, based on a path measurement, for example, in the master cylinder, a theoretical actual torque 502 from the measured actual path and a characteristic line. This can be used in lieu of the desired torque and shall be designated as $MK_{ist}$ 502. In this manner, one circumvents the dynamic proportion which arises through the path regulation. The adaption method is particularly advantageous under all driving conditions when a slip occurs. It is likewise advantageous that a division into a multiplicative and an additive portion can take place.

A further possibility for adaption offers the identification of the multiplicative portion through the evaluation of starting speeds. This simple possibility of identifying the additive and multiplicative portions consists in the evaluation of a starting procedure. At the point of time when the engine is idling at an idling speed, the driver has not caused the admission of any fuel and the torques being applied by the engine are used to satisfy the needs of the engine and to compensate for the auxiliary aggregates. Therefore, the value of the engine torque which is assumed to exist in such situation can be assumed as the reference or starting point for the value of the corrected torque. During starting, when the driver steps on the gas pedal, the reached engine RPM is evaluated at a certain point of time. The engine RPM is related to the applied clutch torque which is the actual engine torque minus the engine torque shortly prior to the admission of fuel. It is possible to resort to a table in order to compare whether the engine RPM pertaining to the applied engine torque corresponds to the actual engine RPM. In the case of larger deviations, a change of the friction value exists and the friction value stored in the control computer can then be corrected accordingly.

Figure 26:
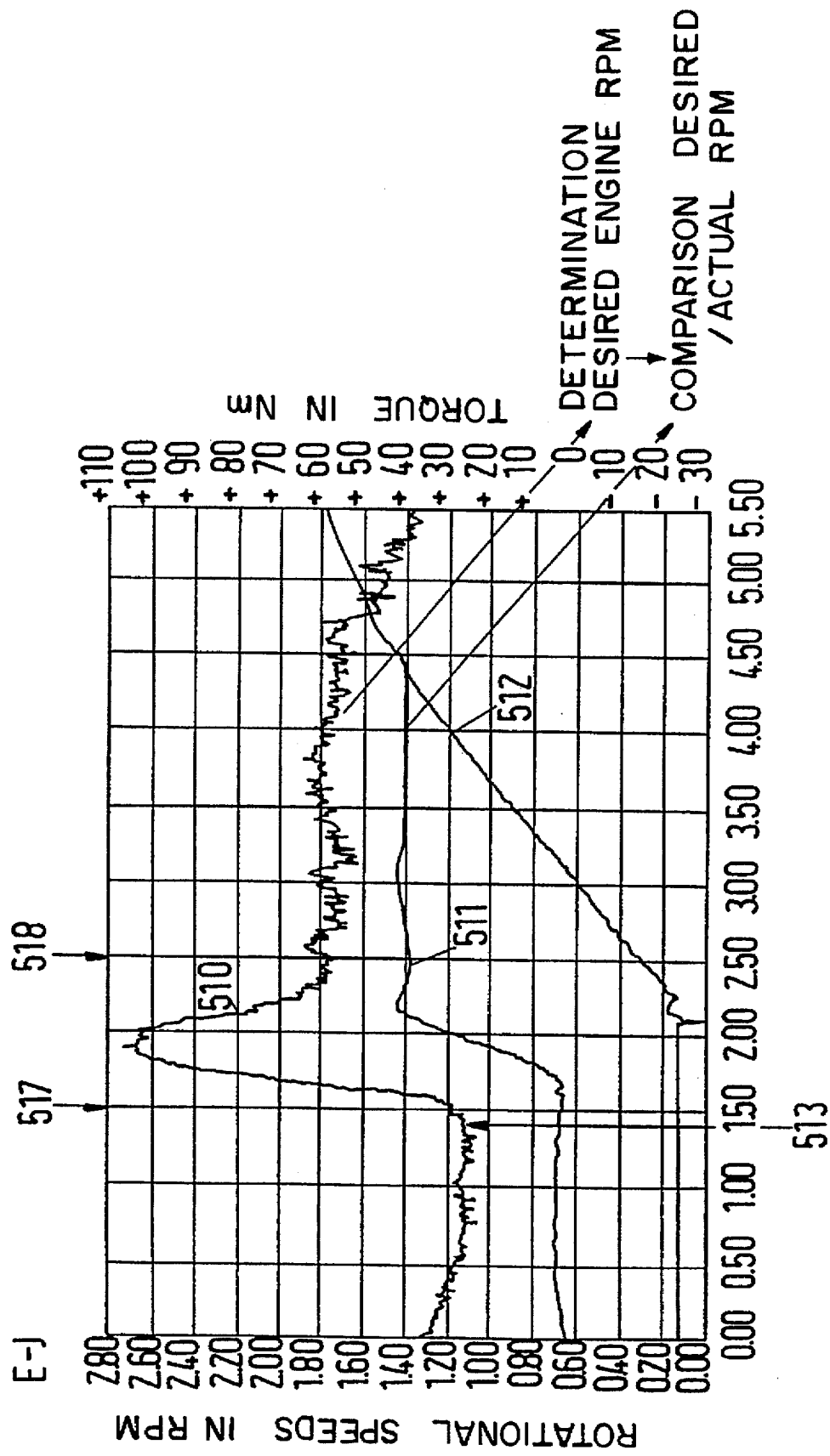

FIG. 26 shows the applied engine torque 510 and the engine RPM 511 as well as the gearbox input RPM 512 as a function of time. The vehicle is idling prior to a time 517, and the power- or torque takeoff of the auxiliary aggregates is evaluated based on the values in the range 513. During the interval following the time point 518 which is fixed after an acceleration phase, a desired engine RPM can be determined from the value of the applied engine torque and this desired RPM can be compared with the actual value 511 of the engine RPM and thus an estimation can be made of the friction value. This procedure allows a division into a multiplicative and an additive portion. No effects can be detected in the case of a dynamic change of the setting member. The adaption according to this method is characterized in that it is only possible when starting and a defect of the engine torque signal can influence the adaption.

A further possible method of adaption can consist in that the identification of the entire characteristic curve is carried out using point-like supporting spots. This possibility, for systems with a detectable setting value, such as the position of the disengaging system or the disengagement path, can advantageously be applied for the calculation if at the beginning of a dynamic adaption the adaptive part, the consumer torques and/or aggregate losses are known at least approximately. A calculation of the offset signal in the case of unknown consumer torques and aggregate losses could also be carried out by undertaking the determination through numerical processes.

In order to identify the characteristic curve, one could compare, at certain path points or supporting points of the characteristic curve, the corresponding calculated theoretical clutch torque 520 with that based on the characteristic clutch curve and the actual path 521. In the event of a departure, the supporting spots would then be corrected incrementally, and it then applies that:

$$M_{kupplungtheo} = M_{an} - M_{korr} - J * d\omega/dt.$$

Figure 27:
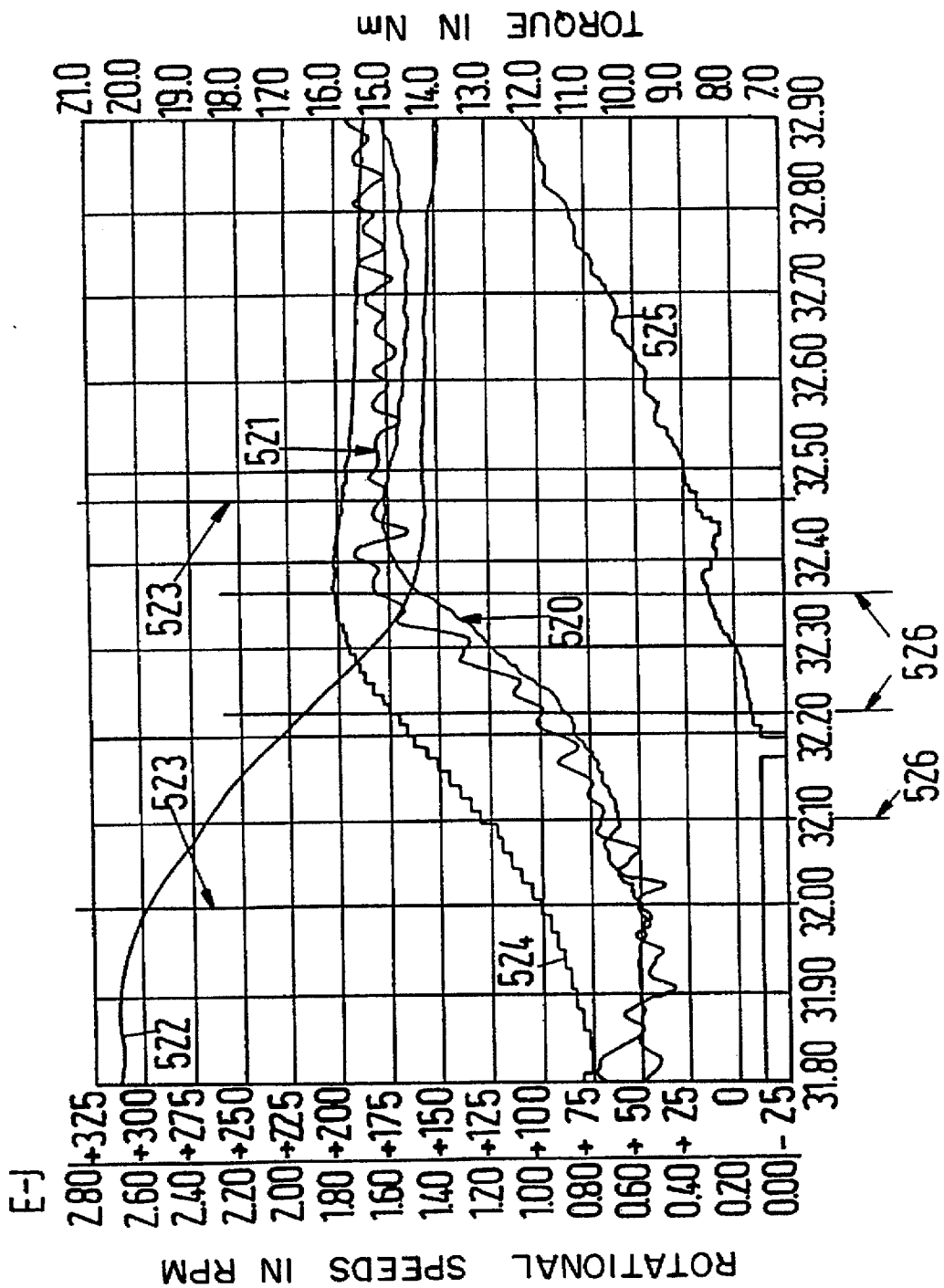

FIG. 27 shows a change of the actual distance covered by the setting member on the basis of the actual value 522 in a time window 523 to detect the engine RPM 524 and the gearbox RPM 525. By using the supporting spots 526, it is possible to determine from the actual path and from the knowledge of the characteristic curve of the torque transmission system the corresponding calculated clutch torque 520 which can be compared with the actual clutch torque. FIG. 27 shows these values as a function of time, the supporting spots 526 being adapted to be defined by using the information regarding the location of the path of the setting member, and the spreading out of individual supporting spots takes place according to the speed of movement of the setting member.

FIG. 28 shows a characteristic clutch curve 530 with supporting spots 531 at which the clutch torque is determined and calculated. Furthermore, there is shown the adaption range 532 which need not be fixed for the entire length of the characteristic clutch curve. It can be advantageous if the torque area is adapted above a threshold value 533 and an adaption below the threshold value 533 takes place in order to set a minimum value as proposed, for example, in FIGS. 15a to 15e. Such adaption can be independent of the recorded basic path of the characteristic curve. Errors of the theoretical characteristic curve are compensated for.

Consequently, the adaption of supporting spots also affects the operating areas which do not lie on the supporting spots; however, an extrapolation is necessary in such cases since the adapted operating points are not or need not necessarily be touched.

Figure 29B:
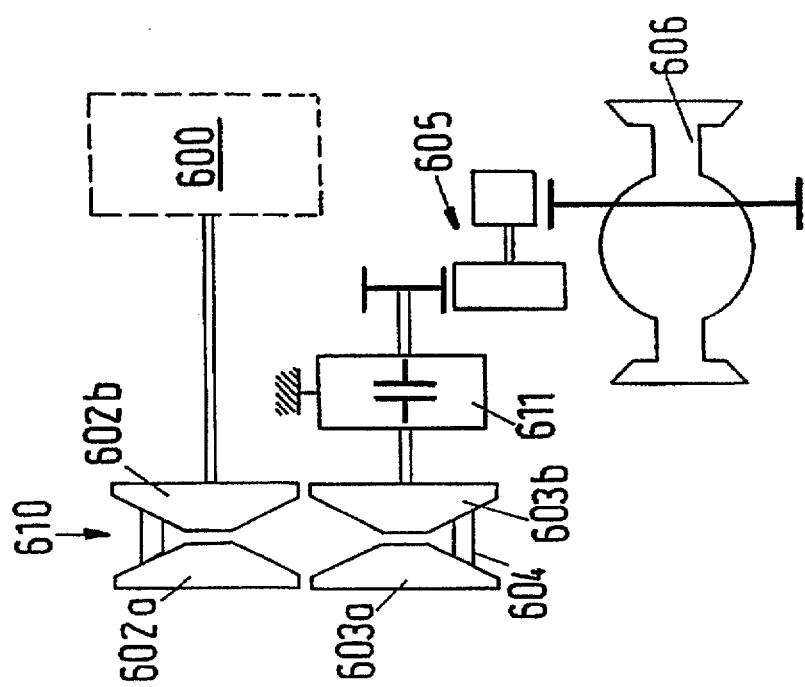
Figure 29A:
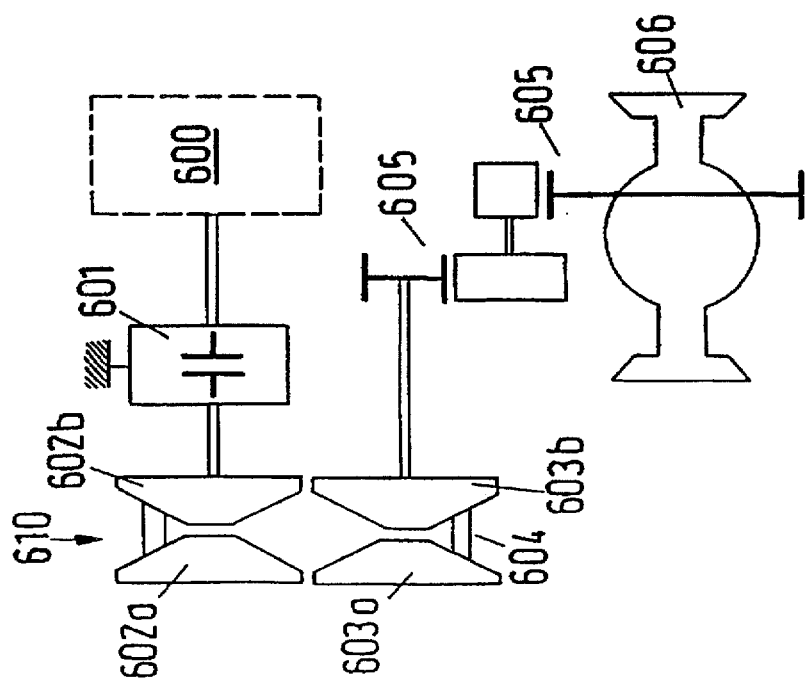

FIG. 29a shows diagrammatically a power train of a vehicle with a driving unit 600 and a torque transmission system 601 connected in the power flow at the output side of the driving unit. An automatic gearbox 610 is installed at the output side of the torque transmission system, this automatic gearbox being illustrated diagrammatically as a cone pulley belt contact gearbox without being restricted thereto. The gearbox can also be an automatic infinitely adjustable gearbox, such as for example a friction wheel gearbox or a friction ring gearbox.

The cone pulley belt contact gearbox consists essentially of a variator which is assembled of two pairs of cone pulley sets 602a, 602b, 603a, 603b, and a contact or draping means 604.

At least one fixed transmission stage 605 is connected at the output side of the variator of the cone pulley belt contact gearbox and acts upon a differential 606.

FIG. 29b shows the same structural arrangement except for the position of the torque transmission system 611 which is installed in the power flow at the output side of the gearbox 610, such as a variator.

The contact pressure of the contact means is selected in such a way that it does not permit a slip of the contact means relative to the sets of cone pulleys. A control system regulates the contact pressure of the contact means 604 between the pairs of cone pulleys in order to prevent a slip since slipping can lead locally to damage and even to destruction of the contact or draping means.

In the event of a change of the applied engine torque, an adaptive regulation can select the transmissible torque in advance or as a follow-up, and a change in the operating point can result in slipping of the contact means, such as a chain.

The pressure of the contact means must take place with an excess contact pressure in order to avoid, in the event of for example torsional vibrations in the power train, any slipping as a result of a temporarily increased adjoining torque.

The application of contact pressure with the lowest possible excess contact pressure is desirable since the excess contact pressure leads to friction losses and thus to a reduction of the efficiency and an increased fuel consumption. A reduction of the excess contact pressure can lead to the danger of slippage of the contact means.

The aforedescribed fluctuations of the torque which is being applied and which is to be transmitted by the variator can be calculated and taken into account by means of a control method since a dependency upon the operating point can be adapted.

Furthermore, unforeseen torque surges can take place at the output side, such as for example if the vehicle passes with turning tires from a smooth road surface to a non-skid road surface. Under such circumstances, a torque surge which cannot be calculated in advance develops at the output side. Neither the timely progress nor the amplitude of such surges can be calculated in advance.

In order to protect the variator from such torque surges, and as shown in FIGS. 29a and 29b, a torque transmission system 601, 611 is mounted in the power train and is controlled in such a way that the torque which can be transmitted by the torque transmission system is always less than the torque which can be transmitted by the variator.

The application of transmissible torque of the torque transmission system 601, 611 guarantees at each operating point that the torque which can be transmitted by the variator is greater than the torque which can be transmitted by the torque transmission system. Thus, the torque transmission system constitutes a torque-guided overload clutch which can be adaptively controlled at each operating point. Due to the adaptive control of the torque transmission system, it is possible to reduce the contact pressure of the contact means so that the safety reserves for protecting against slippage of the contact means can be reduced. Thus, the efficiency of the gearbox can be increased without endangering the safety of the variator.

The torque transmission system can be used as a discrete safety clutch and/or as a turning set clutch and/or as a lockup clutch in a torque converter or additionally as a clutch for adjusting the variator.

The mounting of the torque transmission system at the output side is particularly advantageous because load surges are detected earlier at the output side than in an arrangement at the input side since, in the case of introduction of a torque, the rotary masses of the variator are still effective.

An arrangement at the output side exhibits the additional advantage that, when the vehicle is at a standstill but the engine is running, the variator rotates and rapid adjustment or an adjustment from standstill can be carried out more rapidly.

If the torque transmission system is installed at the output side, it is necessary when determining and/or when calculating the applied engine torque to take into account the transmission ratio of the variator and the losses.

The invention is not limited to the illustrated and described embodiments but also encompasses especially those modifications which can be arrived at through a combination of features and elements described in connection with the present invention. Furthermore, individual features and methods described in connection with the drawings can be considered to constitute independent inventions.

The applicants reserve the right to claim, as being important for the invention, additional features which at the present time are disclosed only in the specification, especially in connection with the drawings. Thus, the claims filed with this application are merely proposed formulations without prejudice to achieving broader patent protection.

We claim:

1. A method of monitoring a torque transmission system with a manually switchable gearbox, comprising the steps of detecting by a sensor unit at an input side of the system relevant positions of a shift lever of the gearbox and a driving torque of a driving unit; memorizing at least one thus obtained shift lever signal and at least one comparison signal; recognizing and identifying different possible characteristics of the progresses of said signals as a switching intention; and transmitting a switching intention signal to a controlled clutch operating system.

2. The method of claim 1, further comprising the steps of evaluating the progress of said at least one shift lever signal to detect the selected gearbox ratio, and utilizing the thus obtained information to identify a switching intention.

3. The method of claim 1, wherein said recognizing and identifying step includes evaluating said at least one shift lever signal and said at least one comparison signal in such a way that points of intersection, if any, of the progresses of said signals are recognized and said switching intention signal is thereupon transmitted to said controlled clutch operating system.

4. The method of claim 1, wherein in the gearbox one distinguishes a selection path between switching lanes from a switching path within the switching lanes, the switching path or the selection path being evaluated for the determination of the corresponding position of the shift lever and said detecting step including evaluating at least one of said paths.

5. The method of claim 1, further comprising the step of ascertaining or generating said at least one comparison signal from said at least one shift lever signal including filtering said at least one shift lever signal and intensifying or weakening the thus generated filter signal by a constant value and an offset signal which is proportional to a prevailing driving torque to thus obtain a sum signal, and evaluating the sum signal as said at least one comparison signal.

6. The method of claim 5, further comprising the step of selecting said offset signal in dependency upon an existing throttle valve angle in a combustion engine which constitutes said driving unit.

7. The method of claim 1, wherein said recognizing and identifying step includes evaluating the progresses of said at least one shift lever signal and said at least one comparison signal to detect a point of intersection, if any, setting a switching intention counter to a predetermined value and counting up in dependency upon a computer cycle, said switching intention signal being transmitted to said controlled clutch operating system when the switching intention counter reaches a predetermined count and further comprising the step of interrupting the counting up by the switching intention counter by means of a control signal.

8. The method of claim 1, further comprising the step of ascertaining or generating said at least one comparison signal including filtering said at least one shift lever signal with an adjustable delay.

9. The method of claim 8, wherein a time delay with which said at least one shift lever signal is filtered to obtain a filter signal convertible into said at least one comparison signal conforms to a vibration frequency of the shift lever when the shift lever is not operated in the course of a driving operation.

10. The method of claim 8, wherein said filtering step comprises processing said at least one shift lever signal with a filter exhibiting a $PT_1$ behavior to convert said at least one shift lever signal into a filter signal which is convertible into said at least one comparison signal.

11. The method of claim 1, wherein said recognizing and identifying step includes monitoring said at least one shift lever signal and evaluating a change of a switching path within a predetermined portion of a shift lever path during a fixable measuring period in such a way that said switching intention signal is transmitted to said controlled system when a fixable switching path change drops below a threshold value.

12. The method of claim 11, wherein said measuring period is fixed in such a way that it is always longer than one-half of a vibration period of the shift lever while the lever is not operated in the course of a driving operation.

13. The method of claim 11, wherein said predetermined portion of said shift lever path is outside of that portion of said shift lever path within which the non-operated shift lever moves in the course of a driving operation.

14. The method of claim 11, wherein said measuring period is longer than one-half of a vibration period of the shift lever while the lever is not operated in the course of a driving operation and wherein the duration of said measuring period is fixed in dependency upon the establishment of an average value of the shift lever vibration period.

15. The method of claim 14, further comprising the step of ascertaining whether the shift lever vibrates freely in the course of a driving operation or its behavior changes, the establishment of said average value for fixing the duration of said measuring period being carried out in dependency upon the results of monitoring said at least one shift lever signal.

16. The method of claim 11, wherein said monitoring step includes detecting the direction of movement of the shift lever and, when the direction of movement of the shift lever is reversed, transmitting a control signal to a switching intention counter or rescinding any switching intention signal which may have been generated.

17. The method of claim 1, wherein a constant value for the generation of said at least one comparison signal is selected in dependency upon a vibration amplitude which is characteristic of the non-operated shift lever.

18. The method of claim 1, further comprising the steps of monitoring a drive load and transmitting a control signal to a switching intention counter when the monitored drive load exceeds a predetermined drive load.

19. The method of claim 1, wherein each of a plurality of switching and selection paths for the shift lever is monitored by a discrete potentiometer.

* * * * *

UNITED STATES PATENT AND TRADEMARK OFFICE
CERTIFICATE OF CORRECTION

PATENT NO. : 5,679,091
DATED : October 21, 1997
INVENTOR(S) : Michael SALECKER et al.

It is certified that error appears in the above-identified patent and that said Letters Patent is hereby corrected as shown below:

Foremost page, [75], Inventors, change the city of residence for Martin Rauser from "Bühl-Baalzhofen" to --Bühl-Balzhofen--.

Signed and Sealed this

Tenth Day of March, 1998

Attest:

BRUCE LEHMAN

*Attesting Officer*     *Commissioner of Patents and Trademarks*